(12) United States Patent
Garcia Soule

(10) Patent No.: US 12,330,173 B1
(45) Date of Patent: *Jun. 17, 2025

(54) METHOD AND APPARATUS FOR MODULAR HYDROCYCLONE

(71) Applicant: TETRA Technologies, Inc., The Woodlands, TX (US)

(72) Inventor: Virgilio Garcia Soule, Cypress, TX (US)

(73) Assignee: TETRA Technologies, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,036

(22) Filed: Oct. 9, 2023

Related U.S. Application Data

(63) Continuation of application No. 17/827,960, filed on May 30, 2022, now Pat. No. 11,779,937, which is a continuation of application No. 16/819,922, filed on Mar. 16, 2020, now Pat. No. 11,344,897.

(60) Provisional application No. 62/830,254, filed on Apr. 5, 2019.

(51) Int. Cl.
| | | |
|---|---|---|
| *B04C 5/04* | (2006.01) | |
| *B01D 21/26* | (2006.01) | |
| *B04C 5/06* | (2006.01) | |
| *B04C 5/081* | (2006.01) | |
| *B04C 5/085* | (2006.01) | |
| *B04C 5/103* | (2006.01) | |

(52) U.S. Cl.
CPC ............. *B04C 5/04* (2013.01); *B01D 21/267* (2013.01); *B04C 5/06* (2013.01); *B04C 5/081* (2013.01); *B04C 5/085* (2013.01); *B04C 5/103* (2013.01)

(58) Field of Classification Search
CPC .. B04C 5/04; B04C 5/06; B04C 5/081; B04C 5/085; B04C 5/103; B01D 21/267
See application file for complete search history.

(56) References Cited

U.S. PATENT DOCUMENTS

| | | | | |
|---|---|---|---|---|
| 3,893,914 | A * | 7/1975 | Bobo .................... | B04C 7/00 209/733 |
| 3,988,239 | A * | 10/1976 | Malina .................. | B04C 5/085 55/435 |
| 4,224,143 | A * | 9/1980 | Liller .................... | B04C 5/14 209/733 |
| 2005/0236324 | A1 * | 10/2005 | Mildren ................ | B04C 5/08 210/512.1 |

(Continued)

OTHER PUBLICATIONS

F. Zhou; G. Sun; X. Han; Y. Zhang; W. Bi. "Experimental and CFD study on effects of spiral guide vanes on cyclone performance". Advanced Powder Technology 29 (2018) 3394-3403. (Year: 2018).*

*Primary Examiner* — Liam Royce
(74) *Attorney, Agent, or Firm* — Roy Kiesel Ford Doody & North, APLC; Brett A. North

(57) ABSTRACT

An improved modular hydrocyclone and method of operating for centrifugal cleaning fluid wherein the hydrocyclone has a plurality of inserts each of different sizes and configurations for selectively and interchangeably inserting into the modular body thereby adjusting capacity and cleaning efficiency of the hydrocyclone without changing out the body. One or more embodiments relate to systems and methods for utilizing a hydrocyclone system with interchangeable components.

13 Claims, 55 Drawing Sheets

(56) References Cited

U.S. PATENT DOCUMENTS

2007/0095032 A1\* 5/2007 Nilsen ................ B01D 17/0208
                                                                         55/418

\* cited by examiner

METHOD AND APPARATUS FOR MODULAR HYDROCYCLONE

CROSS-REFERENCE TO RELATED APPLICATIONS

This is a continuation of U.S. patent application Ser. No. 17/827,960, filed May 30, 2022 (now U.S. Pat. No. 11,779,937), which is a continuation of U.S. patent application Ser. No. 16/819,922, filed Mar. 16, 2020 (now U.S. Pat. No. 11,344,897), which claims the benefit of U.S. Provisional Patent Application Ser. No. 62/830,254, filed on Apr. 5, 2019, each of which patent(s) and/or patent application(s) are incorporated herein by reference, and priority of/to which is hereby claimed.

BACKGROUND OF THE INVENTION

One embodiment relates generally to systems and methods for utilizing a modular hydrocyclone, also known as a cyclone centrifuge, apparatus for addressing separation or classification of items such as sand from fluids, including drilling, fracturing (frac) and completion fluids, used in oil and gas operations, that can deal with different ranges of fluid flows and characteristics.

Traditional hydrocyclones have tangential entry of the flow causing greater wear and the entire or complete hydrocyclone requires replacement where erosive wear occurs.

The current sand/solids separators have been proven not to be efficient. Traditional hydrocyclones are designed for a narrow range of flow characteristics. If the flow falls outside the design range, a second complete hydrocyclone unit would need to replace the first hydrocyclone unit, where the second hydrocyclone unit was designed to accommodate the different flow.

There is a need to provide the ability to replace in field one or more components of the modular hydrocyclone to address various flow characteristics without the need of replacing the hydrocyclone body or pressure vessel that the hydrocyclone body is attached.

There is a need to provide the ability to replace in field one or more components of the modular hydrocyclone to address where erosive wear occurs without the need of replacing the hydrocyclone body or pressure vessel that the hydrocyclone body is attached. There is a need to provide the ability to have the flow entering the modular hydrocyclone in a direction that generally intersects the longitudinal axis of the cone instead of tangentially entering the cone.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

SUMMARY OF THE INVENTION

The apparatus of the present invention solves the problems confronted in the art in a simple and straightforward manner. What is provided is a modular hydrocyclone method and apparatus.

In one embodiment is provided a modular hydrocyclone method and apparatus providing an ability to replace the hydrocyclone insert in field to address for various flow characteristics without replacing the pressure vessel or head.

In one embodiment is provided a modular hydrocyclone method and apparatus wherein the inlet feed stream can be introduced into a static flow chamber upstream of a substantially radially extending flow conditioning assembly and then into a separating chamber, wherein the inlet stream may enter the static flow axially and then conditioned from axial flow to tangentially centrifugal flow whereby the heavier particles move to the outer wall, and into the separating chamber thus efficiency of the apparatus is increased.

In one embodiment is provided a modular hydrocyclone method and apparatus having helical overflow that allows the flow to enter axially instead of tangentially.

In one embodiment is provided a method and apparatus of utilizing a modular and variable hydrocyclone on a pressure vessel for well flow back, well cleanup and fracking operations.

One embodiment utilizes a modular hydrocyclone system comprising:
(a) a hydrocyclone insert or flow conditioning assembly assembly having a helical flow pathway/channel, and
(b) a lower conical tube combination including a first insert and a second insert that can be replaced for various sizes and flow characteristics without replacing the head and the pressure vessel.

Various embodiments provide an improved modular hydrocyclone and method of operating wherein the modular hydrocyclone has a plurality of modular conical inserts each with different sizes for selectively and interchangeably inserting these modular conical inserts into a body opening to adjust capacity and cleaning efficiency of the modular hydrocyclone.

Various embodiment relate to new and improved cyclone centrifuges wherein the inlet feed stream is introduced into a static flow chamber upstream of a substantially radially extending flow conditioning assembly and then into a separating chamber, wherein the inlet stream may enter the static flow axially and then conditioned from axial flow to tangentially centrifugal flow whereby the heavier particles move to the outer wall, and into the separating chamber thus efficiency of the apparatus is increased.

The drawings constitute a part of this specification and include exemplary embodiments to the invention, which may be embodied in various forms.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Provided is a method and apparatus of incorporating a modular/variable hydrocyclone unit 500 for well flow back, well cleanup, and fracking operations.

In various embodiments modular/variable hydrocyclone unit 500 comprises
    a hydrocyclone body 600 which is connected to a pressure vessel 100;

a hydrocyclone insert 1000 having a helical flow pathway/channel 1100; and a lower conical tube (e.g., lower conical tube combination 1500,1600) which can be of singular (e.g., 3500) or multiple piece construction (e.g. 1500 flush with 1600, or 2500 recessed with 2700)

wherein the hydrocyclone insert 1000 and lower conical tube can be switched out/replaced in field to accommodate various:

(a) flow rates and (b) flow characteristics (including without limitation densities, pressures, differential densities, etc.) within the interior 650 of the hydrocyclone body 600, or can be switched out/replaced in field to address erosive wear on the hydrocyclone insert 1000 and lower conical tube of singular or multiple piece construction.

Components

Figure 1:
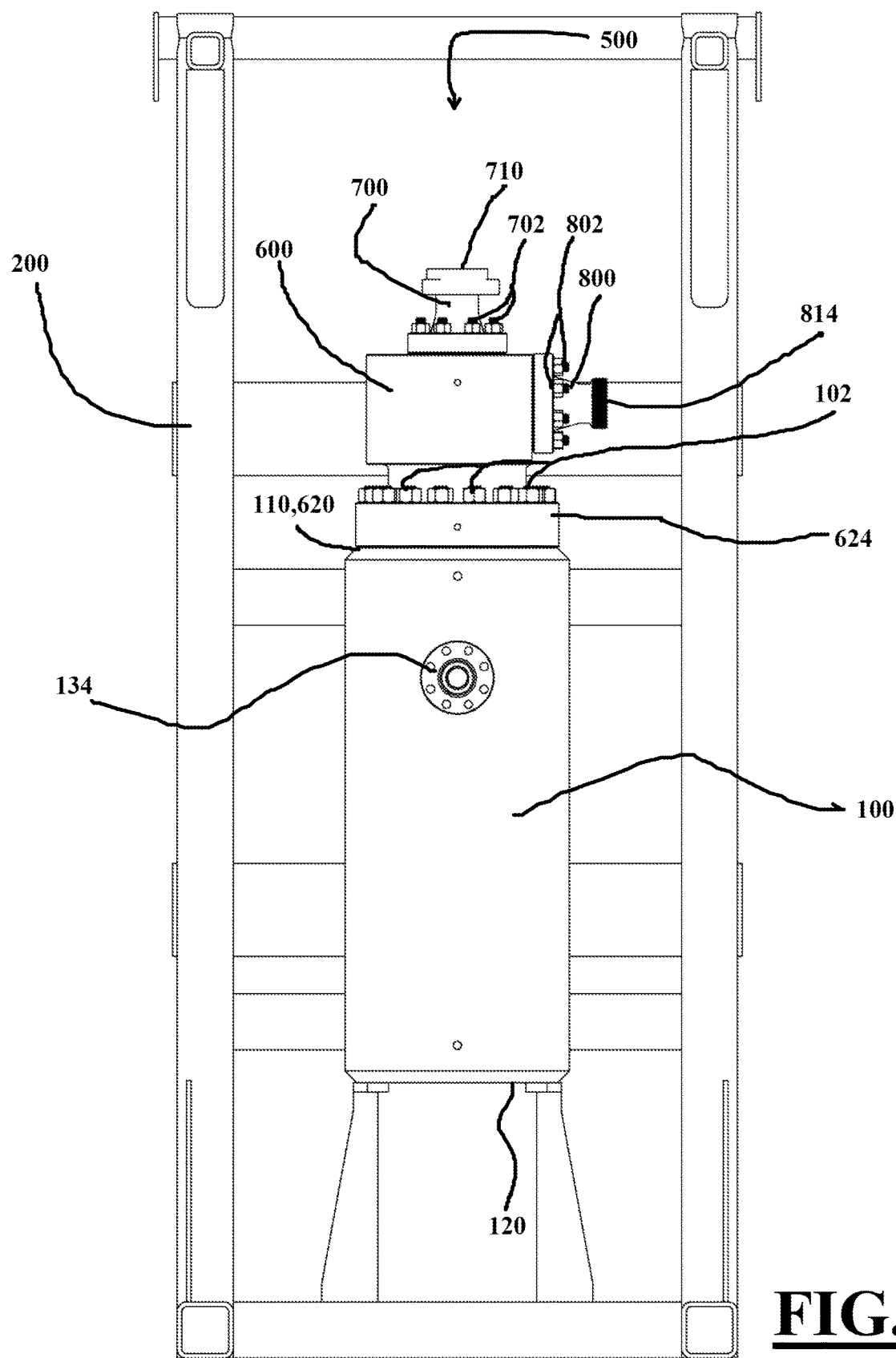
FIG. 1 shows a front view of the exterior of a modular/variable hydrocyclone system in accordance with one or more embodiments of the invention.
Figure 2:
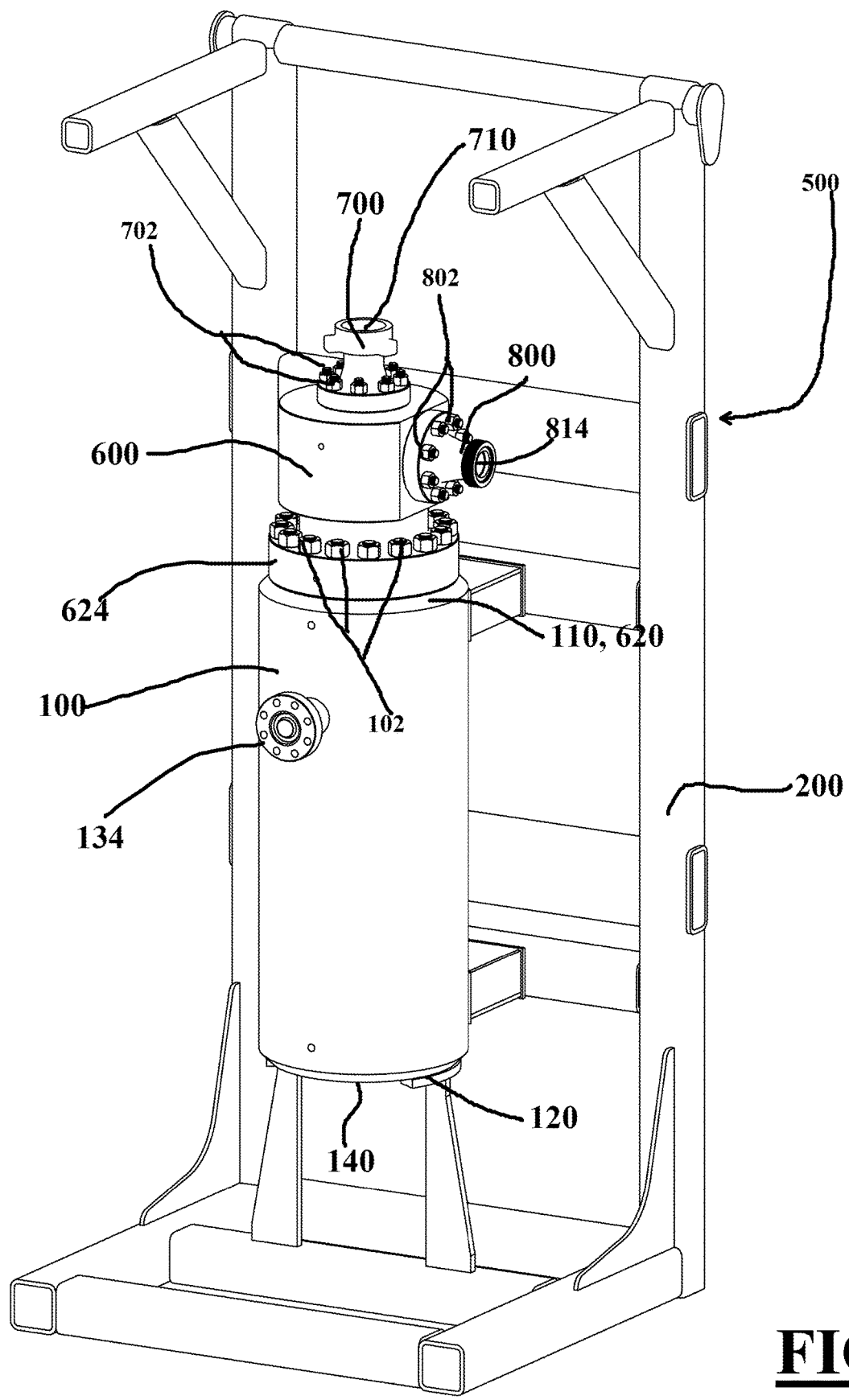
FIG. 2 is a perspective view of the modular/variable hydrocyclone shown in FIG. 1.

FIG. 1 shows a front view of the exterior of a modular/variable hydrocyclone system 500 in accordance with one or more embodiments of the invention. FIG. 2 is a perspective view of the modular/variable hydrocyclone 500 shown in FIG. 1.

Modular/variable hydrocyclone system 500 can include modular hydrocyclone body 600 attached to a pressure vessel 100 and supported by a frame 200. Pressure vessel 100 can comprise first end 110, second end 120 and interior 150. At first end can be upper inlet 130. At second end 120 can be lower exit 140. Before lower exit can be tapered area 160 to assist in directing fluids and/or solids into lower exit 140. Although not shown, conventional connections can be made to lower exit 140 to accommodate any fluids/solids etc. leaving lower exit 140.

Body

Figure 9:
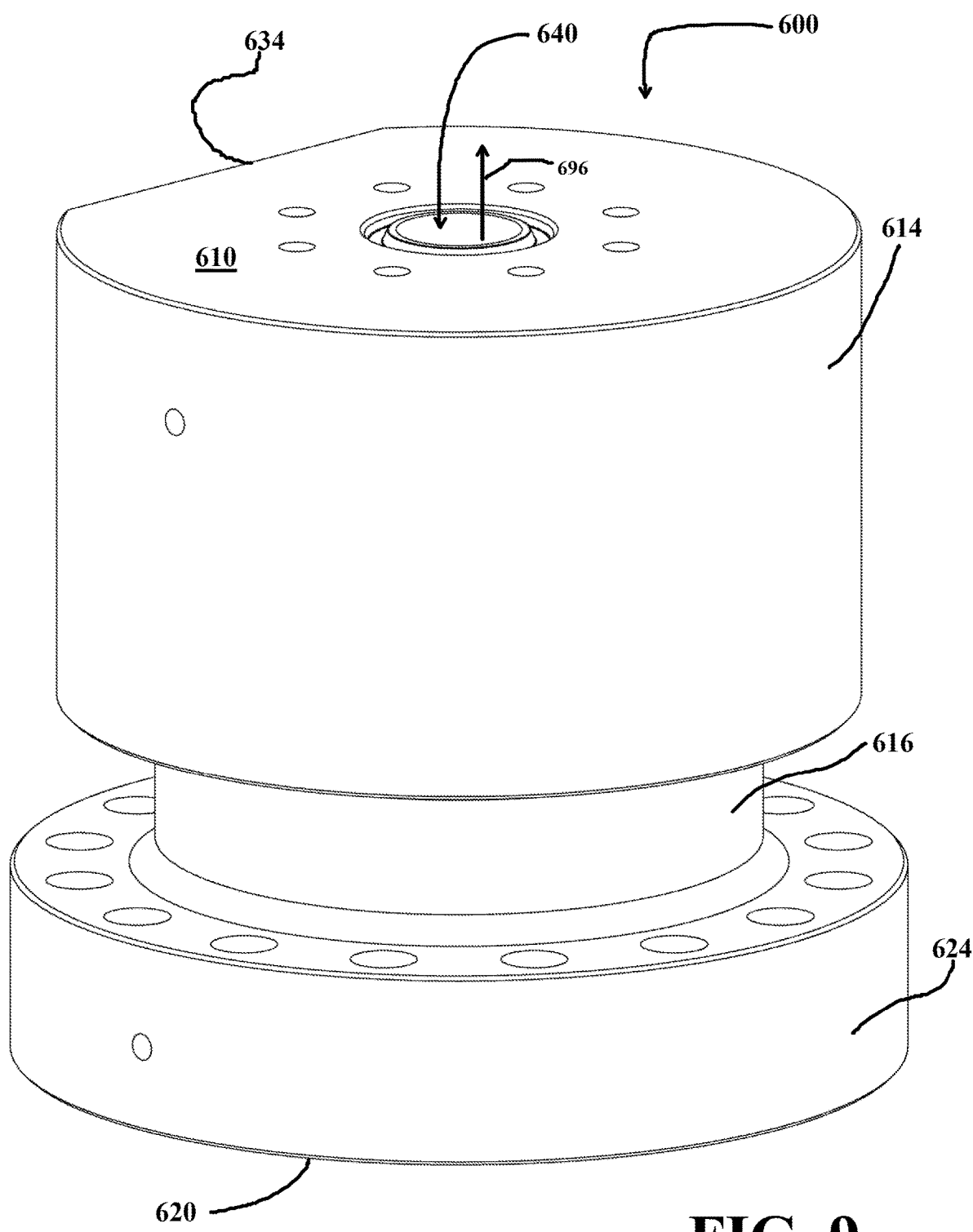
FIG. 9 is a perspective view of a modular hydrocyclone body.
Figure 10:
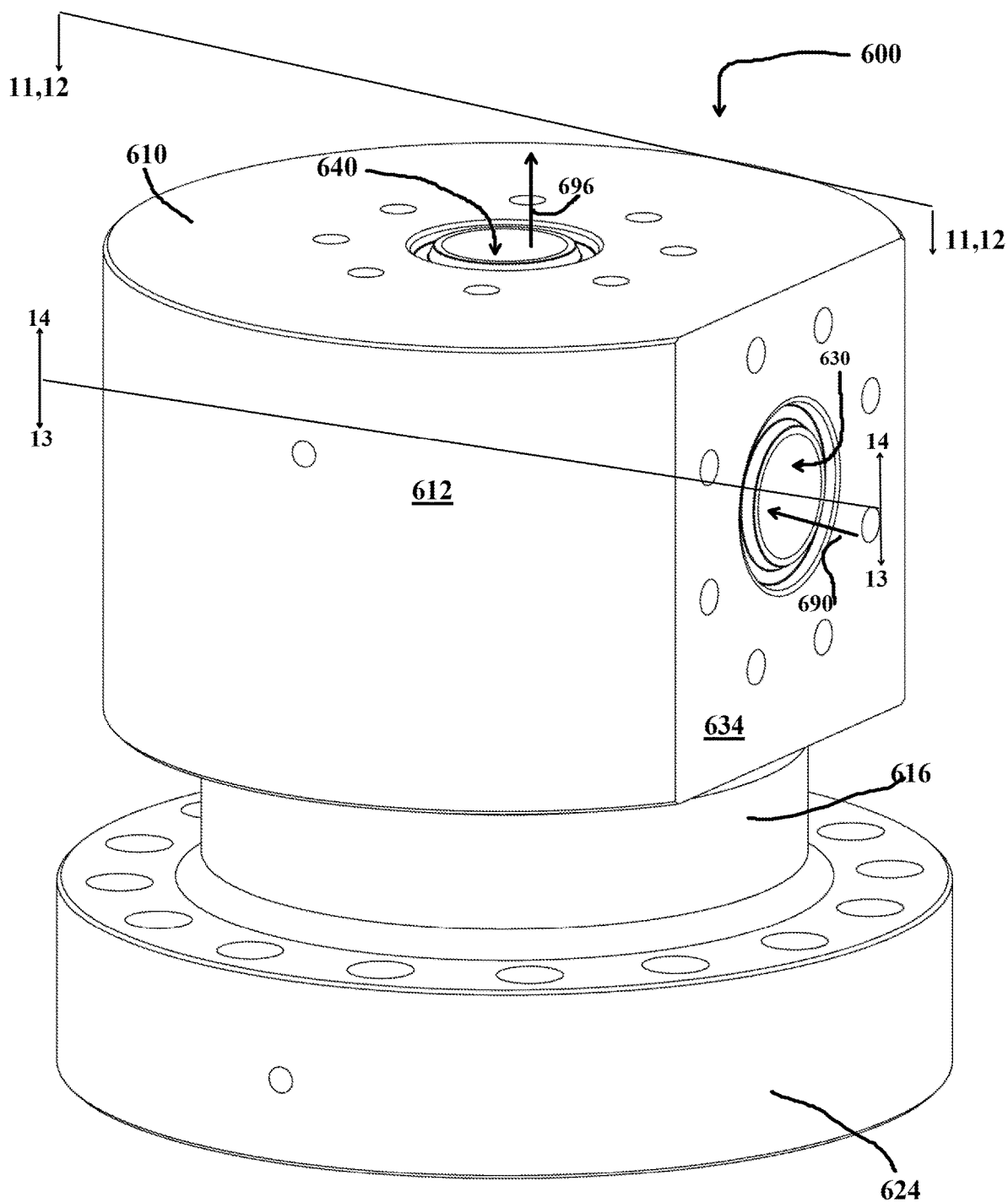
FIG. 10 is a perspective view of the modular hydrocyclone body of FIG. 9 rotated along its longitudinal axis.
Figure 11:
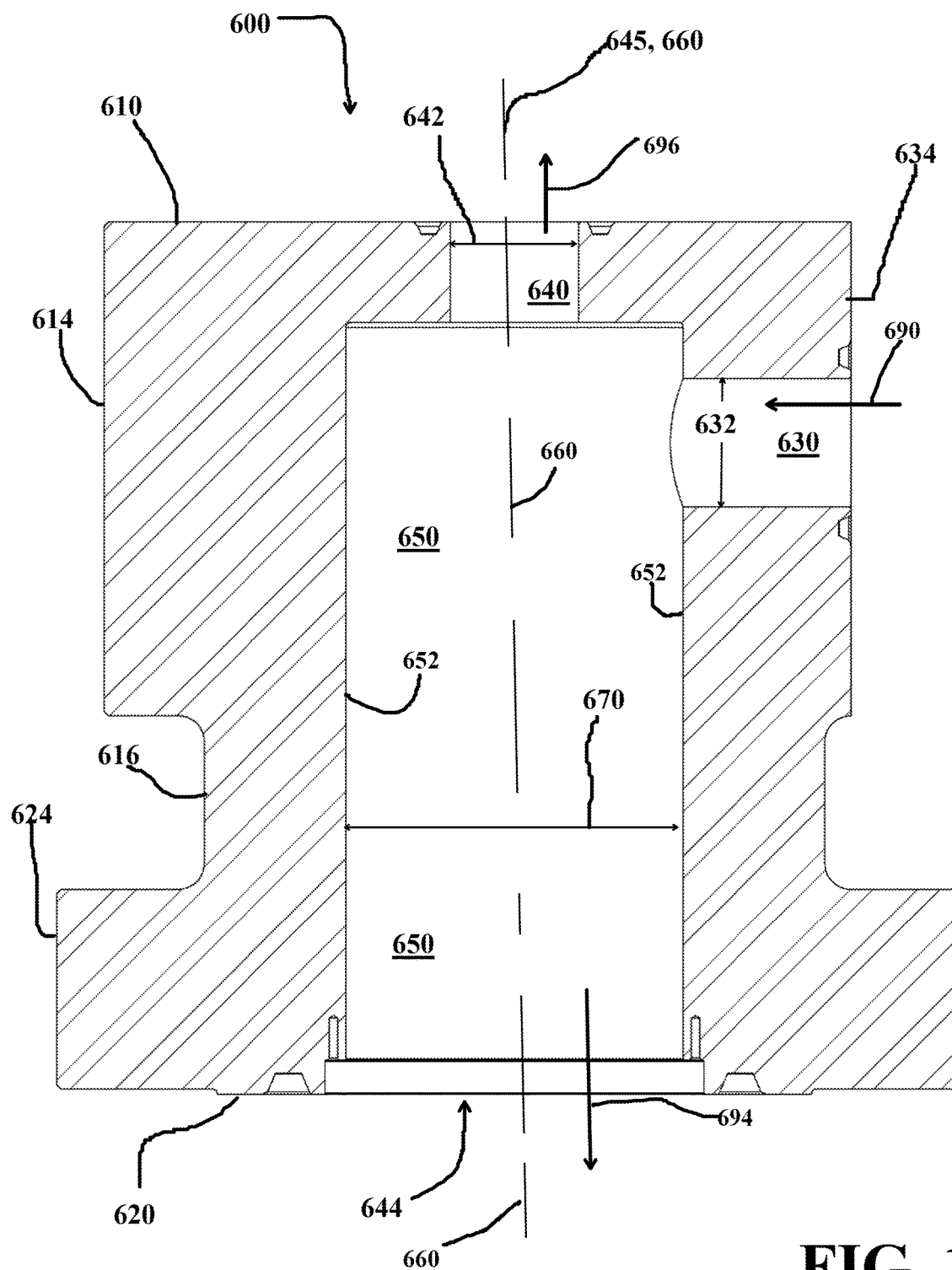
FIG. 11 is a sectional view of the modular hydrocyclone body of FIG. 10 taken along line 11-11.
Figure 12:
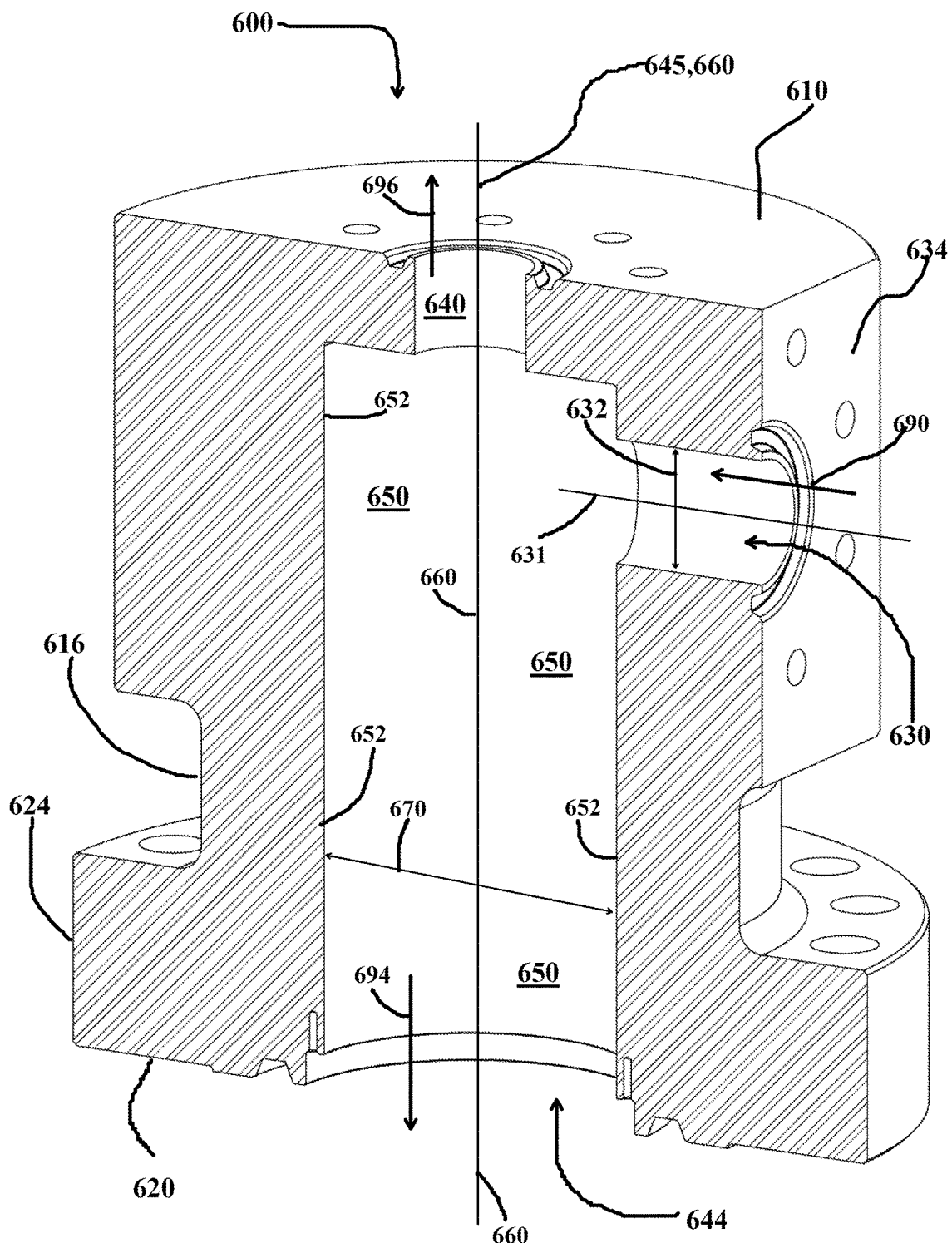
FIG. 12 is a sectional perspective view of the modular hydrocyclone body of FIG. 10 taken along line 12-12.
Figure 13:
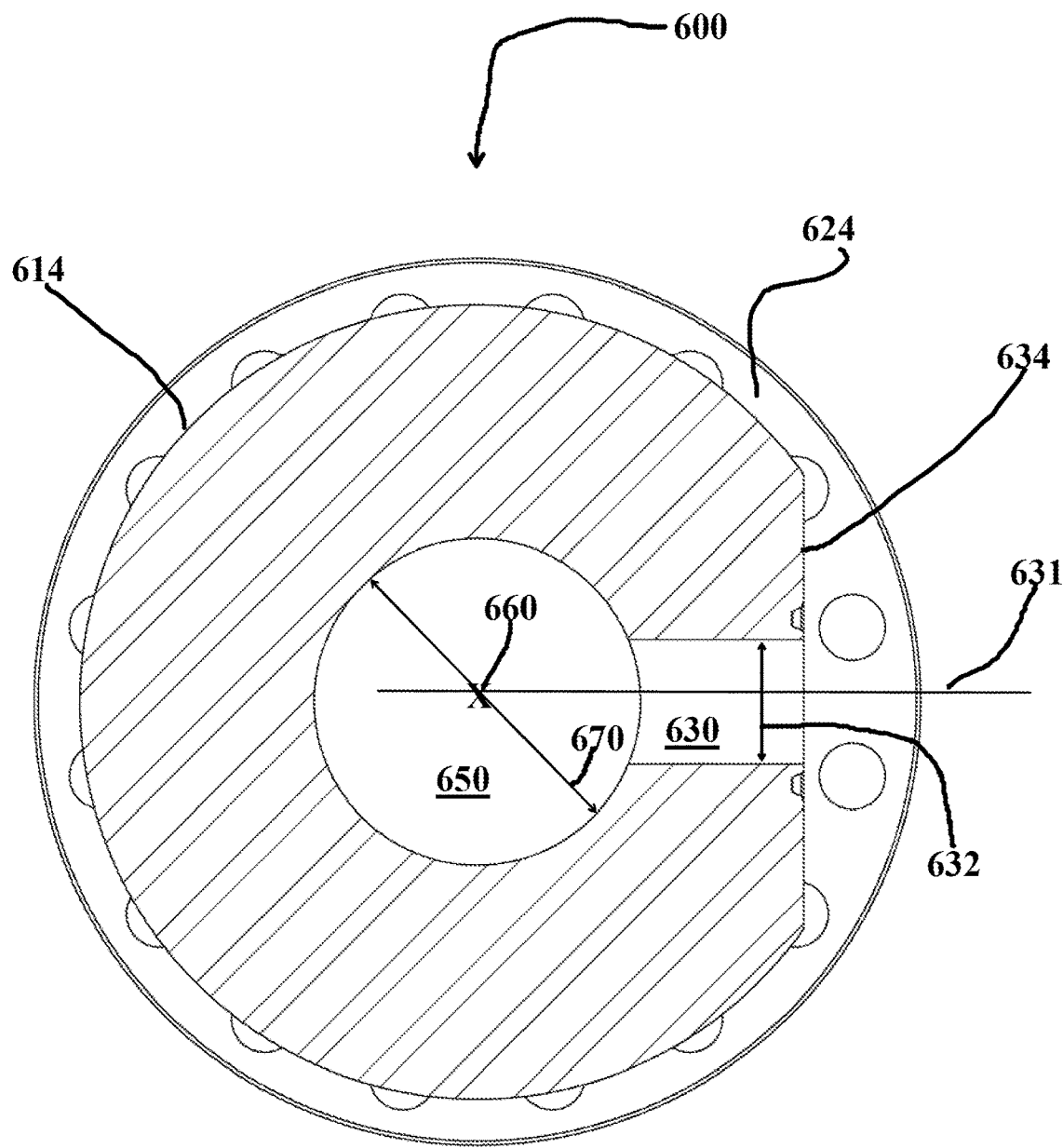
FIG. 13 is a horizontal sectional view of the body of FIG. 10 taken through lines 13-13 and looking down.
Figure 14:
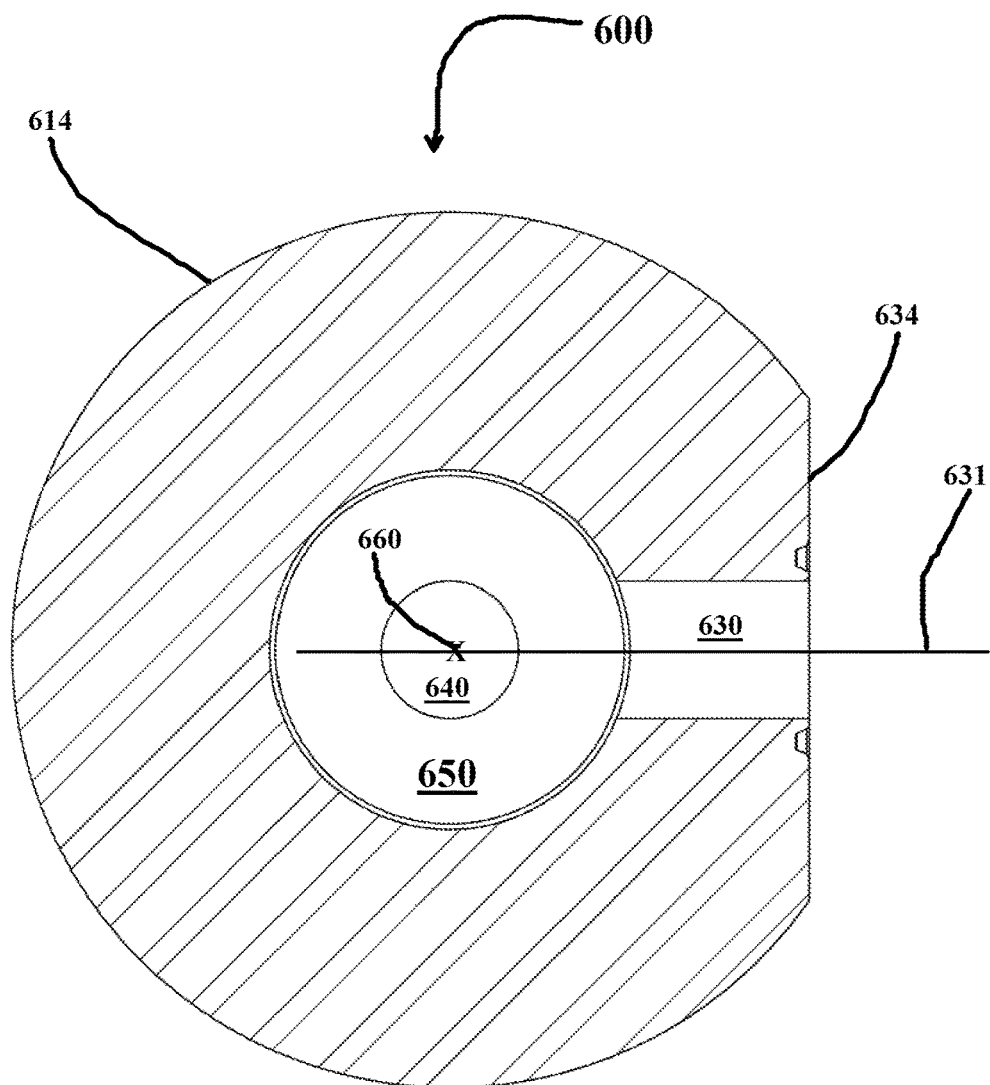
FIG. 14 is a horizontal sectional view of the body of FIG. 10 taken through lines 14-14 and looking up.

FIG. 9 is a perspective view of a modular hydrocyclone body 600. FIG. 10 is a perspective view of the modular hydrocyclone body 600 rotated along the longitudinal axis 660 of interior bore 650. FIG. 11 is a sectional view of the modular hydrocyclone body 600 taken along line 11-11. FIG. 12 is a sectional perspective view of the modular hydrocyclone body 600 taken along line 12-12. FIG. 13 is a horizontal sectional view of body 600 taken through lines 13-13 and looking down. FIG. 14 is a horizontal sectional view of body 600 taken through lines 14-14 and looking up.

Modular hydrocyclone body 600 can comprise first end 610 and second end 620; the first end having an upper outlet 640 with a diameter 642 and longitudinal centerline 645; the second end having lower outlet 644 and interior bore 650 spanning from the second end 620 to upper outlet 640; interior bore 650 having sidewall 652, diameter 670 and longitudinal centerline 660 which is coincidental with longitudinal centerline 645 of the upper outlet 640. Upper outlet 640 can be cylindrical. Interior bore 650 can be cylindrical. Closely spaced to first end 610 can be side inlet 630 with longitudinal axis 631 and diameter 632. Preferably, longitudinal axis 660 of internal bore 650 intersects with longitudinal axis 631 of side inlet 630. In another embodiment the projection of side inlet 630 intersects with longitudinal axis 660 of internal bore 650.

Looking at FIG. 14 it can be seen that bore 650 intersects with upper outlet 640, and that bore 650 and upper outlet are coincident with their longitudinal axes, 645 and 655 also being coincident.

Figure 3:
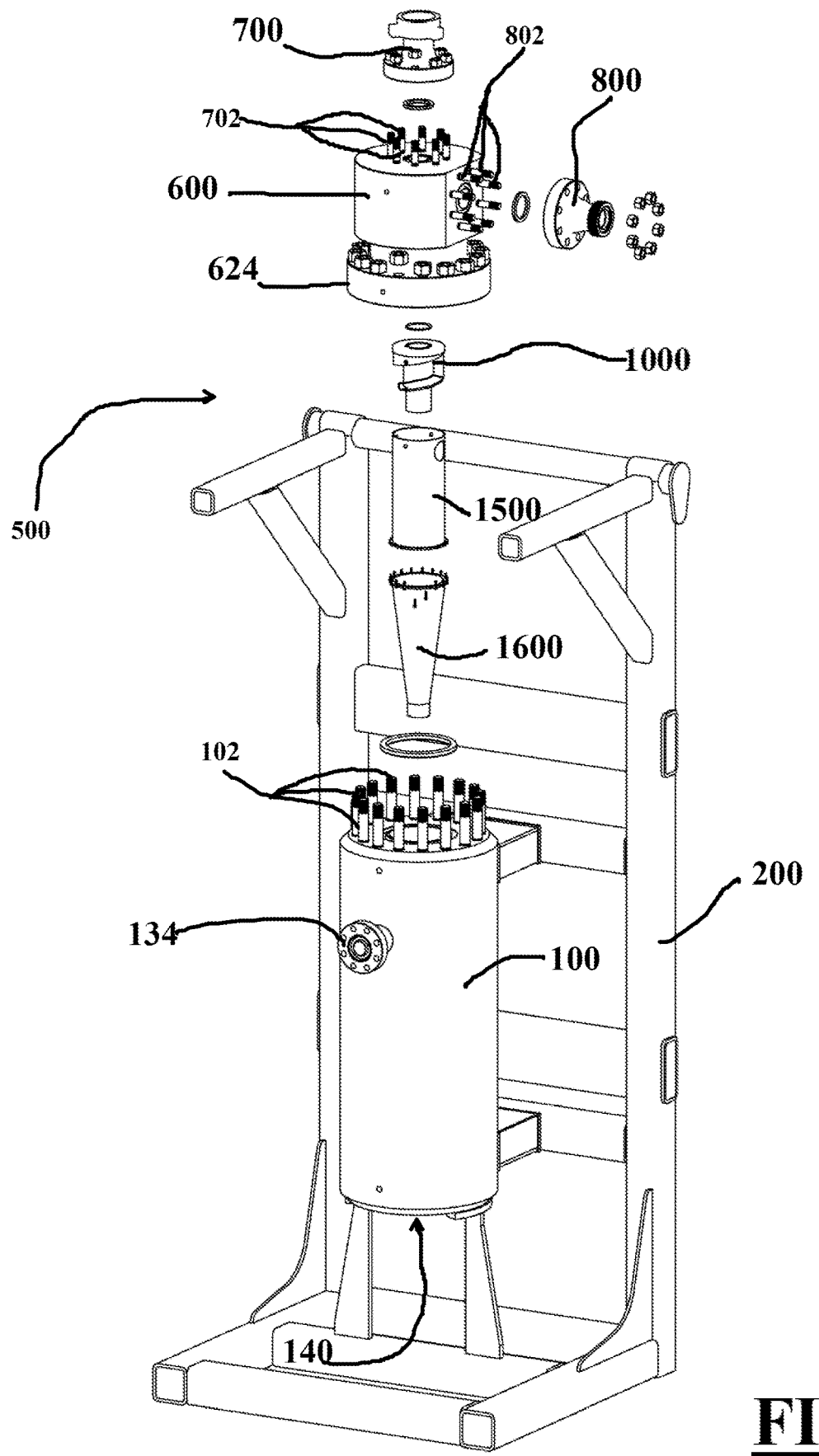
FIG. 3 is an exploded perspective view of the modular/variable hydrocyclone shown in FIG. 1 with a large diameter hydrocyclone insert along with a matching upper tube and lower conical tube.
Figure 4:
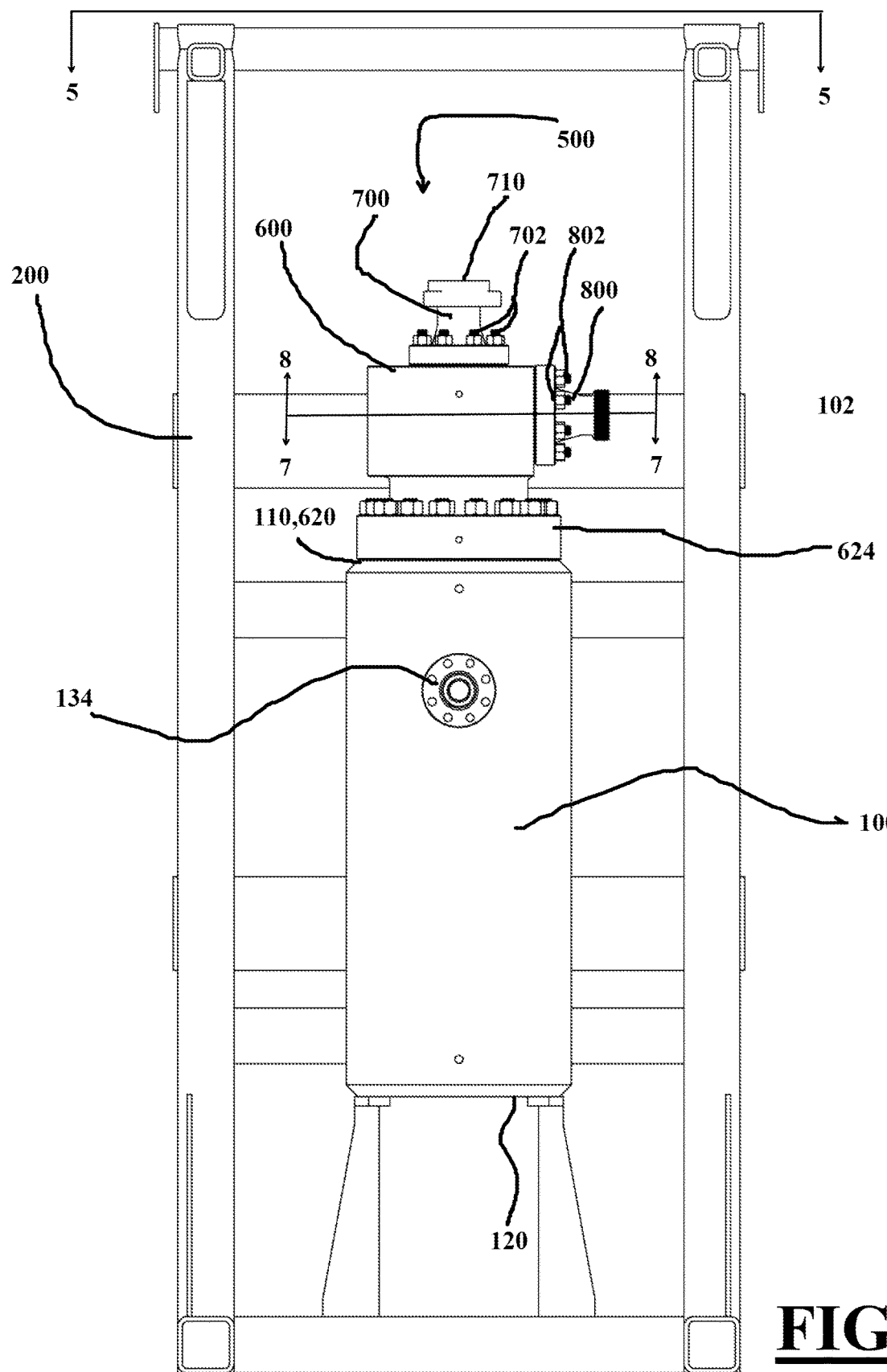
FIG. 4 shows a front view of the exterior of a modular/variable hydrocyclone used with the embodiments of FIGS. 3 and 5-28.

At second end 620 can also be flange 624 and above flange can be a reduced area space 616 to allow for space to connect a plurality of threaded connectors symmetrically spaced about flange 624 as indicated in FIGS. 1-3 and be detachably connectable to pressure vessel 100.

FIGS. 1, 2 and 3 show top connector 700 which can be detachably connected to first end 610. Upper connector 700 can comprise first end 710, second end 720, and bore 730 between first and second ends.

FIGS. 1, 2 and 3 also show side connector 800 which can be detachably connected to flat face 634. Side connector 800 can comprise first end 810, second end 820, and bore 830 between first and second ends.

Hydrocyclone Insert

Figure 15:
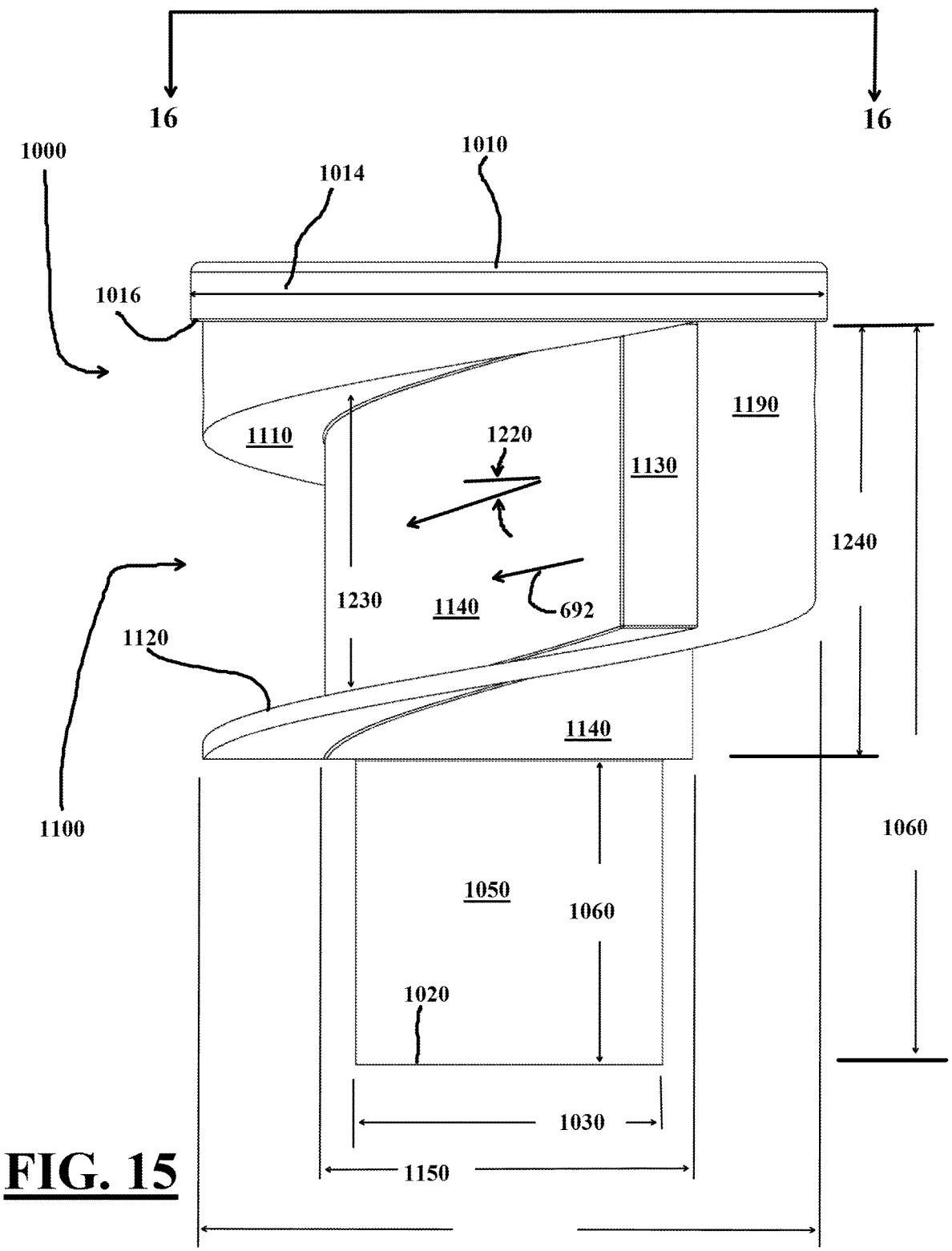
FIG. 15 is a front view of a hydrocyclone insert which can be used with the modular hydrocyclone body of FIG. 9.
Figure 16:
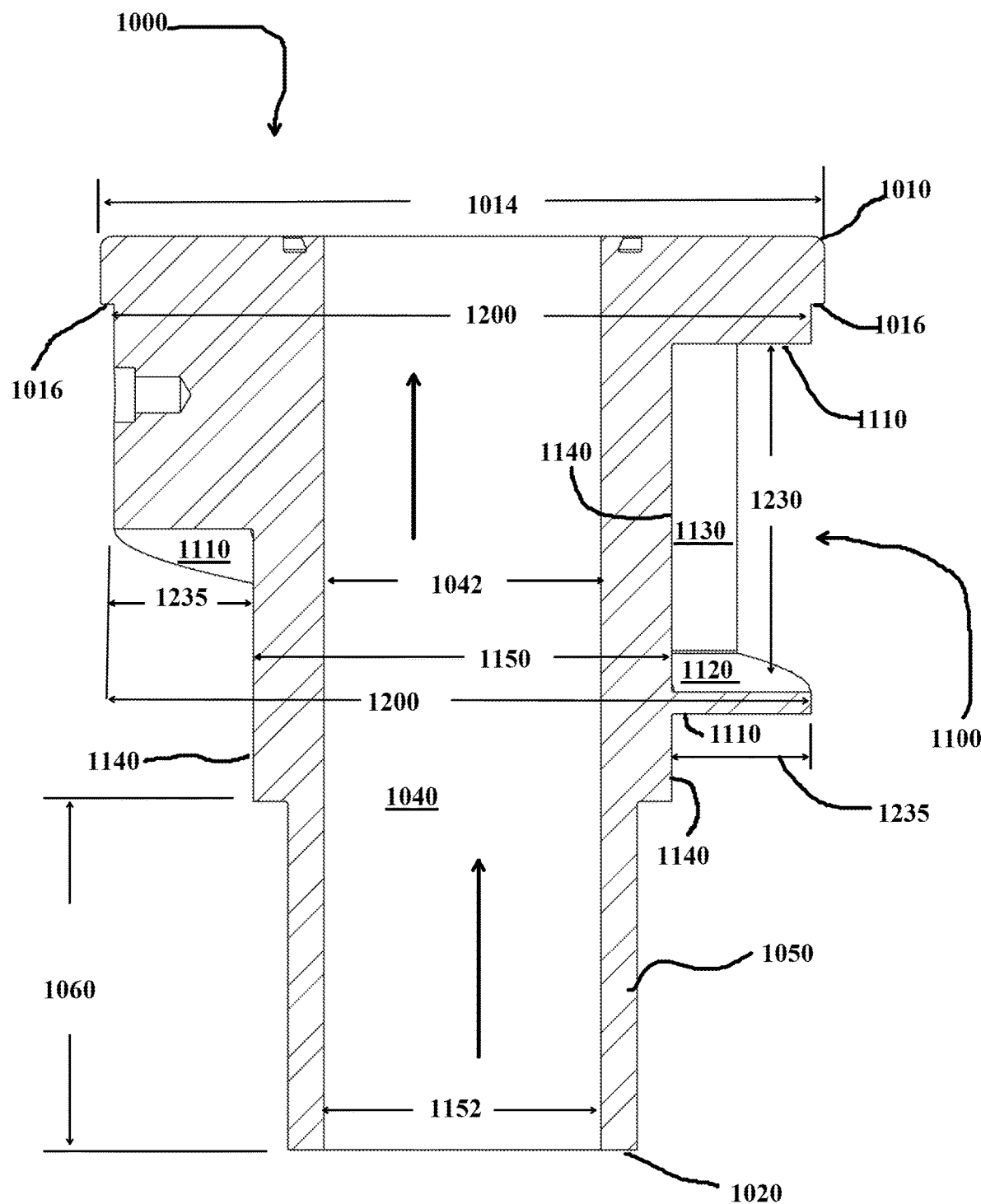
FIG. 16 is a sectional view of the hydrocyclone insert of FIG. 15 taken along line 16-16.
Figure 17:
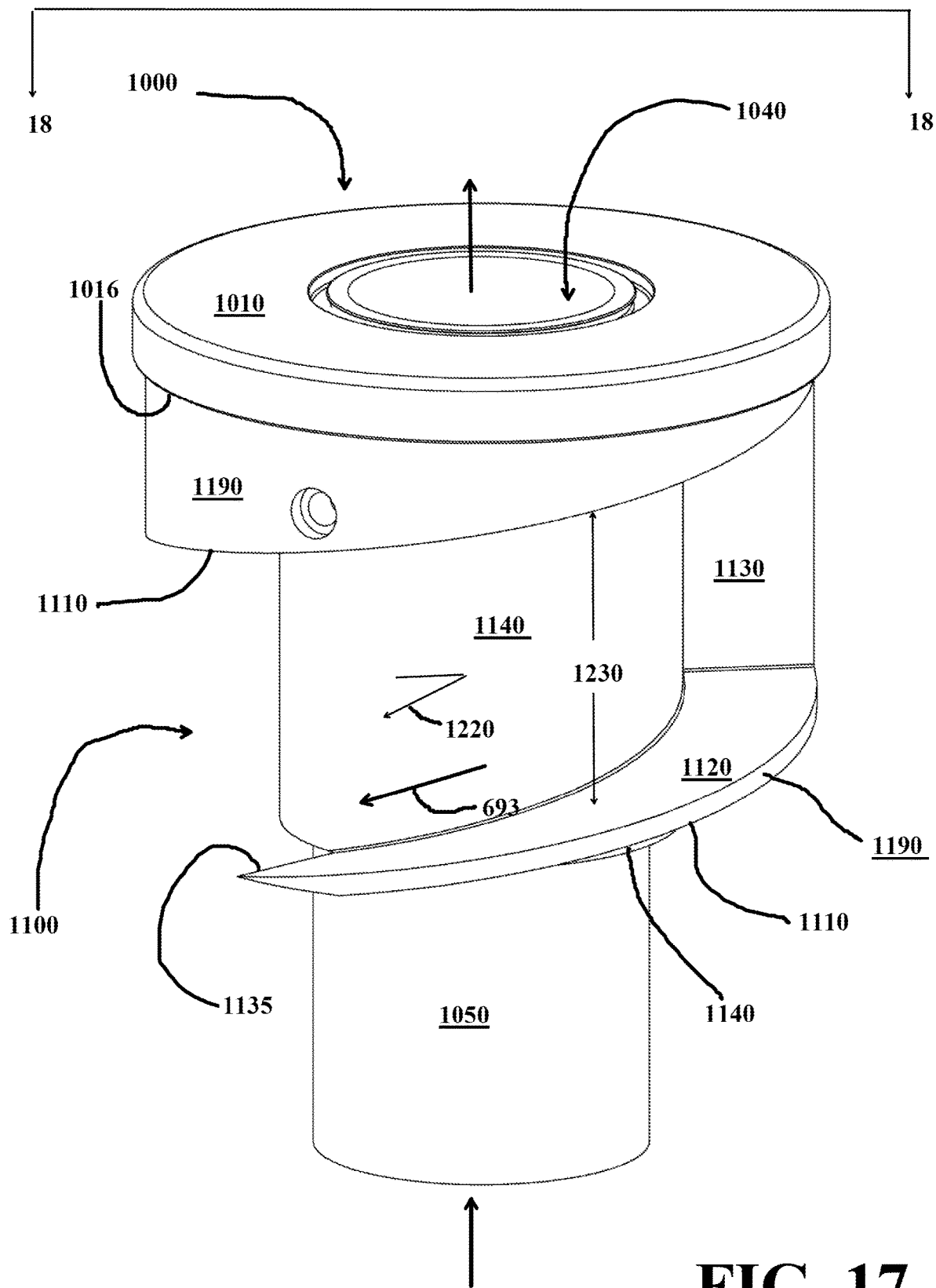
FIG. 17 is a perspective view of the hydrocyclone insert of FIG. 15.
Figure 18:
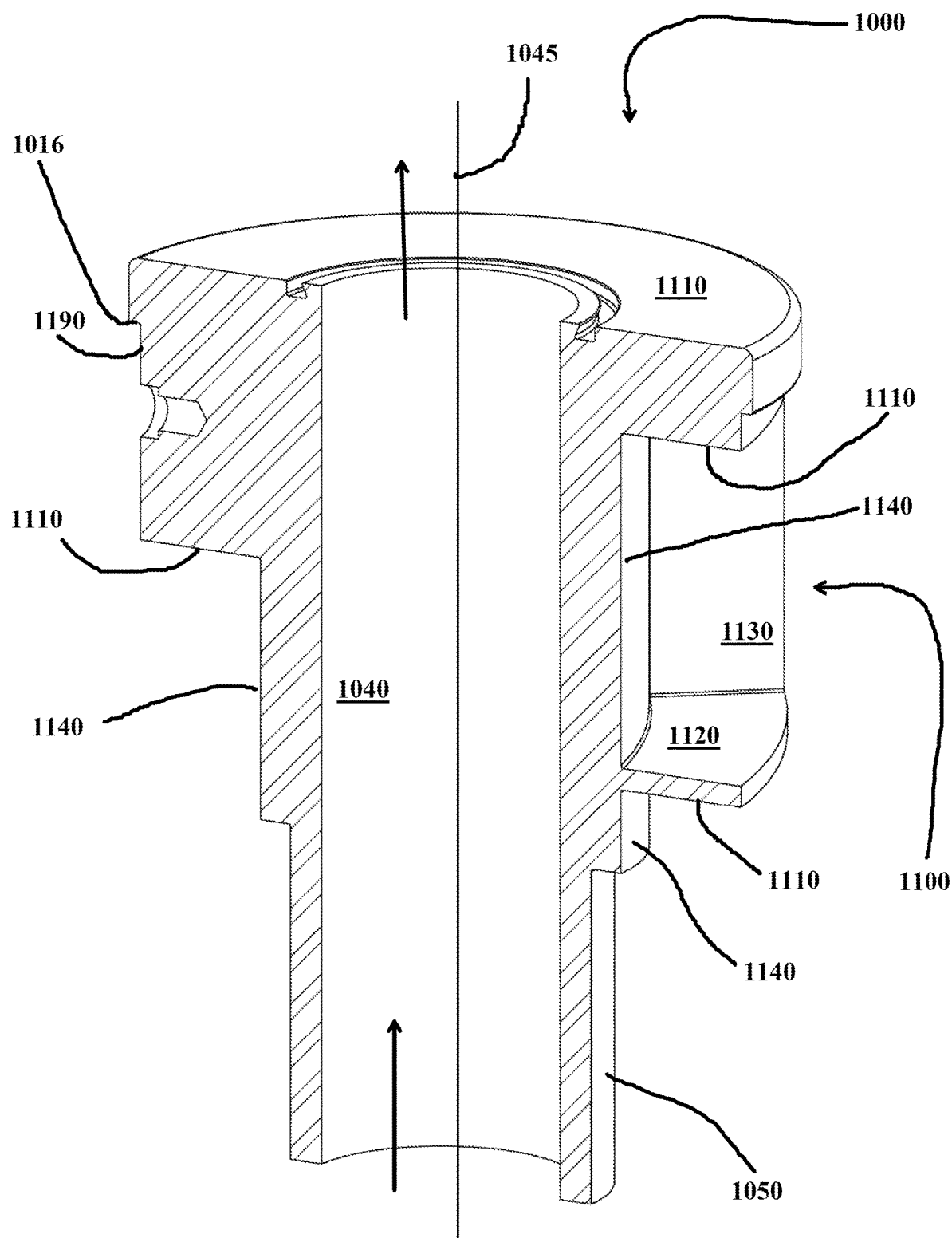
FIG. 18 is a sectional perspective view of the hydrocyclone insert of FIG. 17 taken along line 18-18.
Figure 19:
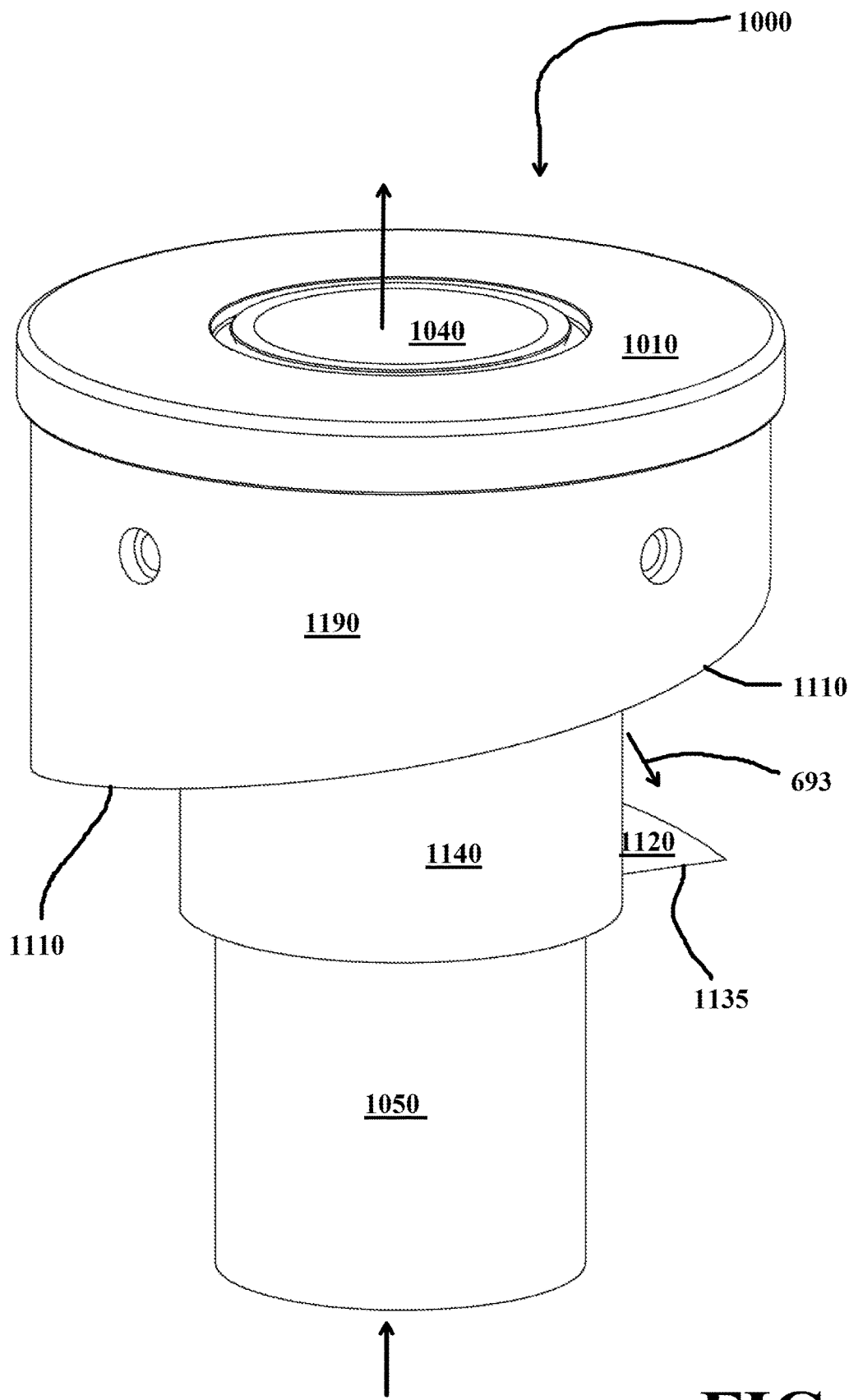
FIG. 19 is a perspective view of the hydrocyclone insert of FIG. 17 rotated along its longitudinal axis.

FIG. 15 is a front view of a hydrocyclone insert 1000 which can be used with the modular hydrocyclone body 600. FIG. 16 is a sectional view of the hydrocyclone insert 1000 taken along line 16-16. FIG. 17 is a perspective view of the hydrocyclone insert 1000. FIG. 18 is a sectional perspective view of the hydrocyclone insert 1000 taken along line 18-18. FIG. 19 is a perspective view of the hydrocyclone insert 1000 rotated along its longitudinal axis.

Hydrocyclone insert can comprises first end 1010, second end 1020, bore 1040 between first and second ends, longitudinal axis 1045, and a helical flow pathway/channel 1100.

Helical flow pathway/channel 1100 generally has a slope or pitch 1220 and is bounded by upper wall 1110, lower wall 1120, interior surface 1140, and rear wall 1130. The width 1235 of helical flow pathway/channel 1100 is generally the difference between dimension 1200 and 1150 divided by two. The depth 1230 or height of helical pathway/channel 1100 is between upper wall 1110 and lower wall 1120. Helical pathway/channel 1100 has longitudinal length 1240.

Bore 1040 can be generally cylindrical and have a diameter of 1152.

Second end 1020 can have a diameter of 1030.

Upper Insert and Lower Conical Tube

Figure 20:
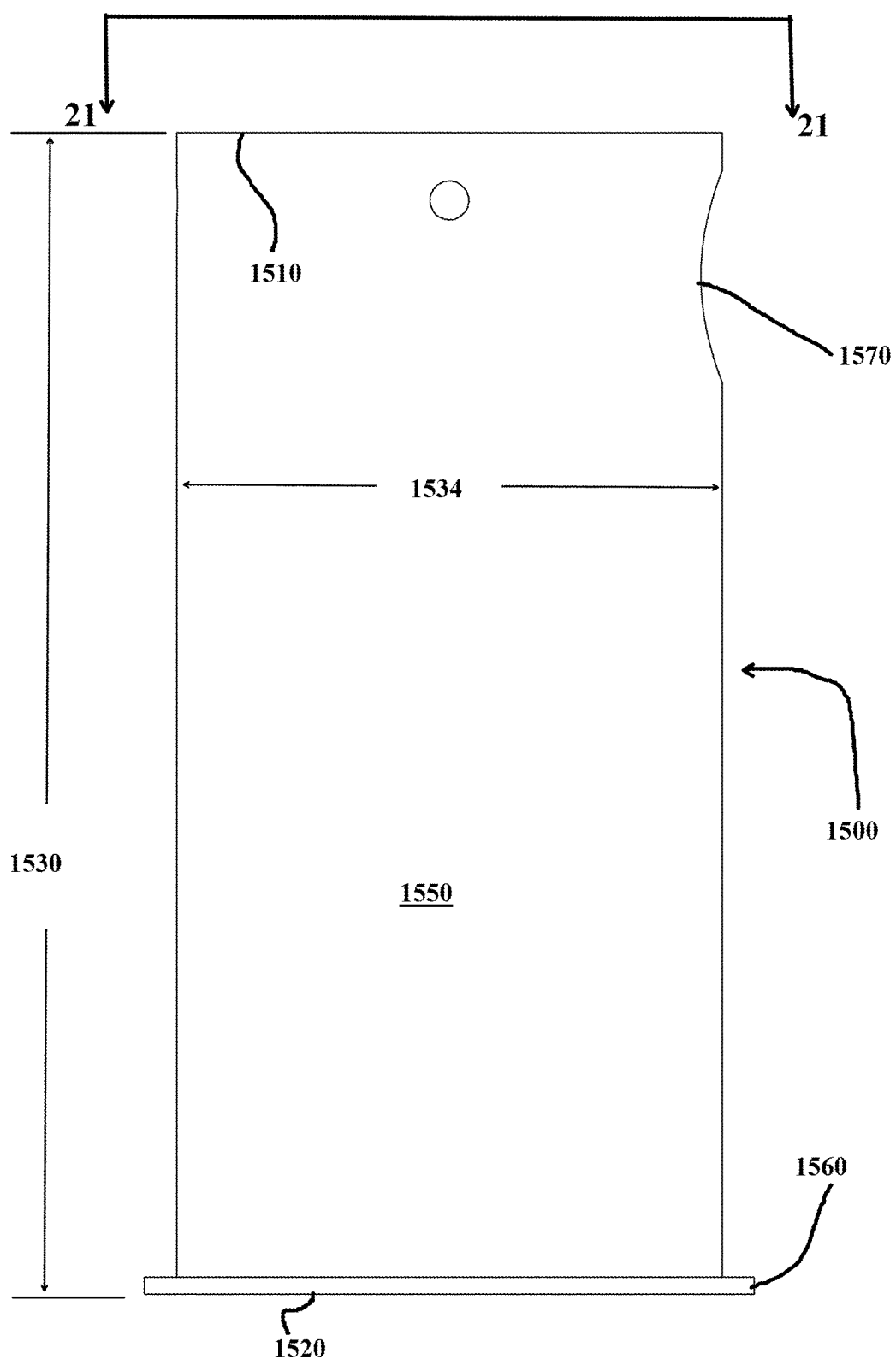
FIG. 20 is a front view of an upper tube which can be used with the modular hydrocyclone body of FIG. 9.
Figure 21:
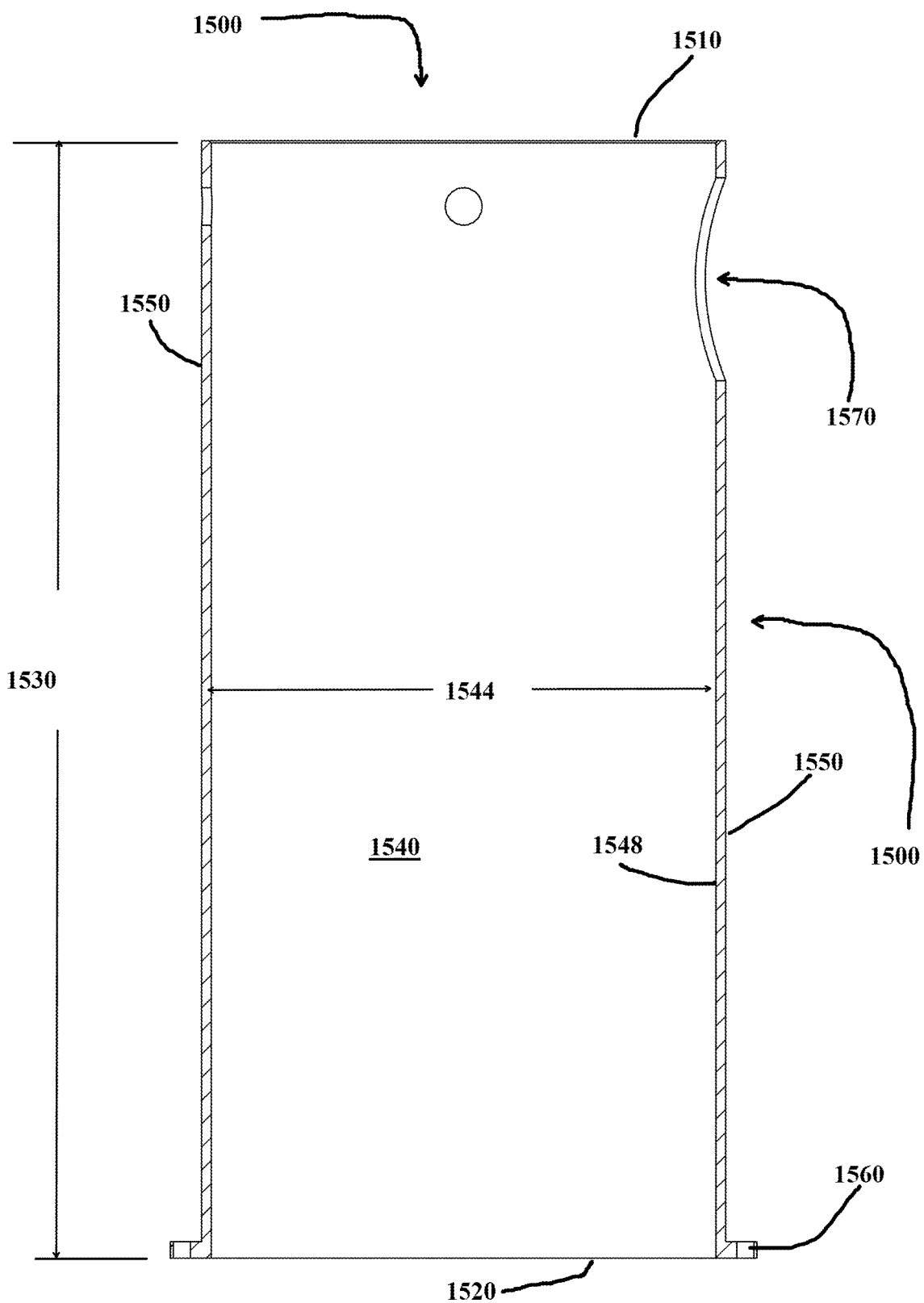
FIG. 21 is a sectional view of the upper tube of FIG. 20 taken along line 21-21.
Figure 22:
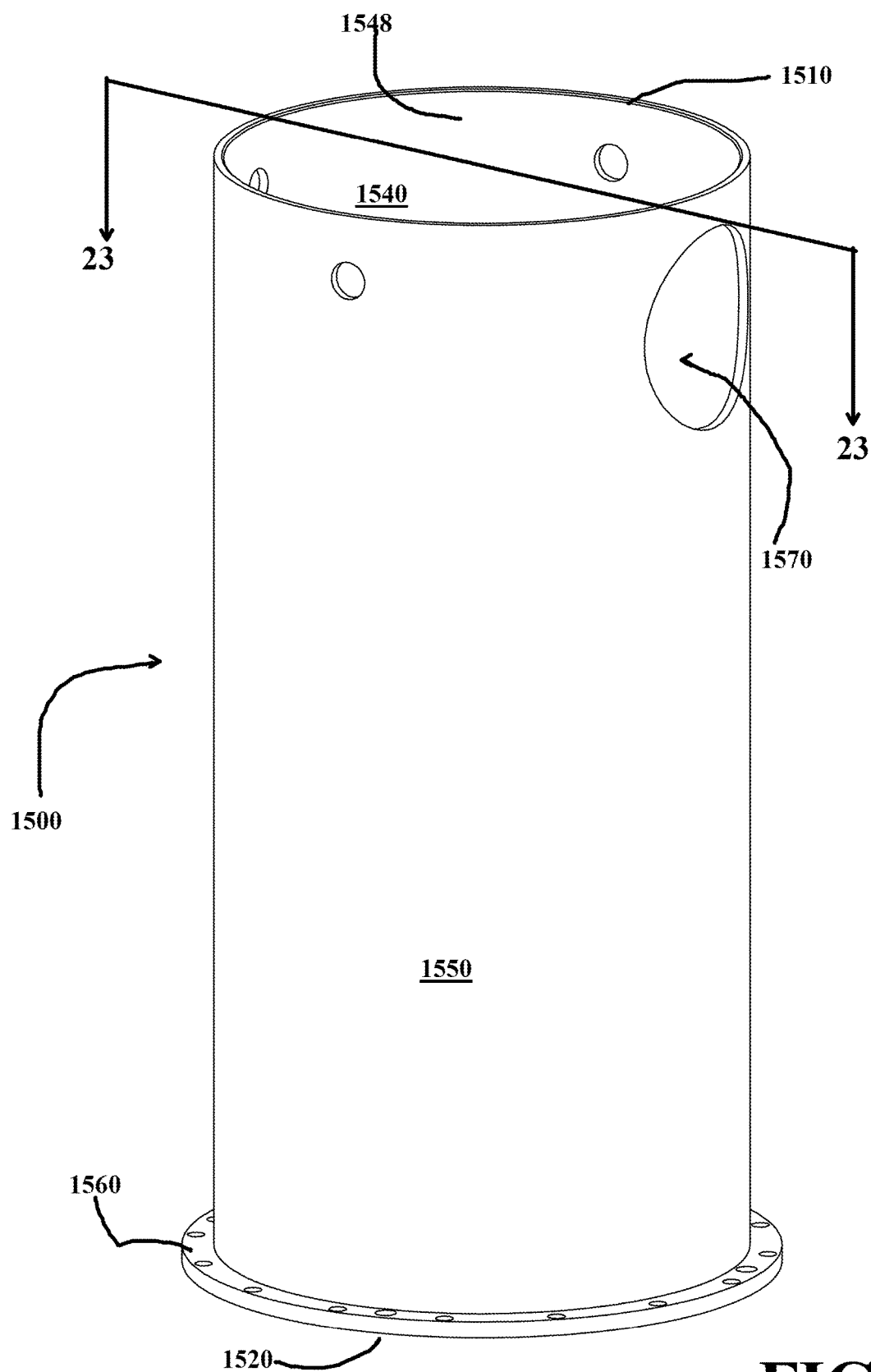
FIG. 22 is a perspective view of the upper tube of FIG. 20.
Figure 23:
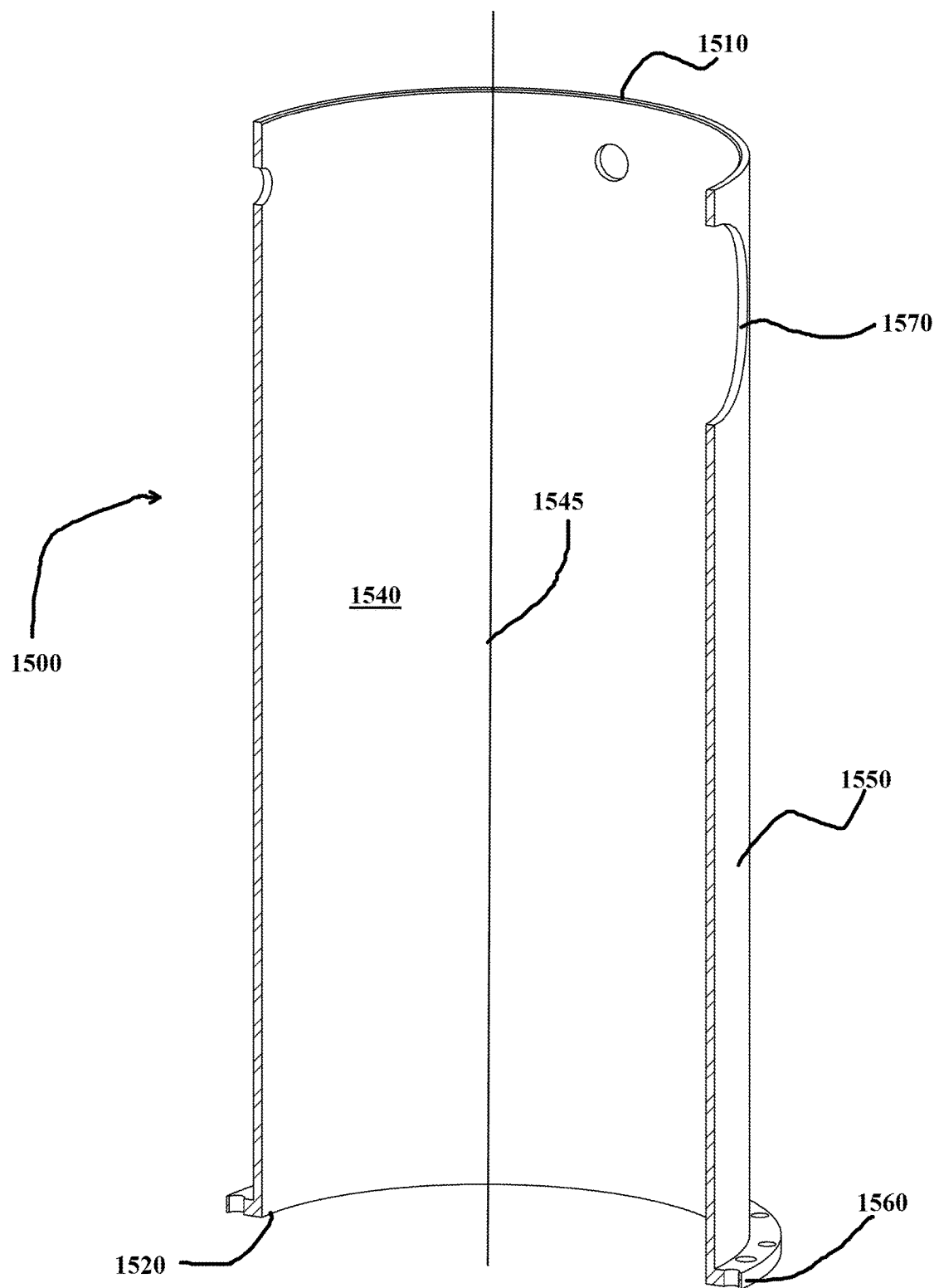
FIG. 23 is a sectional perspective view of the upper tube of FIG. 22 taken along line 23-23.
Figure 24:
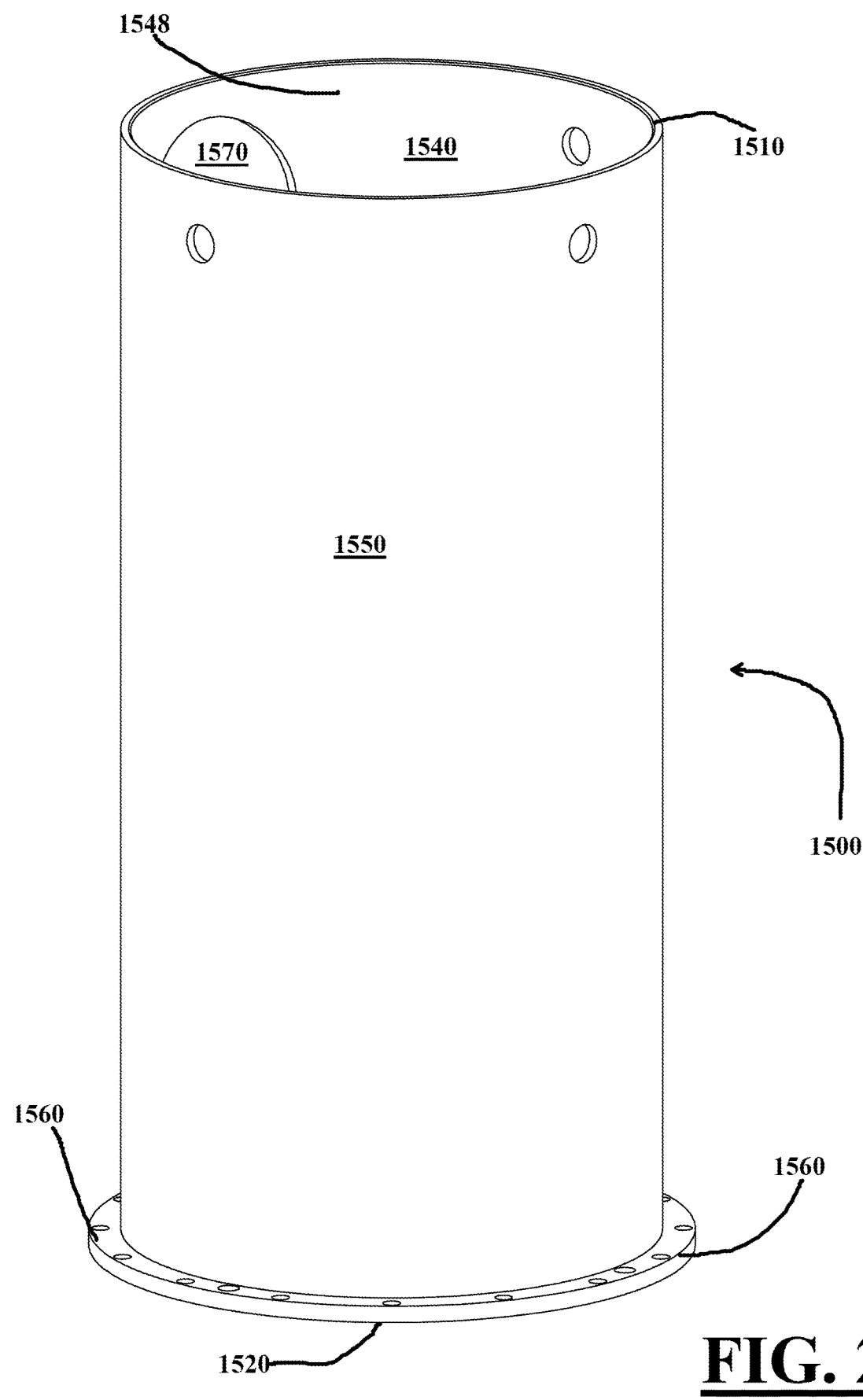
FIG. 24 is a perspective view of the upper tube of FIG. 22 rotated along its longitudinal axis.

FIG. 20 is a front view of an upper tube 1500 which can be used with the modular hydrocyclone body 600 and hydrocyclone insert 1000. FIG. 21 is a sectional view of the upper tube 1500 taken along line 21-21. FIG. 22 is a perspective view of the upper tube 1500. FIG. 23 is a sectional perspective view of the upper tube 1500 taken along line 23-23. FIG. 24 is a perspective view of the upper tube 1500 rotated along its longitudinal axis compared to FIG. 22.

Upper tube 1500 can comprise first end 1510, second end 1520 and interior bore 1540 between first and second ends with exterior wall 1550 and exterior diameter 1534. Interior bore 1540 can be generally cylindrical with sidewall 1548 and have diameter 1544 and longitudinal axis 1545. Opening 1570 is fluidly connected to interior bore 1540. At second end 1520 can be flange 1560.

Figure 25:
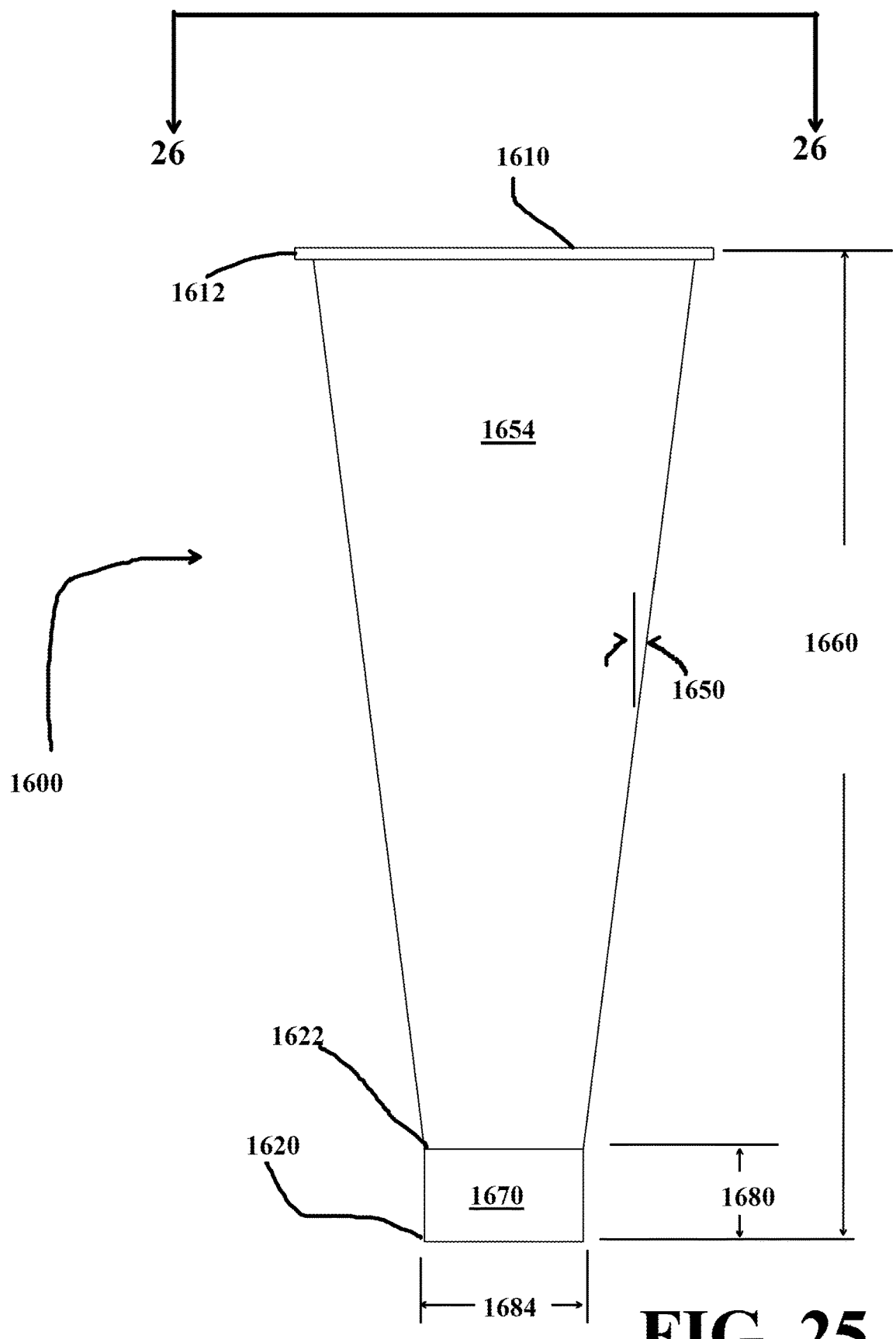
FIG. 25 is a front view of a lower conical tube which can be used with the modular hydrocyclone body of FIG. 9 and the upper tube of FIG. 20.
Figure 26:
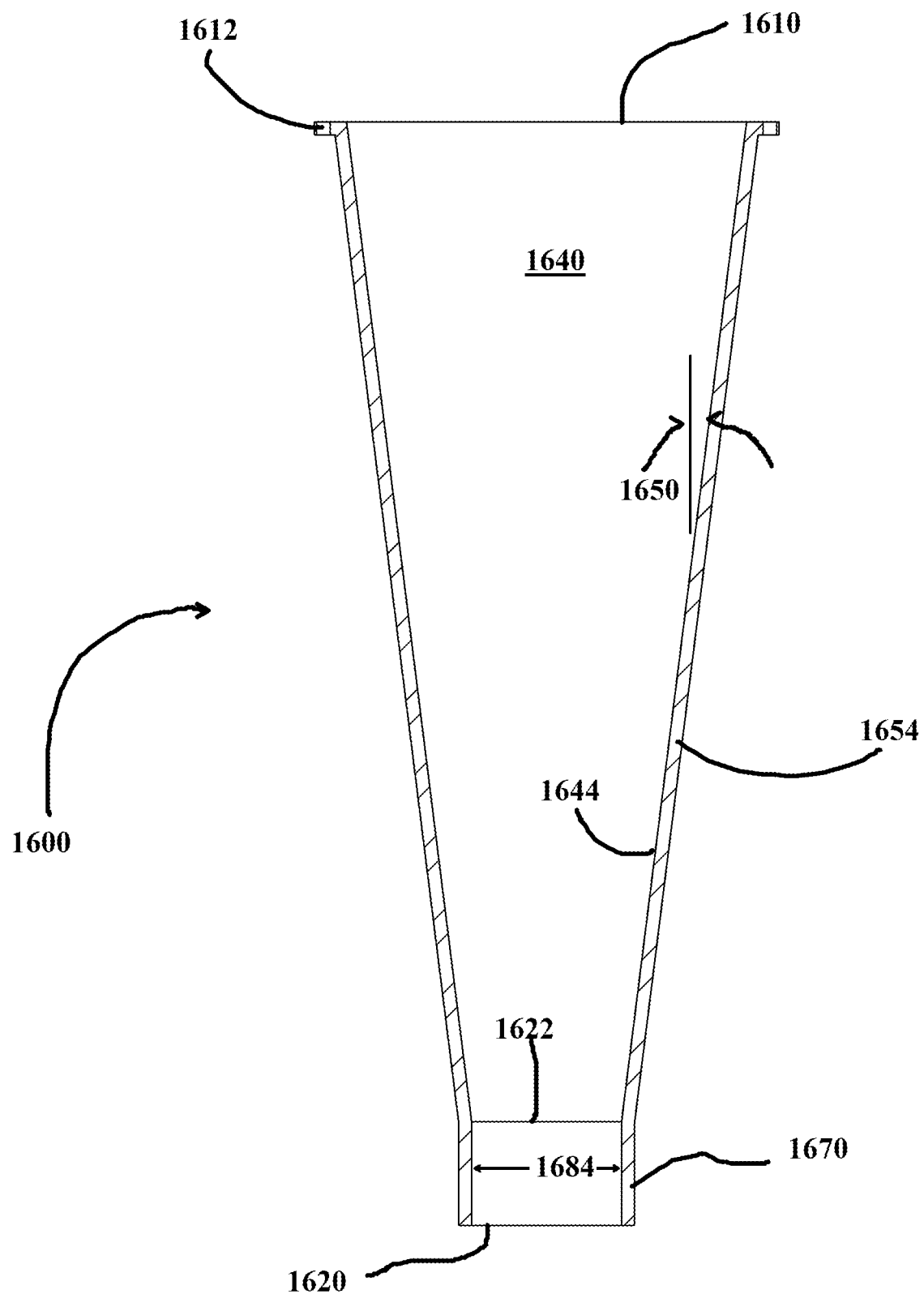
FIG. 26 is a sectional view of the lower conical tube of FIG. 25 taken along line 26-26.
Figure 27:
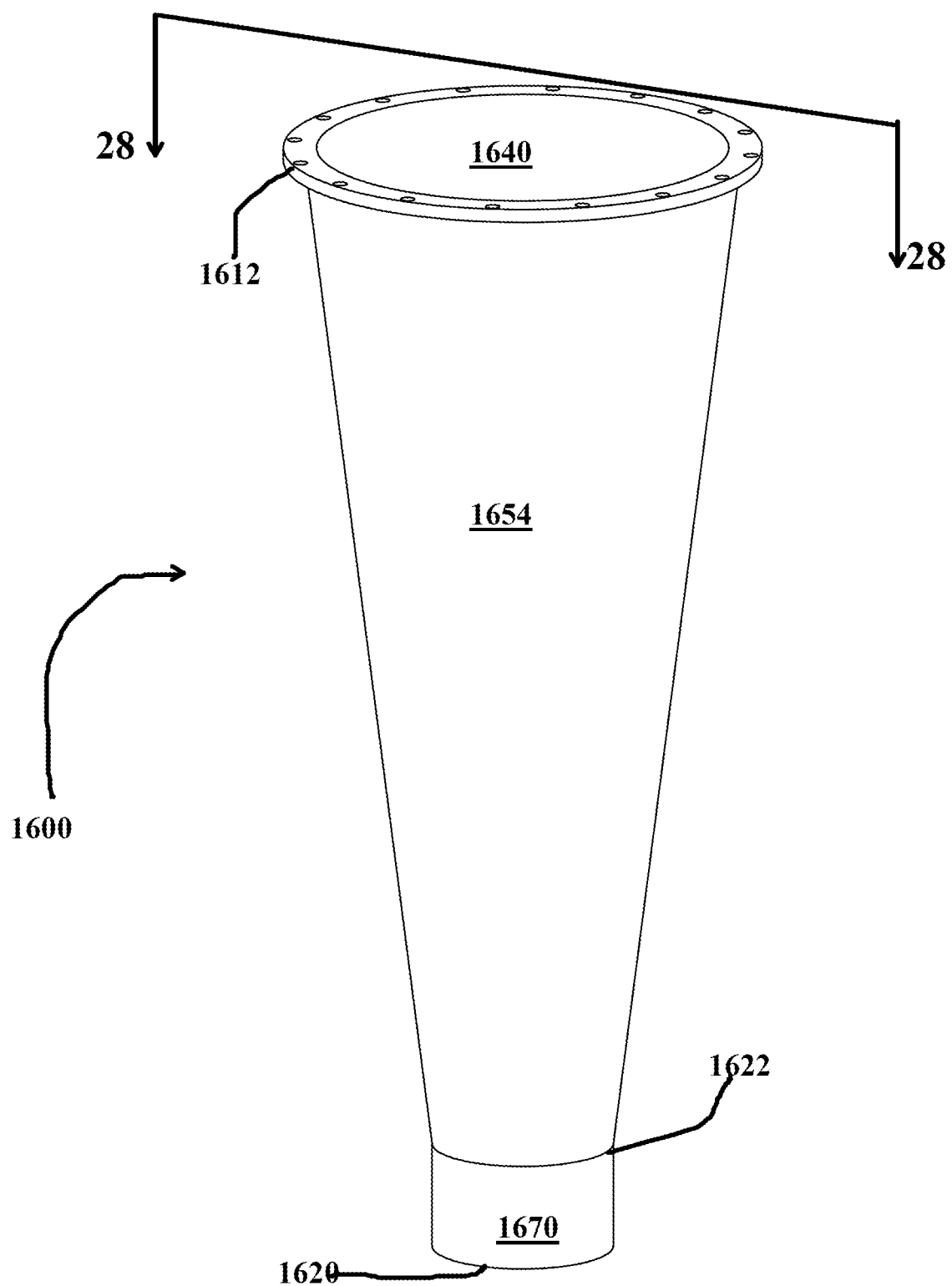
FIG. 27 is a perspective view of the lower conical tube of FIG. 25.
Figure 28:
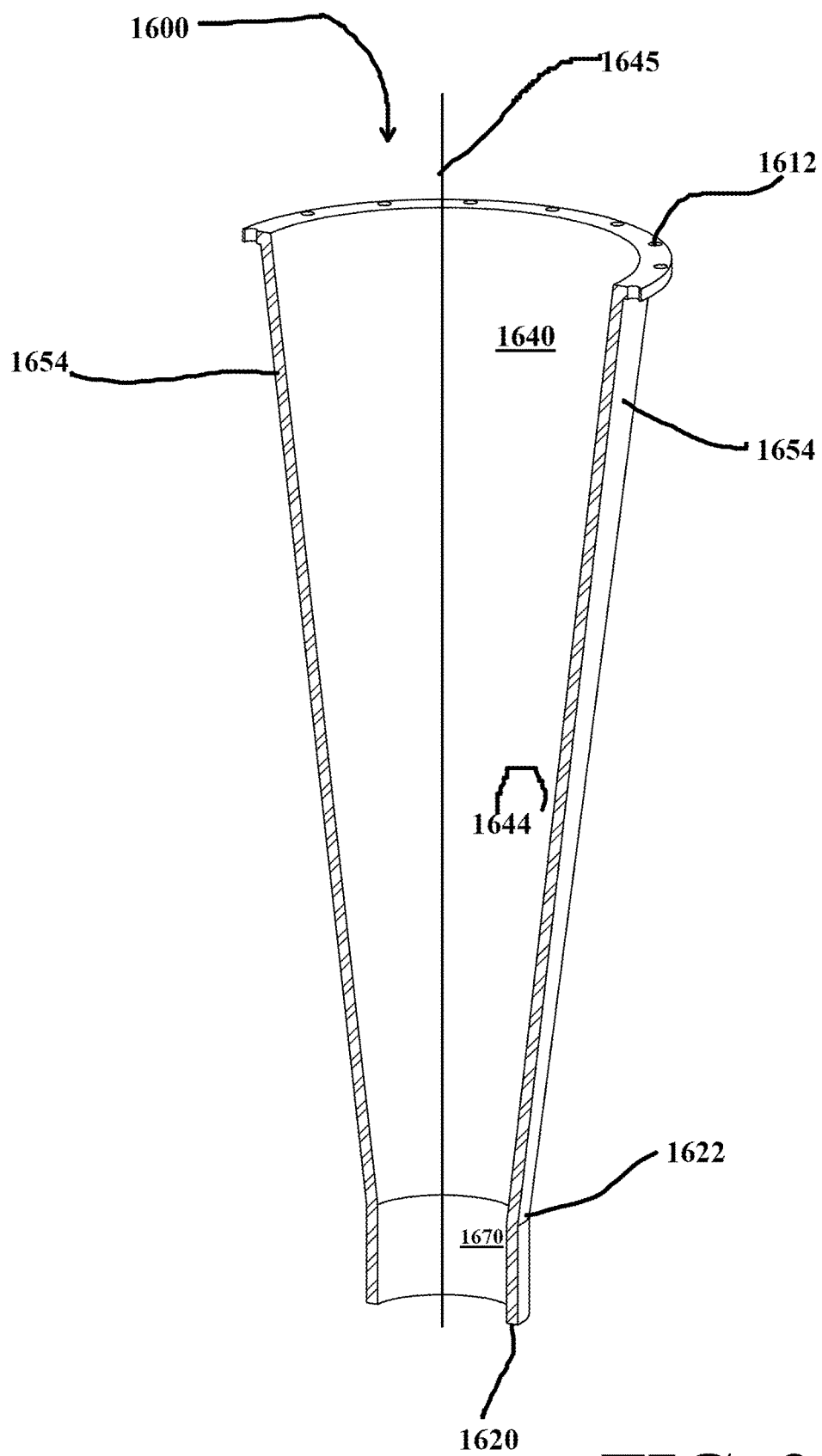
FIG. 28 is a sectional perspective view of the lower conical tube of FIG. 27 taken along line 28-28.

FIG. 25 is a front view of a lower conical tube 1600 which can be used with with the modular hydrocyclone body 600 and hydrocyclone insert 1000. FIG. 26 is a sectional view of the lower conical tube of 1600 taken along line 26-26. FIG. 27 is a perspective view of the lower conical tube 1600. FIG. 28 is a sectional perspective view of the lower conical tube 1600 taken along line 28-28.

Lower conical tube 1600 can comprise first end 1610, second end 1620 and tapered interior bore 1640 between first 1610 and second 1620 ends. Tapered interior bore 1640 can be generally frustoconical with sloped sidewall 1644 with a slope 1650 from the vertical and longitudinal axis 1645. At first end 1610 can be flange 1612. At second end 1620 can be cylindrical tube 1670 which has a bore with internal diameter 1684 and is connected to lower conical tube 1600 at joint 1622.

Lower conical tube can have a height 1660, cylindrical tube can have a height 1680.

Upper tube 1500 and lower conical tube 1600 can be detachably connected to each other via a plurality of fasteners using flanges 1560 and 1612 such that the longitudinal axis of each 1545 and 1645 are coincident.

First Embodiment

Figure 5:
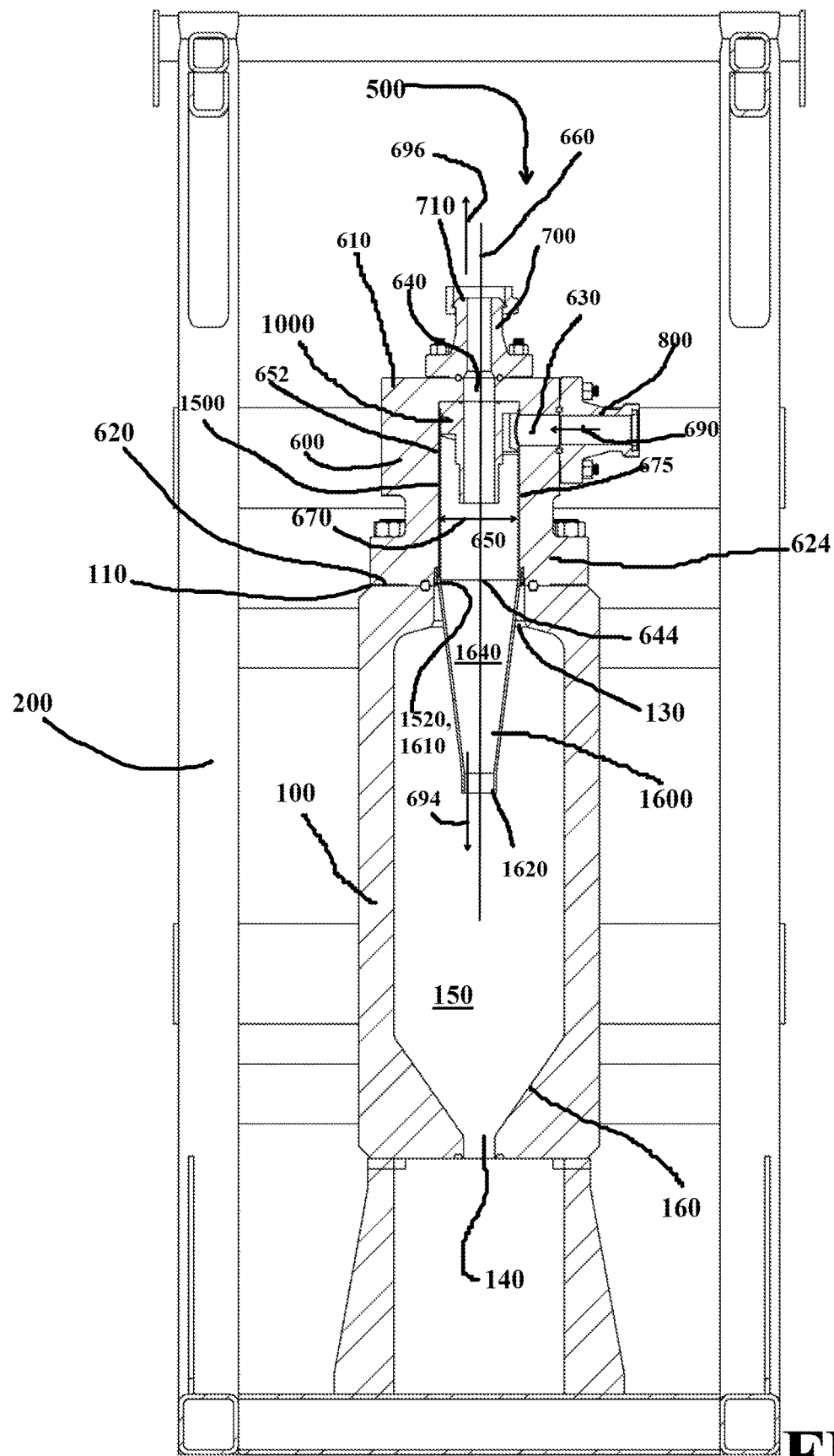
FIG. 5 is a vertical sectional view of the modular/variable hydrocyclone of FIG. 4 taken through lines 5-5 of FIG. 4.
Figure 6:
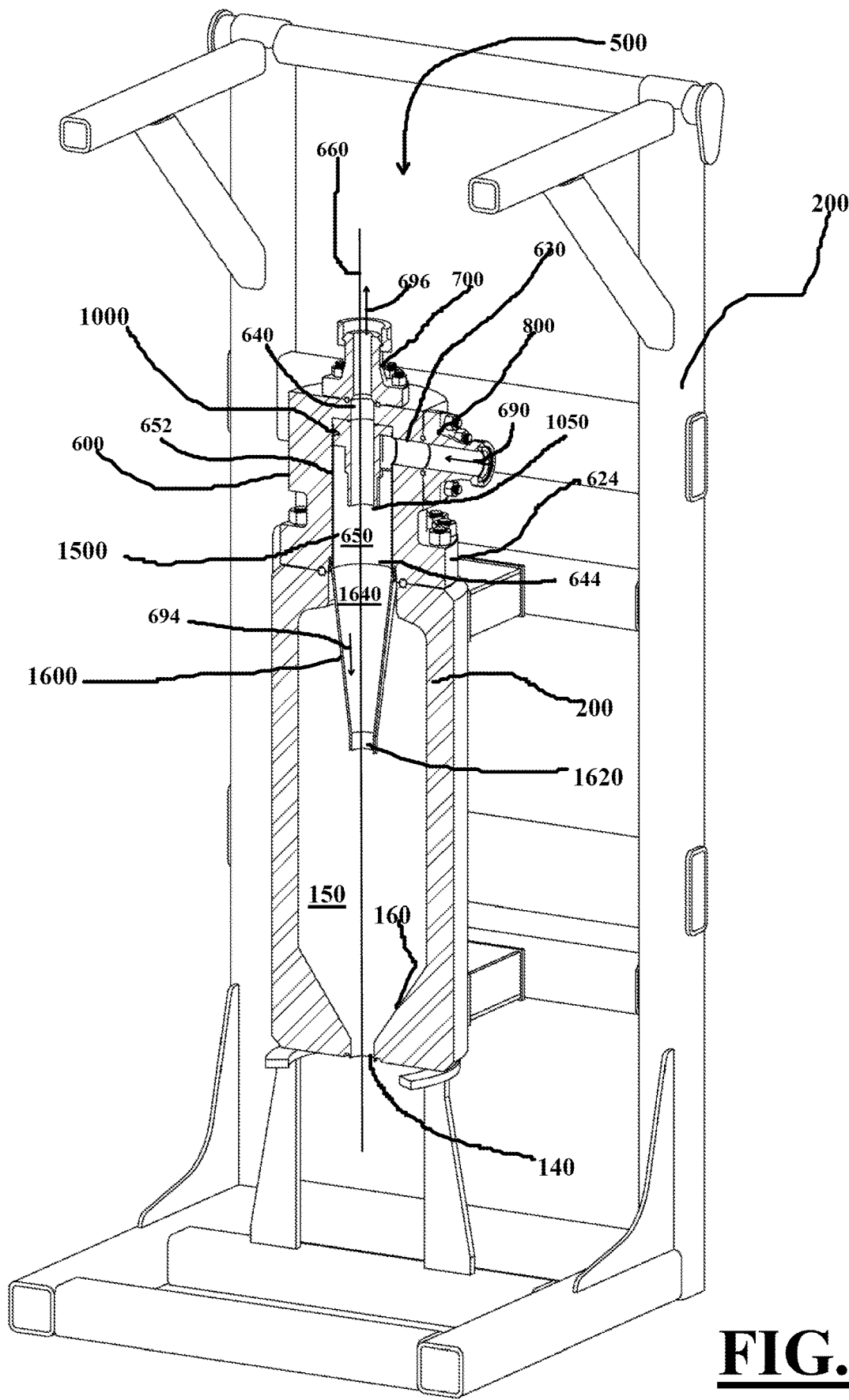
FIG. 6 is a vertical sectional perspective view of the modular/variable hydrocyclone of FIG. 4 taken through lines 5-5 of FIG. 4.

FIG. 3 is an exploded perspective view of the modular/variable hydrocyclone system 500 shown in FIG. 1 with a large diameter hydrocyclone insert 1000 along with a matching upper tube 1500 and lower 1600 conical tube. FIG. 5 is a sectional view of the modular/variable hydrocyclone system 500 of FIG. 3 taken with a vertical plane. FIG. 6 is a sectional perspective view of the modular/variable hydrocyclone system 500 of FIG. 3 taken with a vertical plane.

Large diameter hydrocyclone insert 1000 is inserted into first end 1510 of upper tube 1500 via interior bore 1540 aligning rear wall 1130 with edge of opening 1570.

Diameter 1200 of large diameter hydrocyclone insert 1000 will closely match diameter 1544 of upper tube 1500 to generally create a fluid tight seal between the two parts causing flow to go through helical flow pathway/channel.

Lower conical tube 1600 is connected to upper tube 1500, and upper tube 1500 with hydrocyclone insert 1000 are inserted into bore 650 of body 600 via second end 620 such that the longitudinal axis 660 of bore 650 is coincident with longitudinal axis 1545 of upper tube 1500, longitudinal axis 1645 of lower conical section 1600, and longitudinal axis 1045 of hydrocyclone insert 1000. Opening 1570 with aligned rear wall 1130 are aligned with inlet 630 of body 600.

Preferably diameter 1534 of upper tube 1500 will closely match diameter 670 of bore 650 to generally create a fluid tight seal between the two parts and avoiding fluid leaks.

Figure 7:
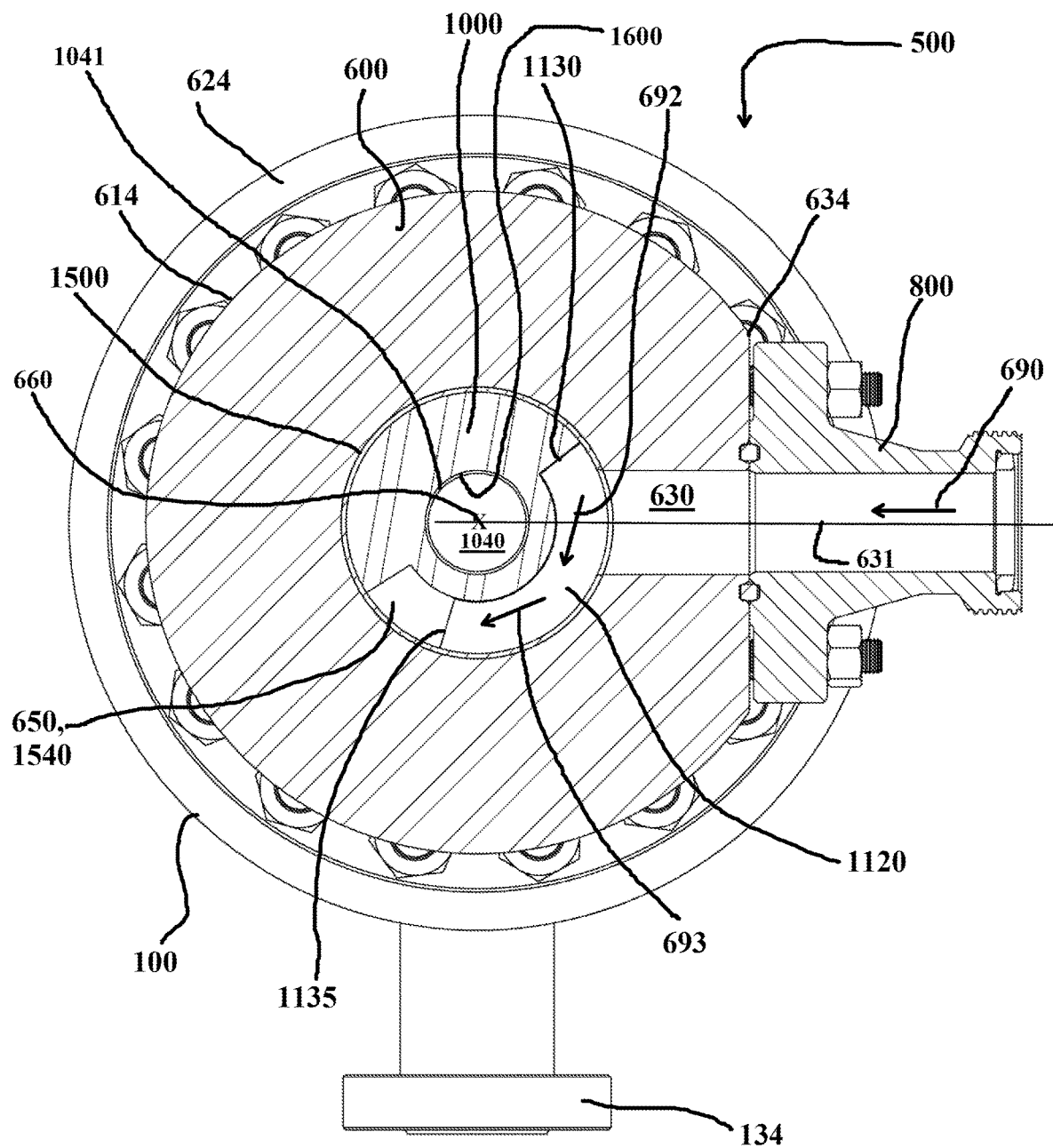
FIG. 7 is a horizontal sectional view of the modular/variable hydrocyclone of FIG. 4 taken through lines 7-7 and looking down.
Figure 8:
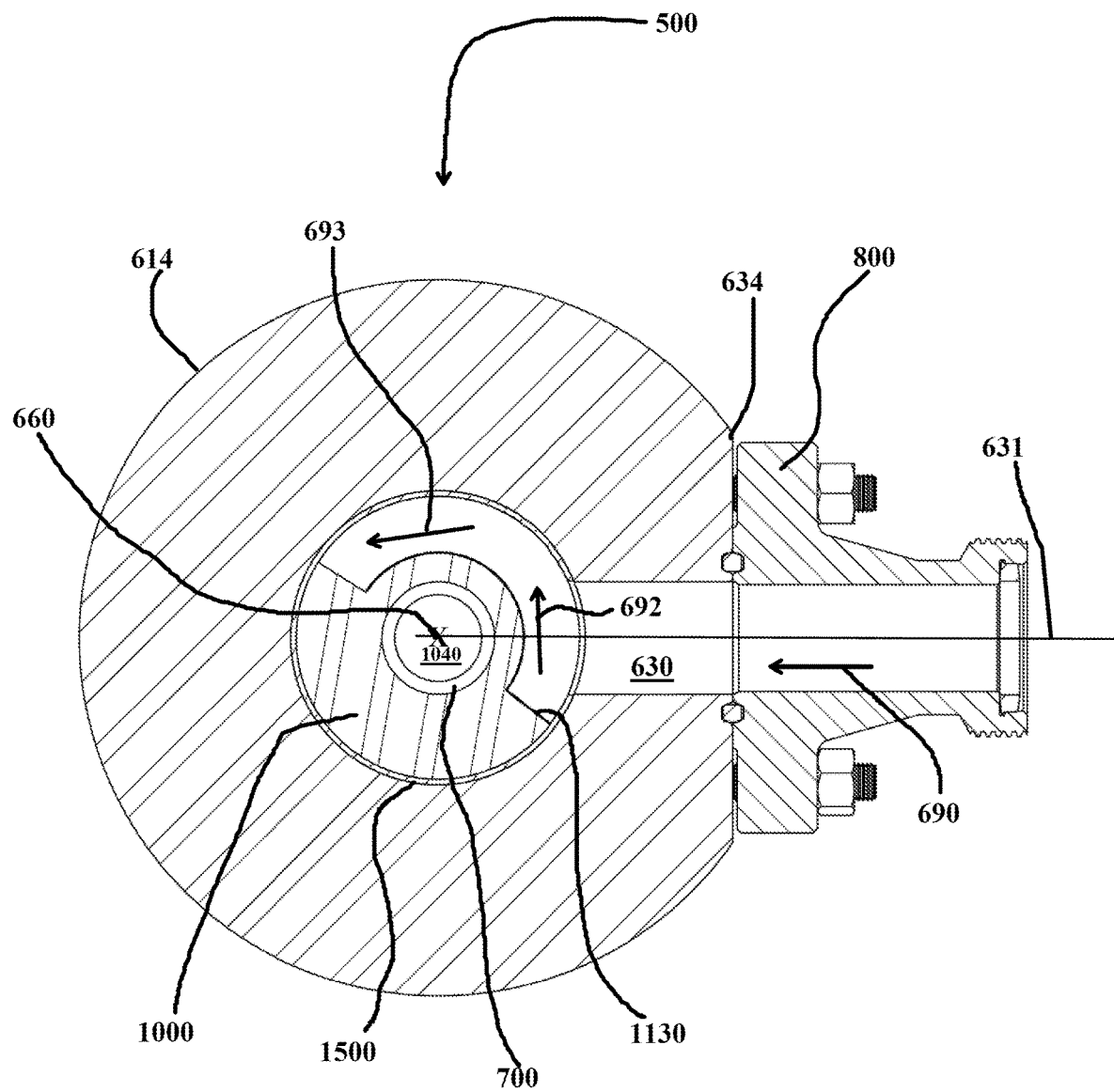
FIG. 8 is a horizontal sectional view of the modular/variable hydrocyclone of FIG. 4 taken through lines 8-8 and looking up.

FIG. 7 is a horizontal sectional view of the modular/variable hydrocyclone 500 taken through lines 7-7 and looking down. FIG. 8 is a horizontal sectional view of the modular/variable hydrocyclone 500 taken through lines 8-8 and looking up. Preferably, longitudinal axis 631 of inlet 630 of body 600 will intersect (or come close to intersecting) with longitudinal axis 660 of bore 650, with longitudinal axis 1545 of upper tube 1500 and longitudinal axis 1645 of lower conical tube 1600. In another embodiment the projection of side inlet 630 intersects with longitudinal axis 660 of internal bore 650.

This intersection between interior bore 650 and inlet 630, and/or longitudinal axes 660 and 631, and/or projection of inlet 630 and longitudinal axis 660 is generally referred to as "axial" flow as compared to flow from a bore whose extension would not intersect the longitudinal axes 660 of bore 650 of body 600, but is generally directed to enter very close if not tangentially intersecting sidewall 652 where sidewall 652 generally redirects/changes the direction of flow which redirection/changing generally causes wear in said sidewall.

Second Embodiment

Figure 29:
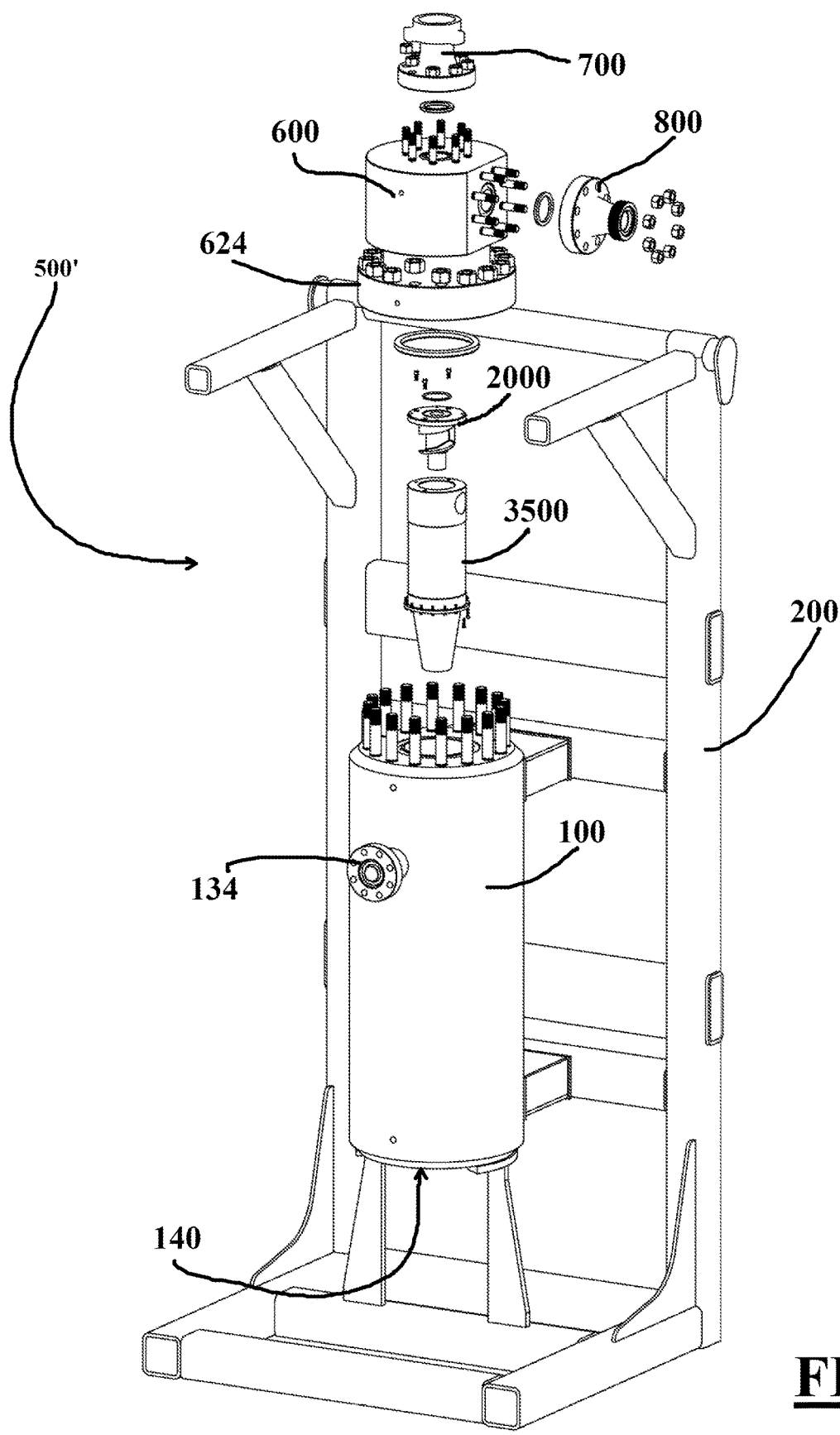
FIG. 29 is an exploded perspective view of the modular/variable hydrocyclone shown in FIG. 1 with a small diameter hydrocyclone insert along with a matching single piece upper and lower conical tube.
Figure 30:
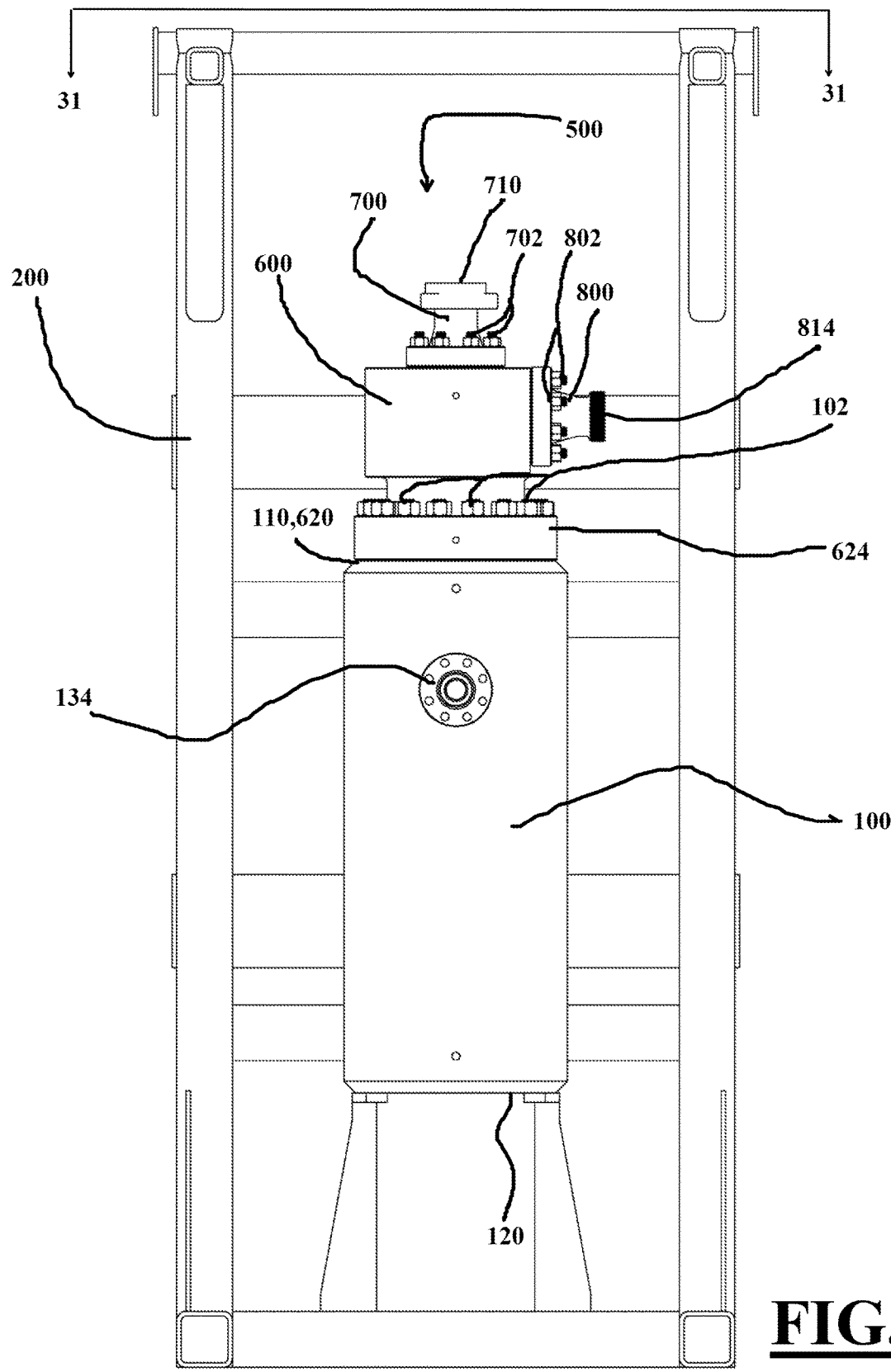
FIG. 30 shows a front view of the exterior of a modular/variable hydrocyclone used with the embodiments of FIGS. 29 and 31-42.
Figure 31:
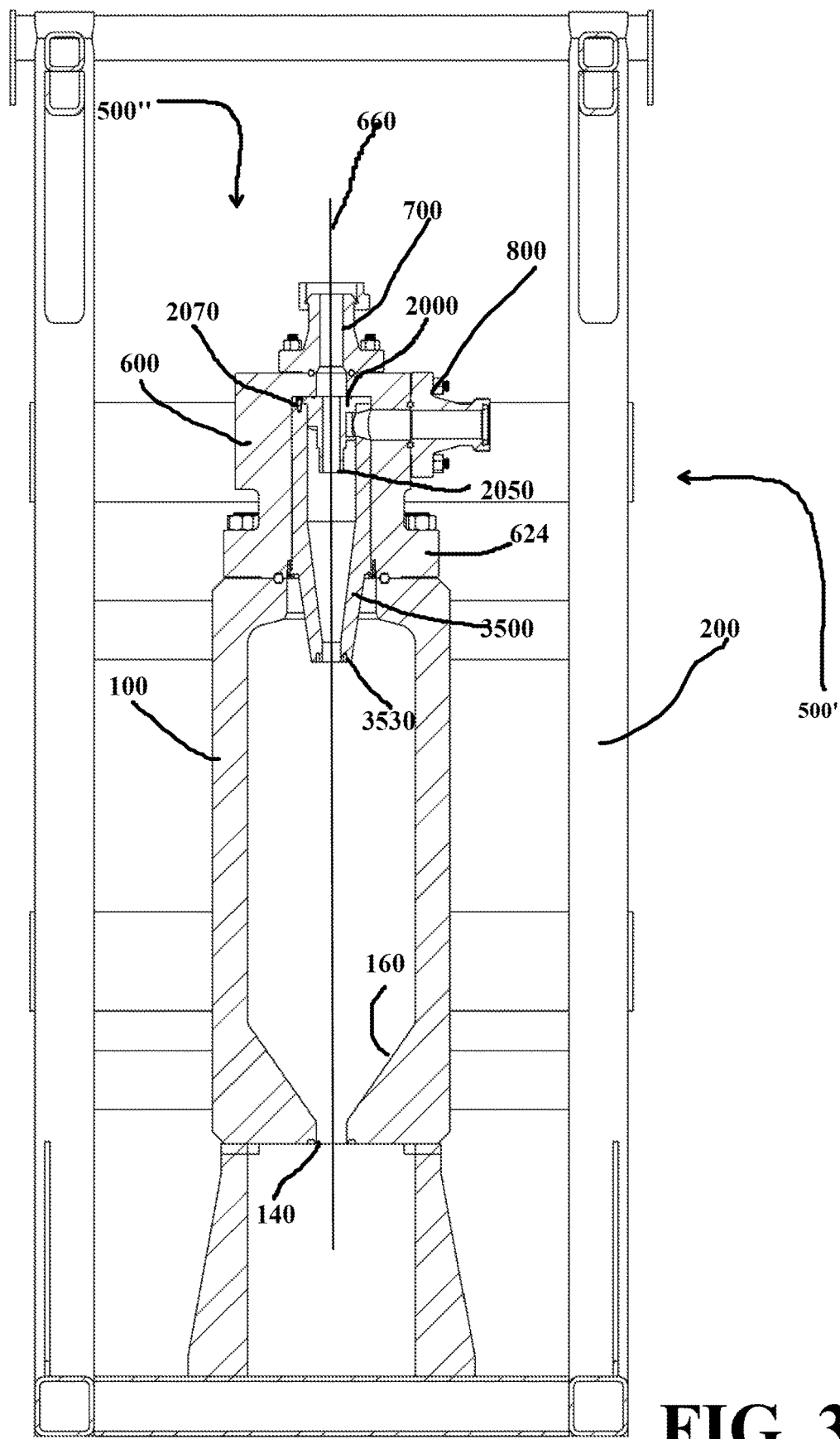
FIG. 31 is a vertical sectional view of the modular/variable hydrocyclone of FIG. 30 taken through lines 31-31.
Figure 32:
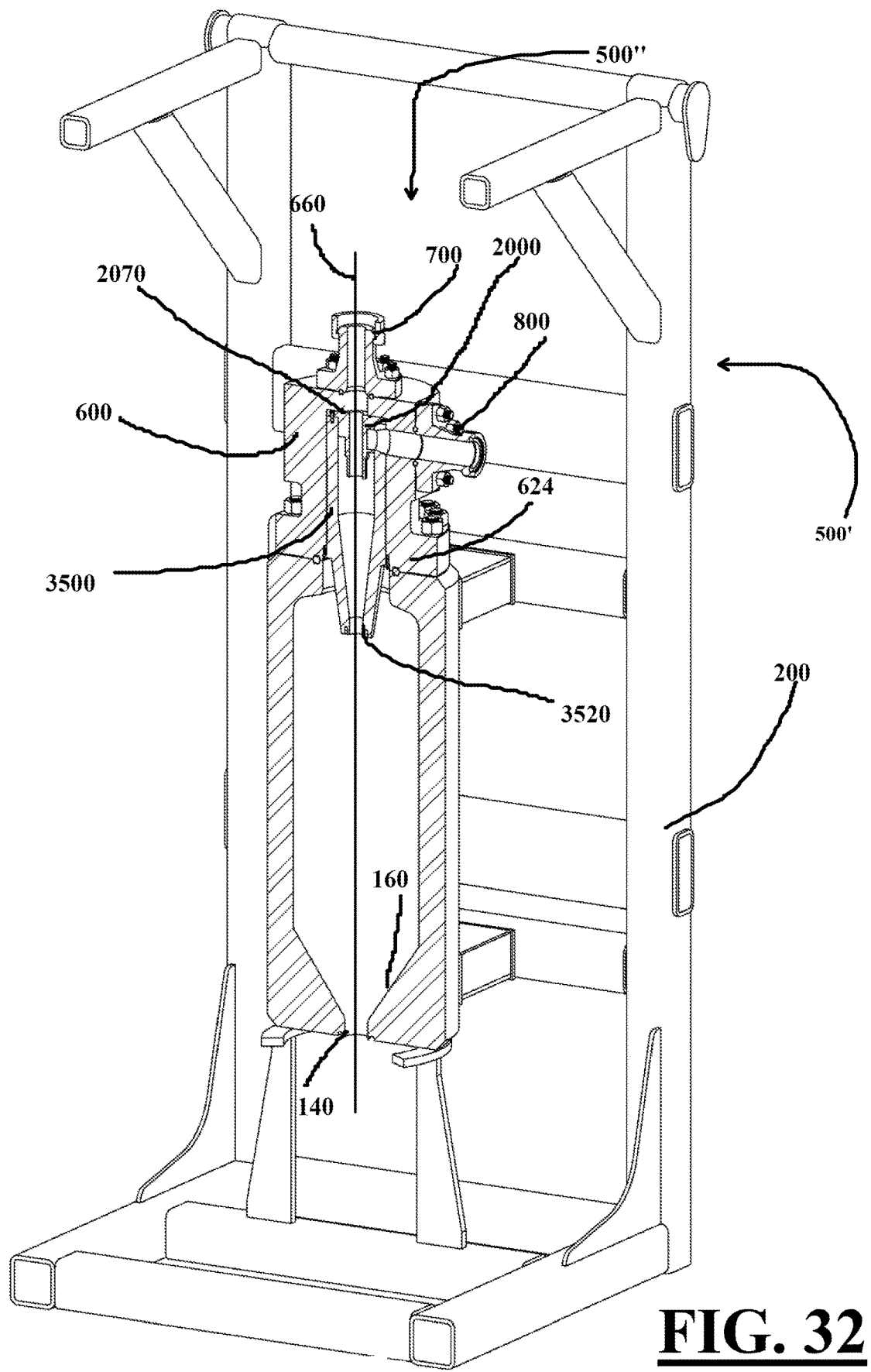
FIG. 32 is a vertical sectional perspective view of the modular/variable hydrocyclone of FIG. 30 taken through lines 31-31.

FIG. 29 is an exploded perspective view of the modular/variable hydrocyclone system 500' shown in FIG. 1 with a small diameter hydrocyclone insert 2000 along with a matching combination tube with conical section 3500. FIG. 31 is a sectional view of the modular/variable hydrocyclone system 500' taken with a vertical plane. FIG. 32 is a sectional perspective view of the modular/variable hydrocyclone system 500' taken with a vertical plane.

Small diameter hydrocyclone insert 2000 is inserted into first end 3510 of tube 3500 via interior bore 3540 aligning rear wall 2130 with opening 3570.

Diameter 2200 of small diameter hydrocyclone insert 2000 will closely match diameter 3544 of tube 3500 to generally create a fluid tight seal between the two parts causing flow to go through helical flow pathway/channel.

Tube 3500 with hydrocyclone insert 2000 are inserted into bore 650 of body 600 via second end 620. Opening 3570 with aligned rear wall 2130 are aligned with opening bore 630 of body 600.

Preferably exterior diameter 3534 of tube 3500 will closely match diameter 670 of bore 650 to generally create a fluid tight seal between the two parts and avoiding fluid leaks.

Figure 33:
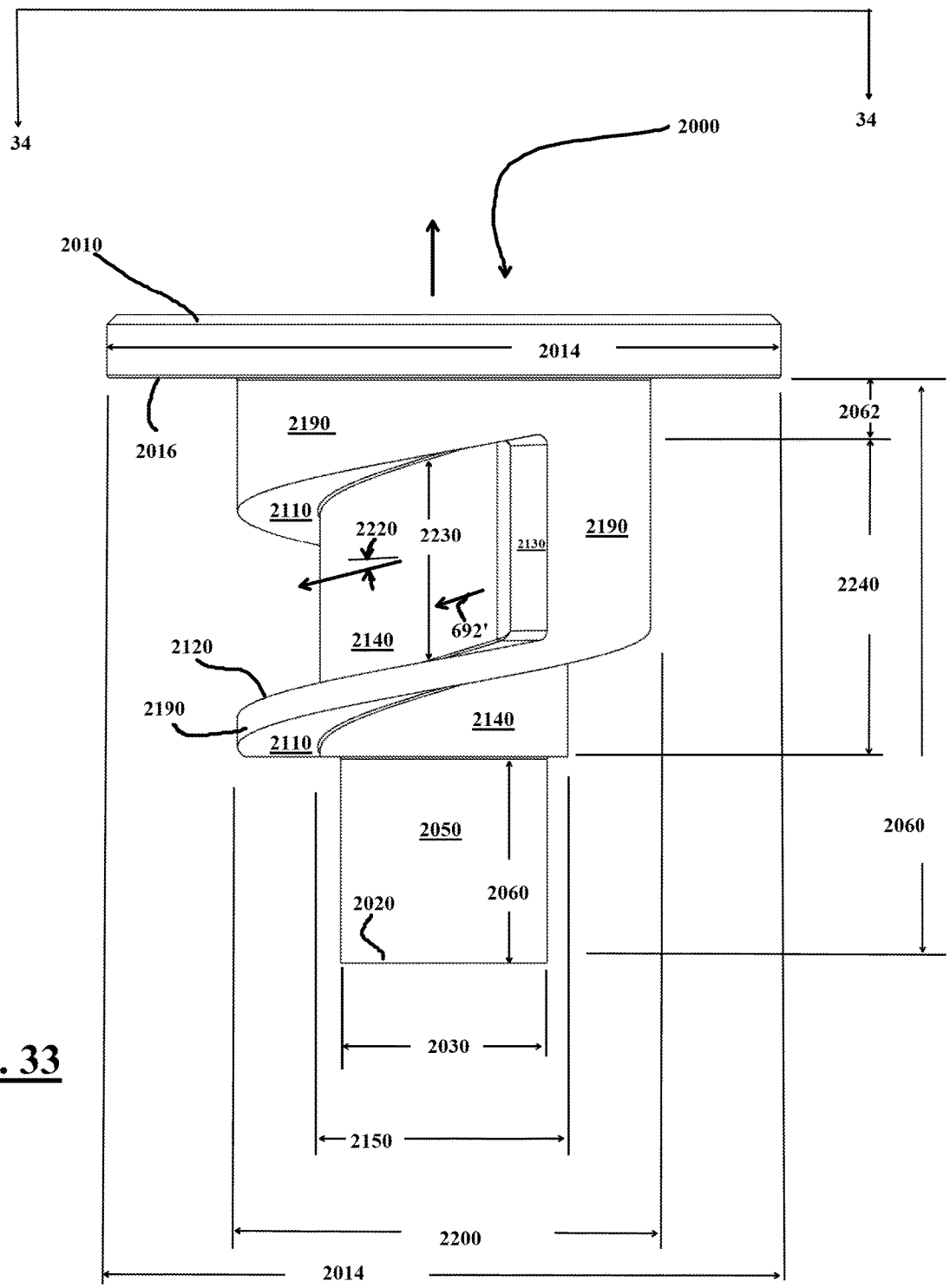
FIG. 33 is a front view of an alternative small diameter hydrocyclone insert which can be used with the modular hydrocyclone body of FIG. 9.
Figure 34:
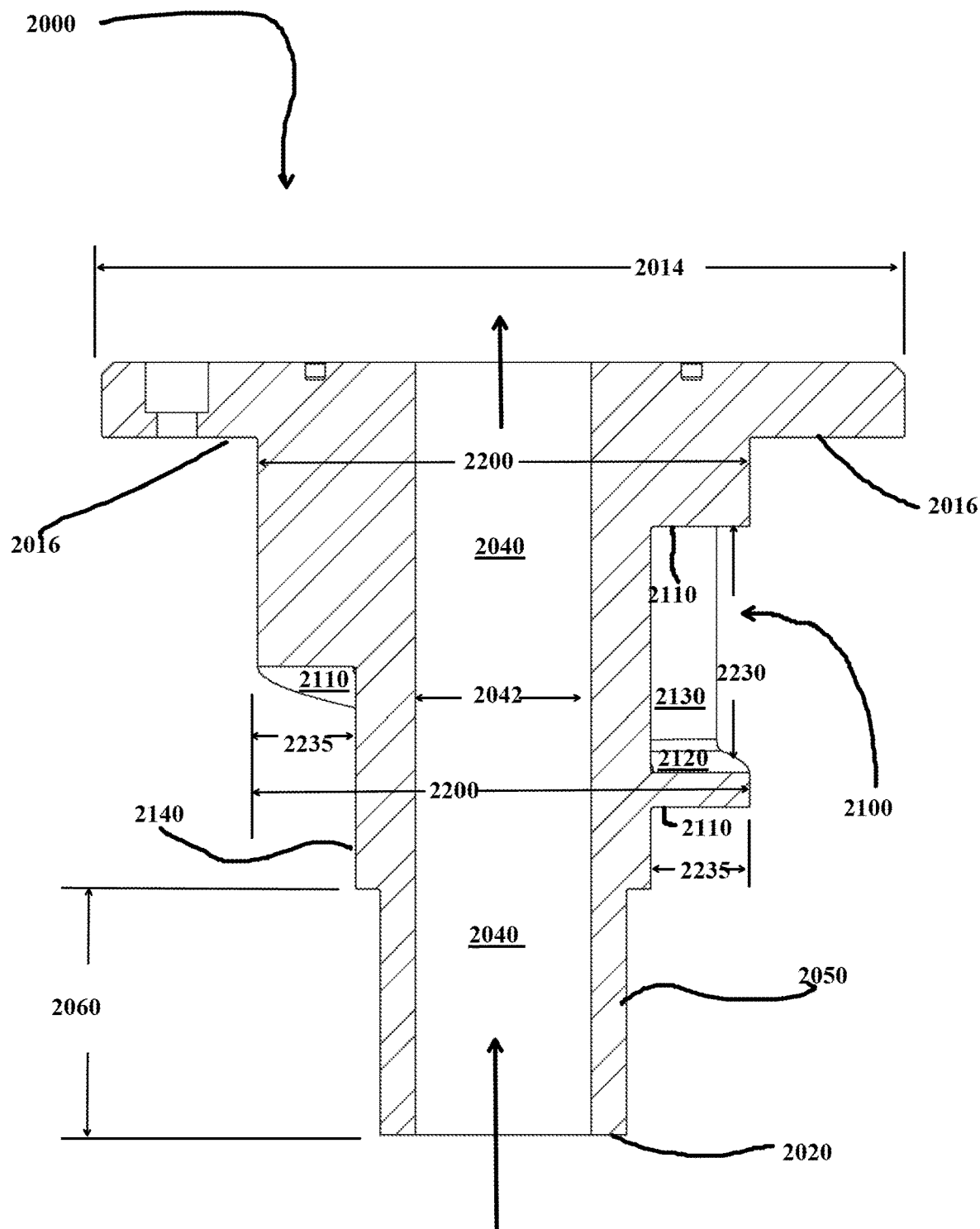
FIG. 34 is a sectional view of the hydrocyclone insert of FIG. 33 taken along line 34-34.
Figure 35:
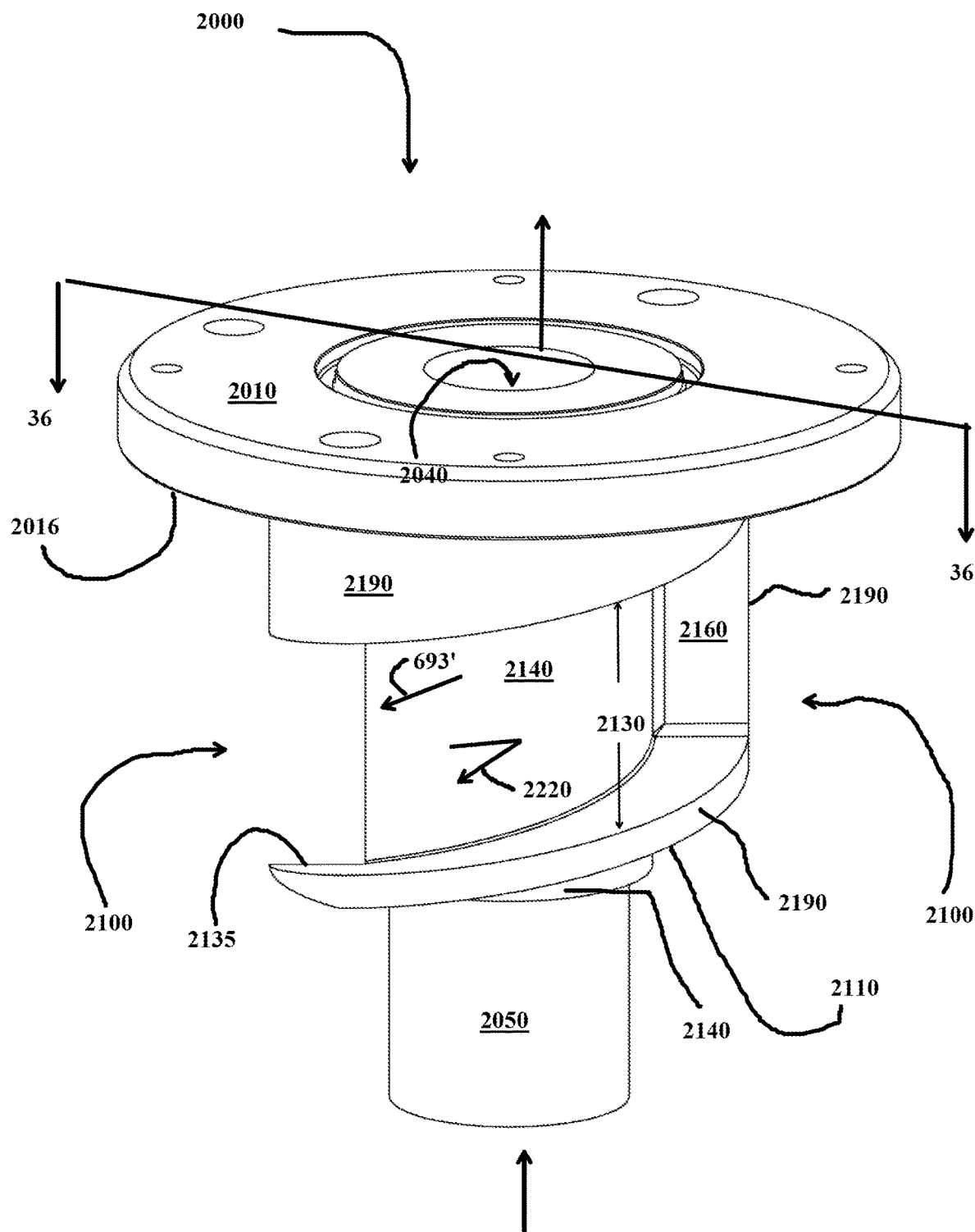
FIG. 35 is a perspective view of the hydrocyclone insert of FIG. 33.
Figure 36:
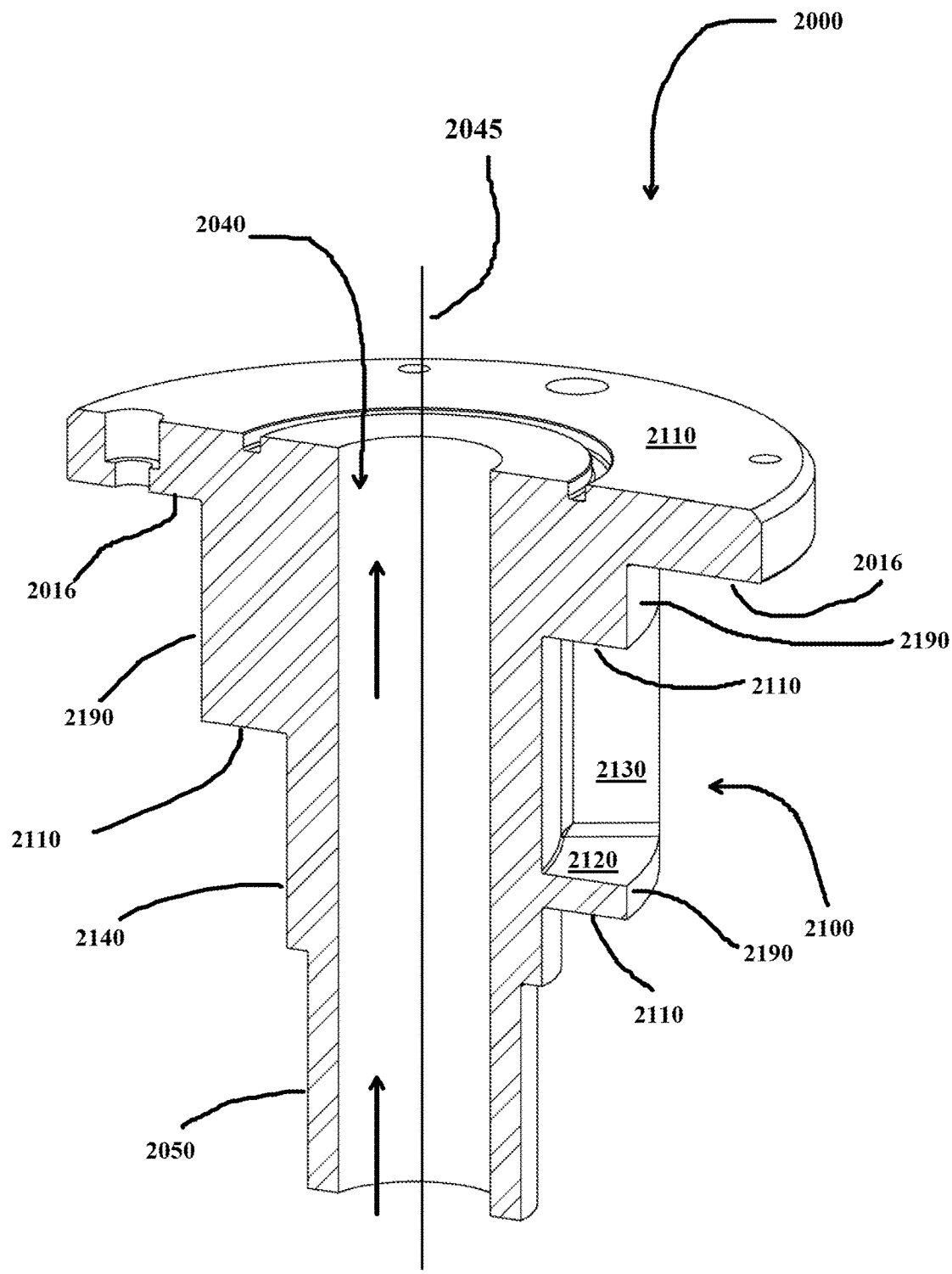
FIG. 36 is a sectional perspective view of the hydrocyclone insert of FIG. 35 taken along line 36-36.
Figure 37:
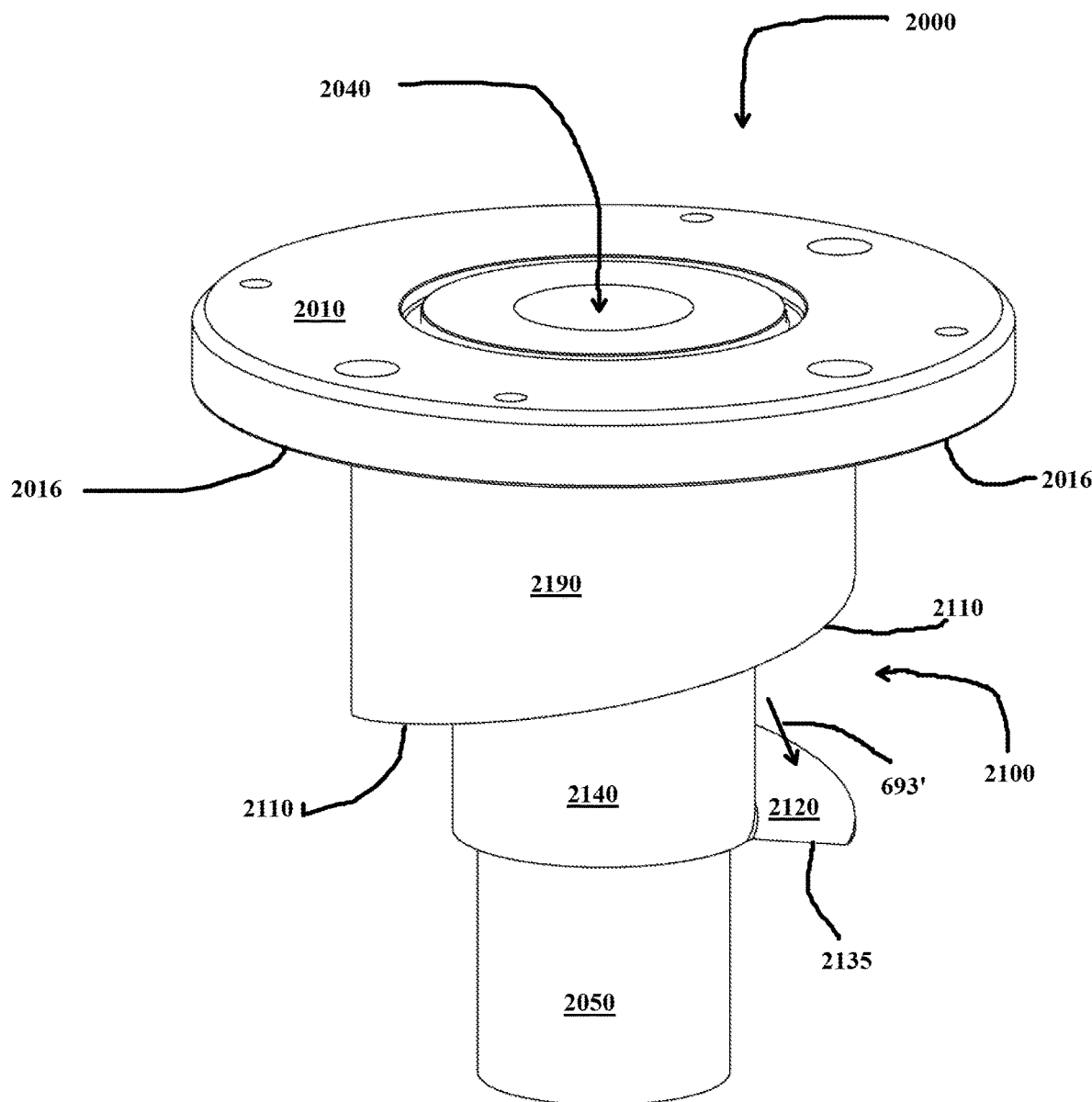
FIG. 37 is a perspective view of the hydrocyclone insert of FIG. 35 rotated along its longitudinal axis.

FIG. 33 is a front view of an alternative small diameter hydrocyclone insert 2000 which can be used with the modular hydrocyclone body 600 along with a matching single piece upper and lower conical tube 3600. FIG. 34 is a sectional view of the hydrocyclone insert 2000 taken along line 34-34. FIG. 35 is a perspective view of the hydrocyclone insert 2000. FIG. 36 is a sectional perspective view of the hydrocyclone insert 2000 of FIG. 35 taken along line 36-36. FIG. 37 is a perspective view of the hydrocyclone insert 2000 of FIG. 33 rotated along its longitudinal axis compared to the view shown in FIG. 33.

Hydrocyclone insert 2000 can comprises first end 2010, second end 2020, bore 2040 between first and second ends, longitudinal axis 2045 and a helical flow pathway/channel 2100.

Helical flow pathway/channel 2100 generally has a slope or pitch 2220 and is bounded by upper wall 2110, lower wall 2120, interior surface 2140, and rear wall 2130. The width of helical flow pathway/channel 2100 is generally the difference between dimension 2200 and 2150 divided by two. The depth 2230 or height of helical pathway/channel 2000 is between upper wall 2110 and lower wall 2120.

Bore 2040 can be generally cylindrical and have a diameter of 2042.

Second end 2020 can have a diameter of 2030.

The depth 2230 or height of helical pathway/channel 2000 is between upper wall 2110 and lower wall 2120.

Figure 38:
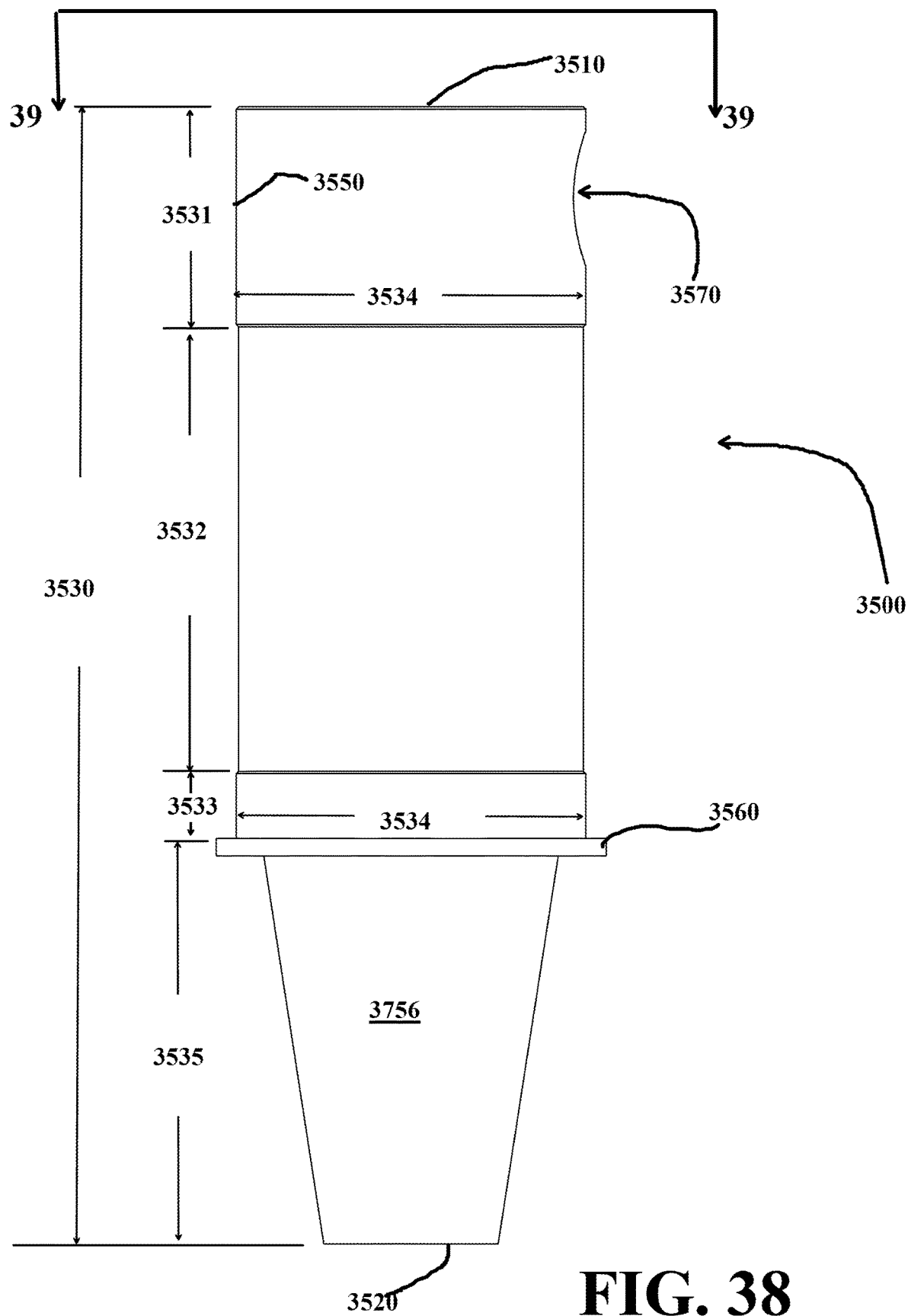
FIG. 38 is a front view of a combination upper tube lower conical tube which can be used with the modular hydrocyclone body of FIG. 9.
Figure 39:
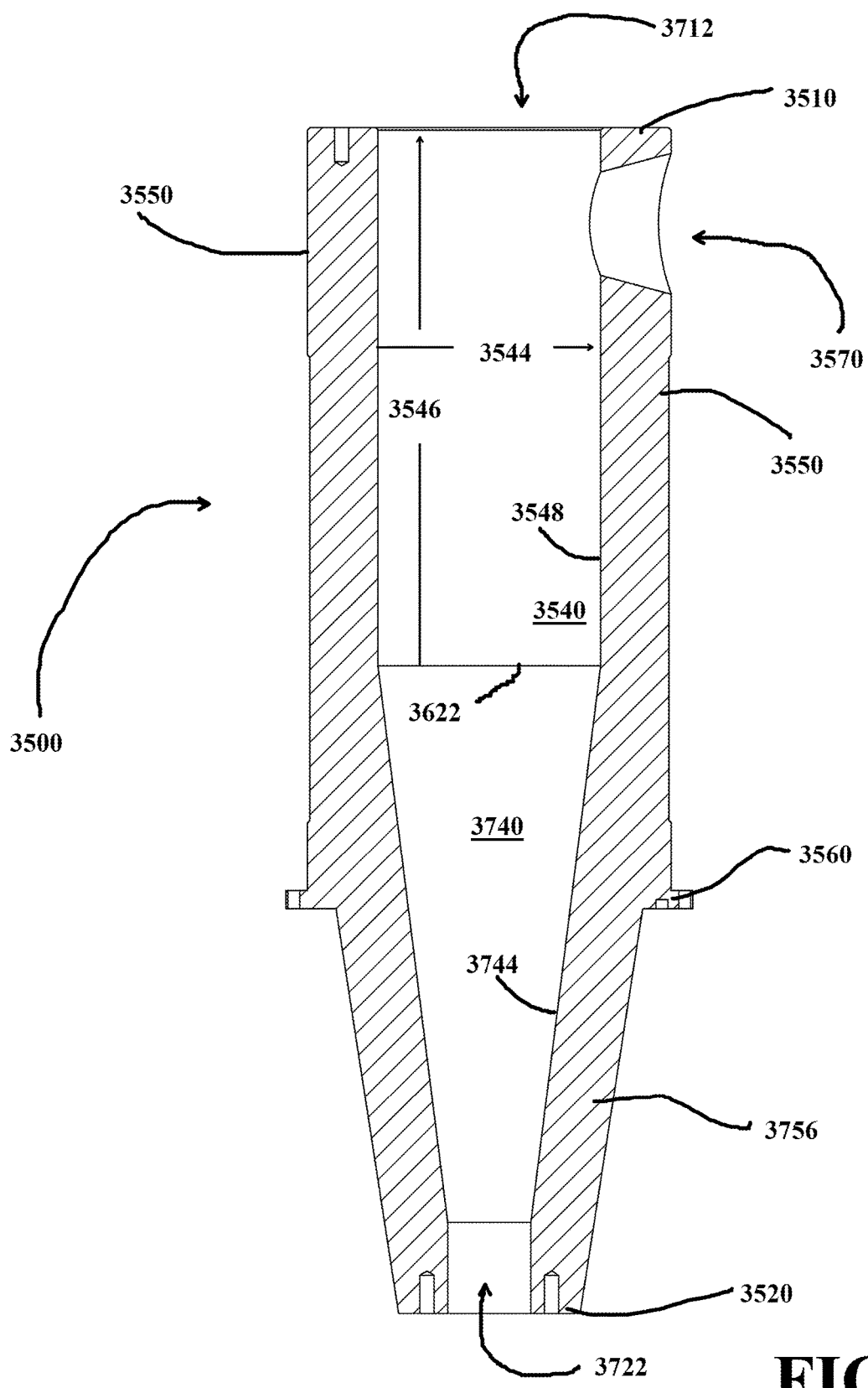
FIG. 39 is a sectional view of the combination upper tube lower conical tube of FIG. 38 taken along line 39-39.
Figure 40:
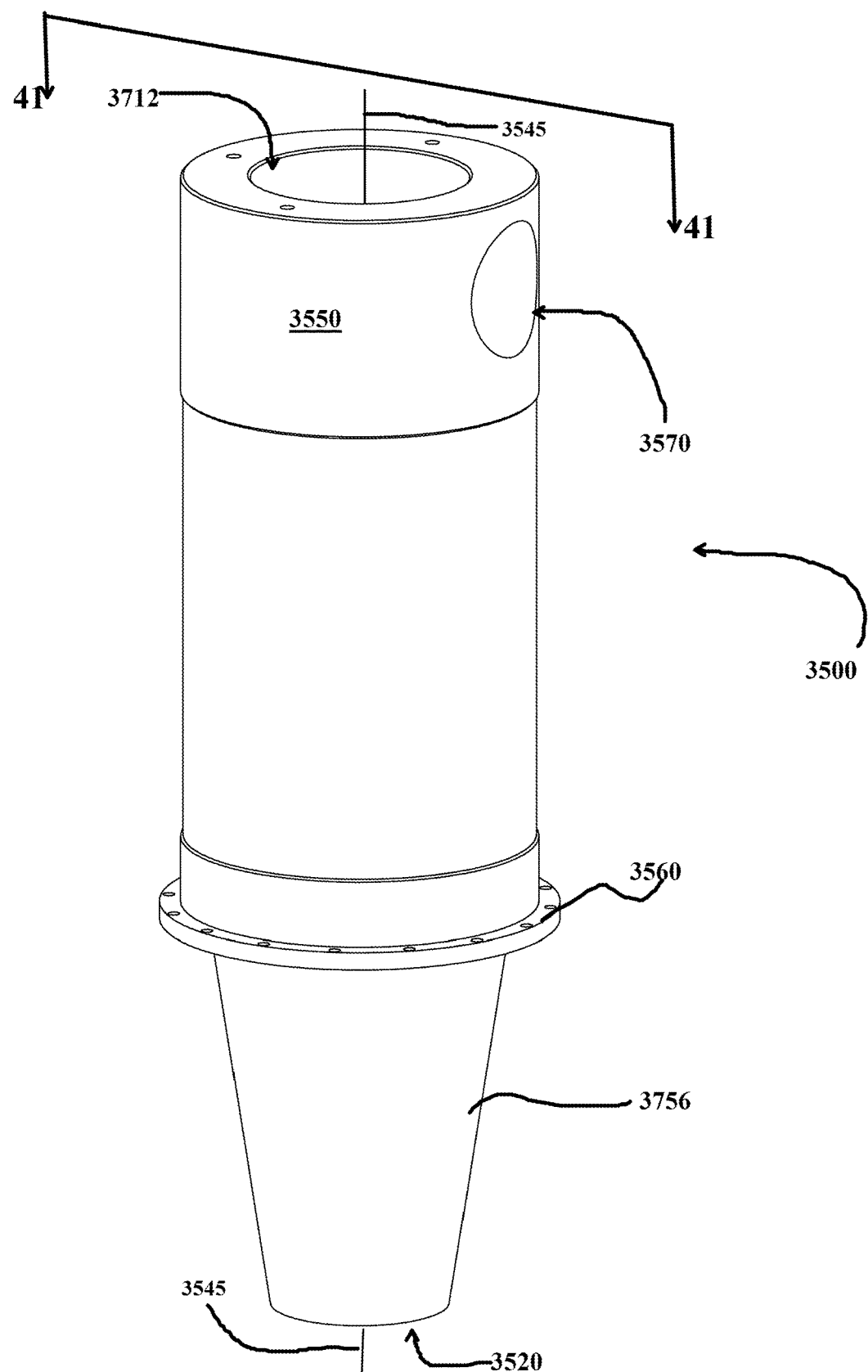
FIG. 40 is a perspective view of the combination upper tube lower conical tube of FIG. 38.
Figure 41:
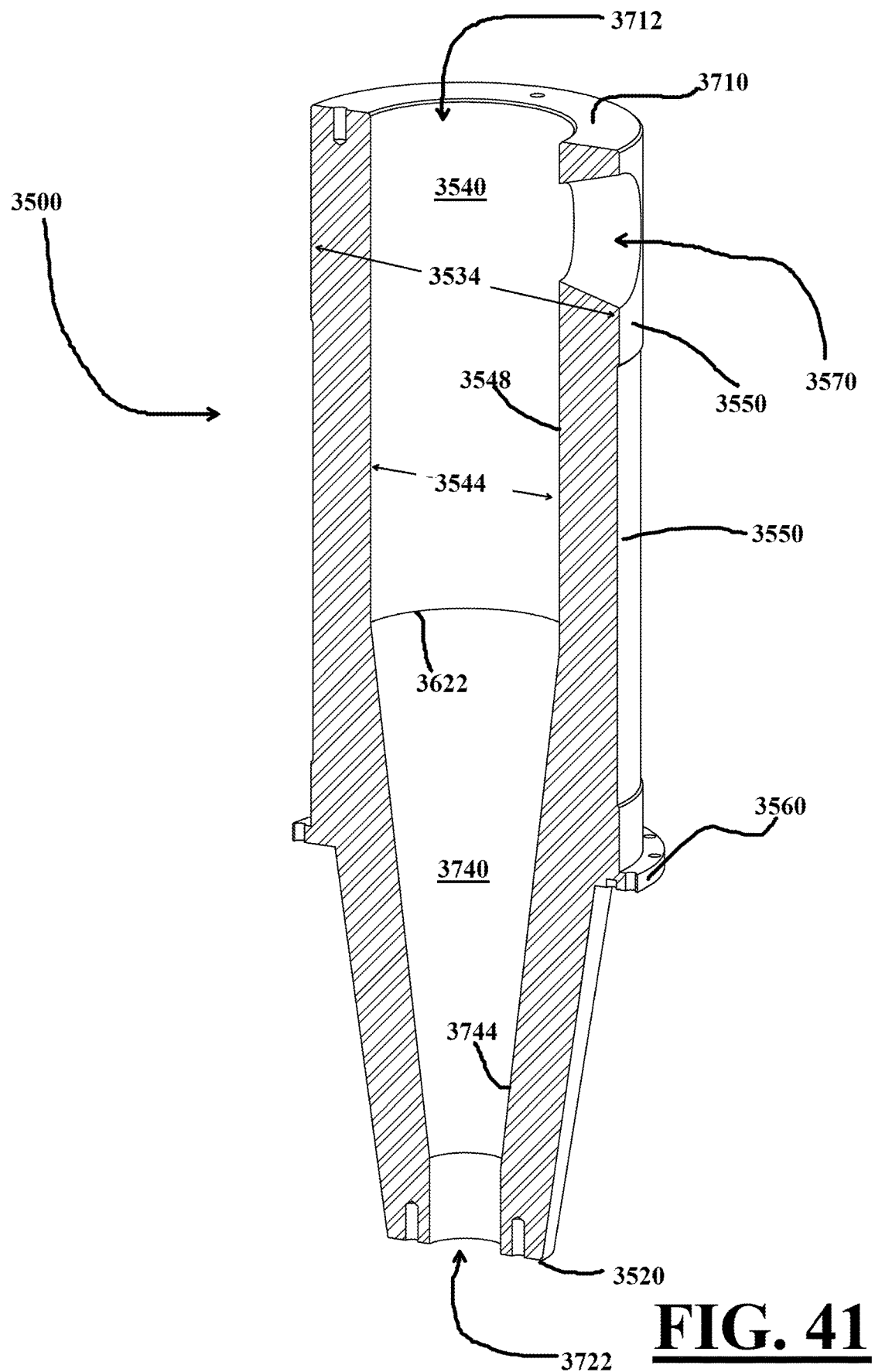
FIG. 41 is a sectional perspective view of the combination upper tube lower conical tube of FIG. 40 taken along line 41-41.
Figure 42:
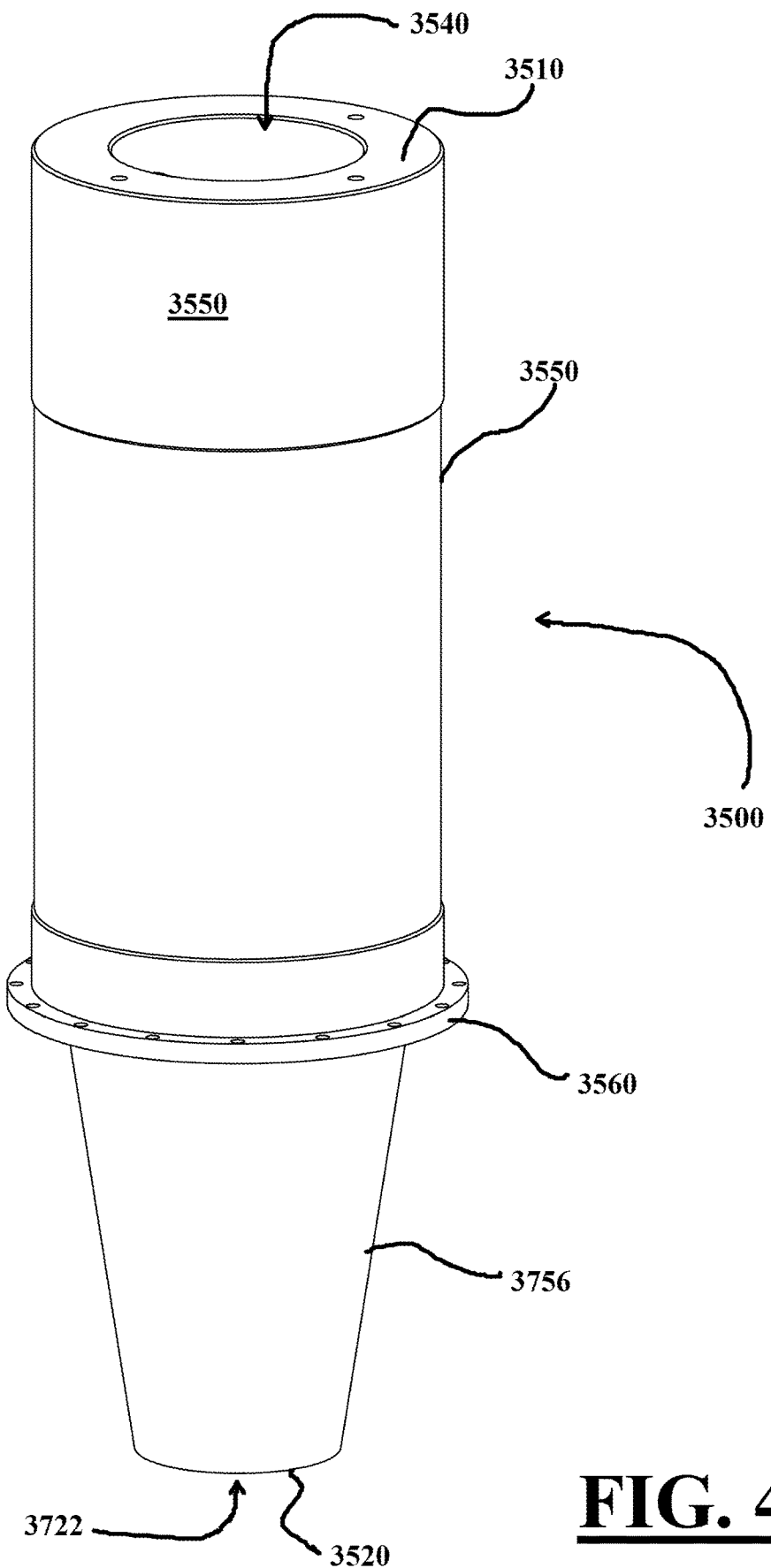
FIG. 42 is a perspective view of the combination upper tube lower conical tube of FIG. 40 rotated along its longitudinal axis.

FIG. 38 is a front view of a combination tube with conical section 3500 which can be used with the modular hydrocyclone body 600 and alternative small diameter hydrocyclone insert 2000. FIG. 39 is a sectional view of the combination tube with conical section 3500 of FIG. 38 taken along line 39-39. FIG. 40 is a perspective view of the combination upper tube lower conical tube 3500. FIG. 41 is a sectional perspective view of the combination upper tube lower conical tube 3500 shown in FIG. 40 taken along line 41-41. FIG. 42 is a perspective view of the combination upper tube lower conical tube 3500 of FIG. 40 but rotated along its longitudinal axis compared to FIG. 40.

Combination tube/cone 3500 can comprise first end 3510, second end 3520, generally cylindrical interior bore 3540 between first end 3510 and joint 3622, and generally tapered/frustoconical bore 3720 between joint 3622 and close to second end 3520, both cylindrical interior bore 3540 and frustoconical bore 3720 sharing longitudinal centerline 3545.

Generally cylindrical exterior wall 3550 can be provided having an exterior diameter 3534. Interior bore 3540 can be generally cylindrical with sidewall 3548 and have diameter 3544 and height 3546. Opening 3570 is fluidly connected to interior bore 3540.

Tapered bore 3740 can be generally frustoconical in shape; with tapered sidewall 3744. Lower outlet 3722 can be provided. Flange 3560 can be provided.

Preferably, longitudinal axis 631 of inlet 630 of body 600 will intersect (or come close to intersecting) with longitudinal axis 655 of bore 650, with longitudinal axis 3545 of tube 3500, and with longitudinal axis 2045 of hydrocyclone 2000. In another embodiment the projection of side inlet 630 intersects with longitudinal axis 660 of internal bore 650. This intersection is generally referred to as "axial" flow as compared to flow which would enter bore 630 of body spaced very close to sidewall 652 and general cause wear in said sidewall.

Third Embodiment

Figure 43:
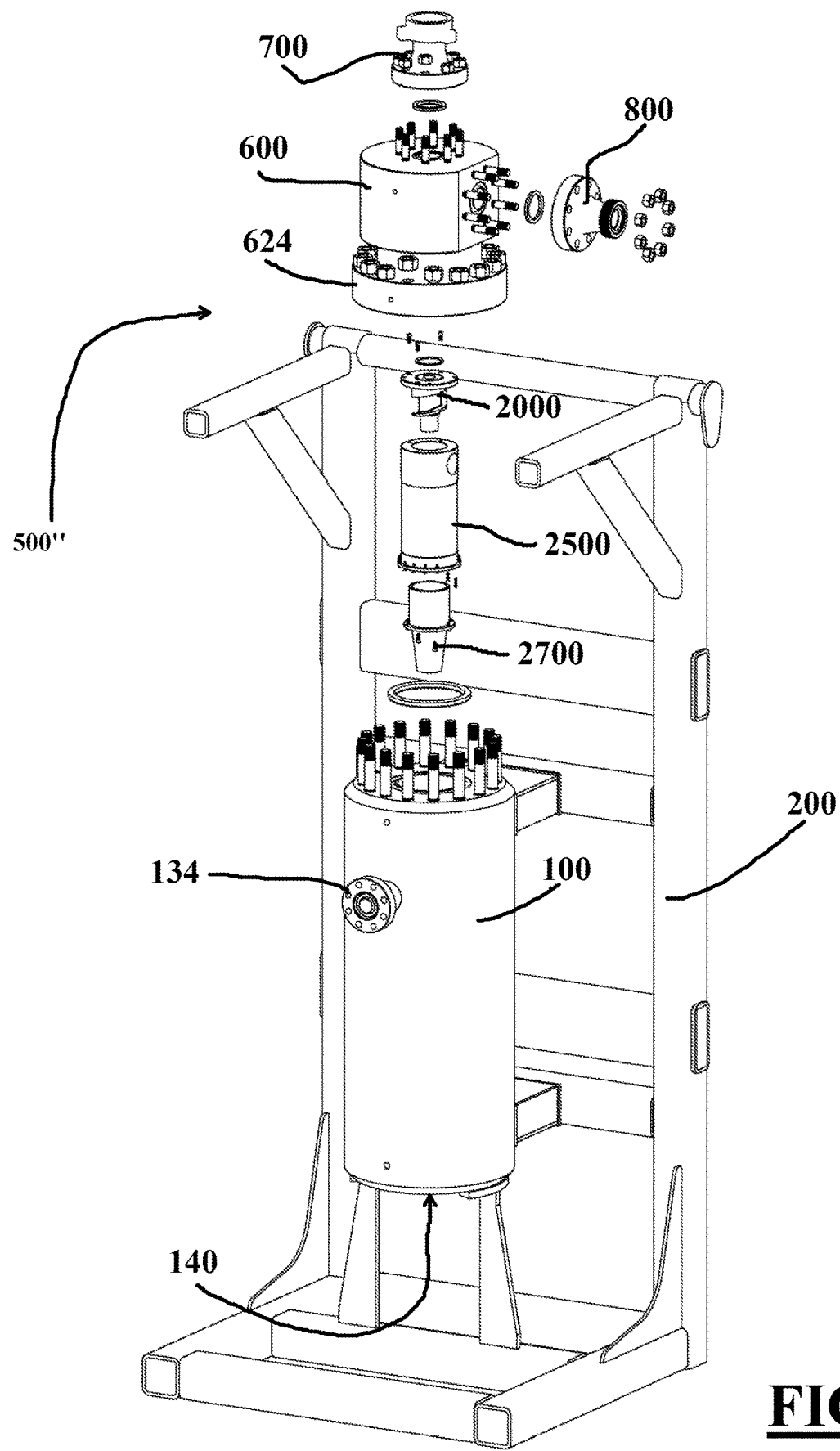
FIG. 43 is an exploded perspective view of the modular/variable hydrocyclone shown in FIG. 1 with a small diameter hydrocyclone insert along with an alternative matching two piece upper and lower conical tube.
Figure 44:
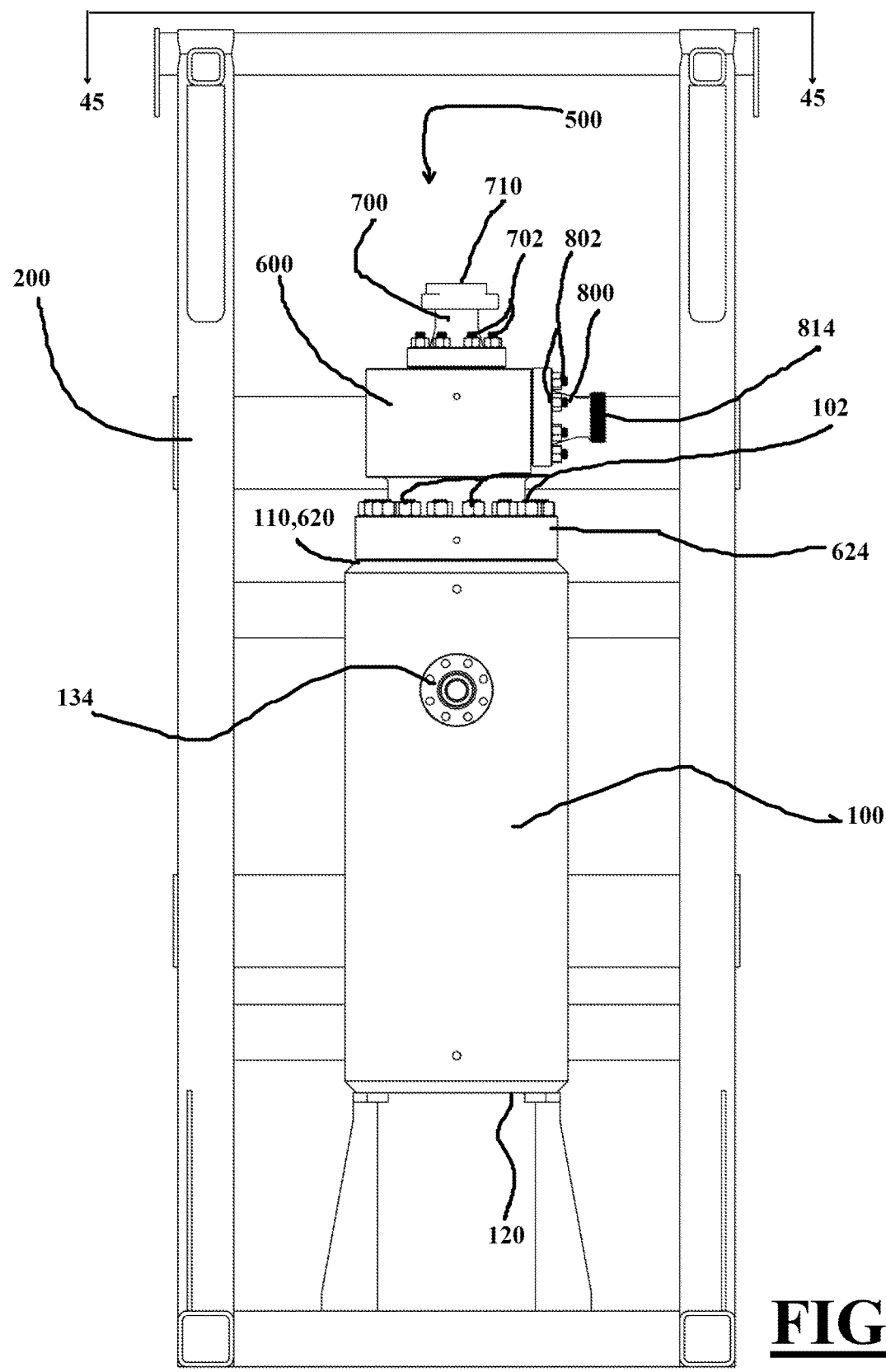
FIG. 44 shows a front view of the exterior of a modular/variable hydrocyclone used with the embodiments of FIGS. 43 and 45-55.
Figure 45:
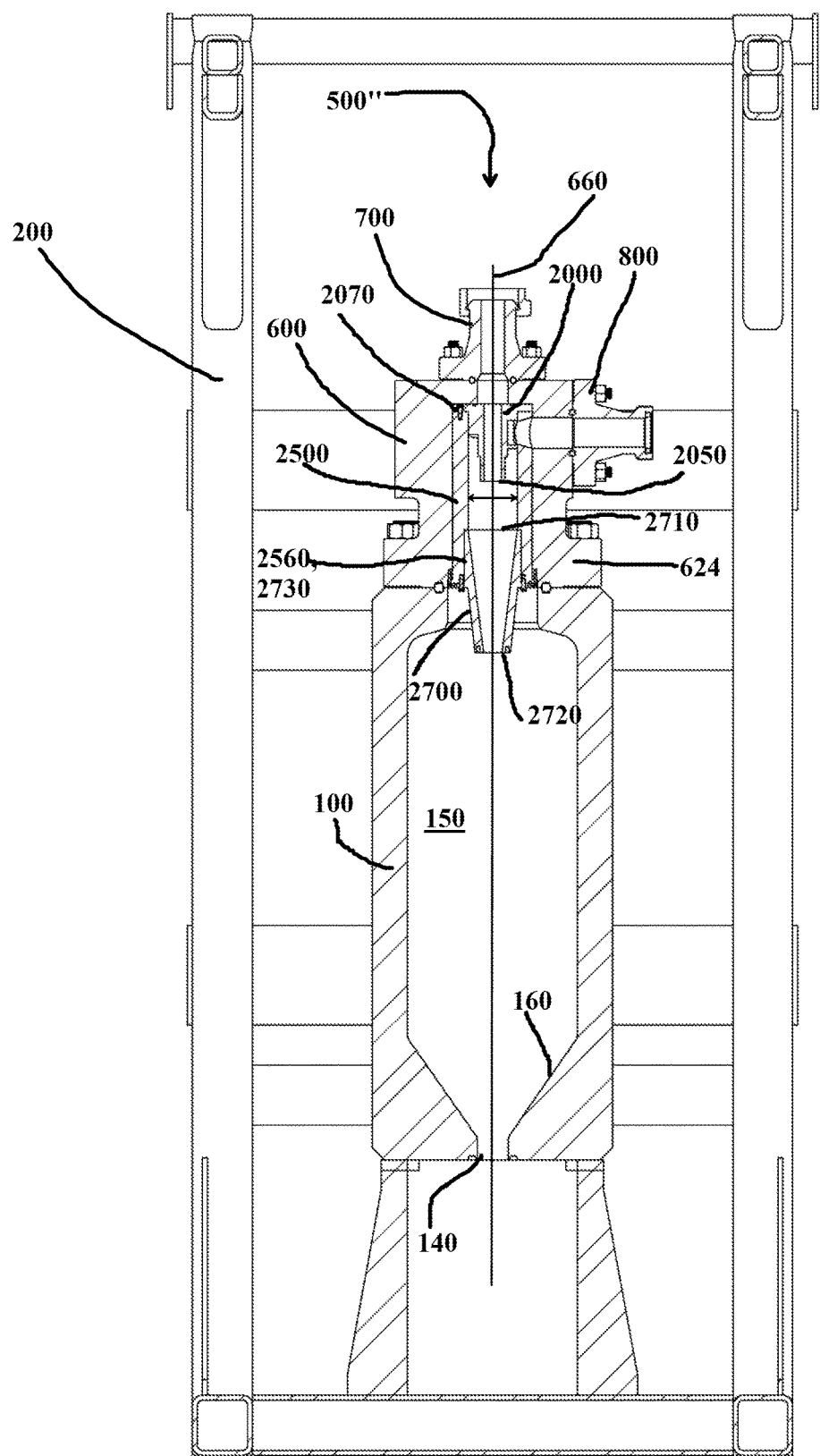
FIG. 45 is a vertical sectional view of the modular/variable hydrocyclone of FIG. 44 taken through lines 45-45.
Figure 46:
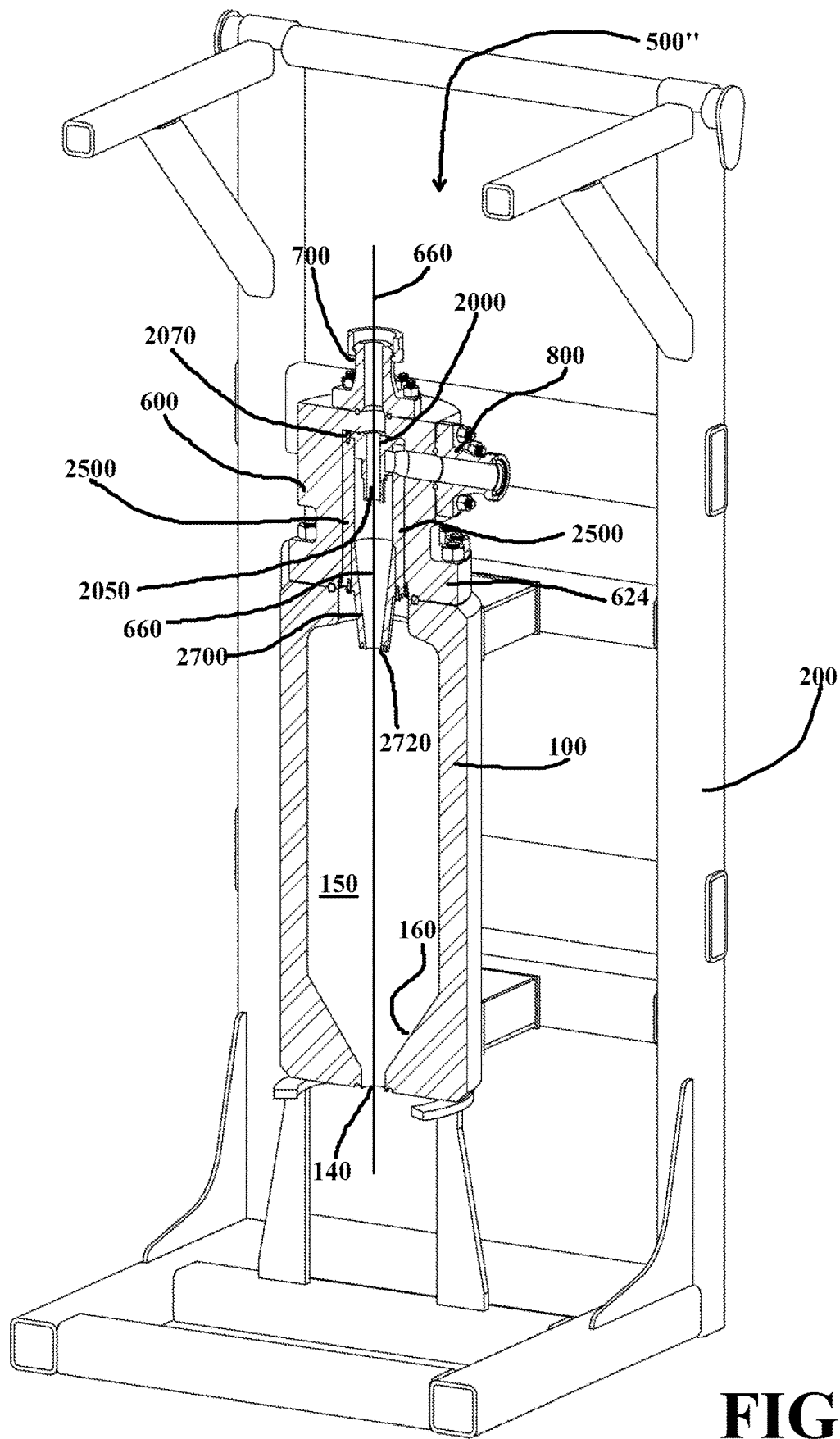
FIG. 46 is a vertical perspective sectional view of the modular/variable hydrocyclone of FIG. 44 taken through lines 45-45.

FIG. 43 is an exploded perspective view of the modular/variable hydrocyclone system 500" shown in FIG. 1 with small diameter hydrocyclone insert 2000 along with an alternative matching two piece upper and lower conical tube 2500,2700. FIG. 45 is a sectional view of the modular/variable hydrocyclone 500" taken with a vertical plane. FIG. 46 is a sectional perspective view of the modular/variable hydrocyclone system 500" taken with a vertical plane.

Small diameter hydrocyclone insert 2000 is inserted into first end 2510 of upper tube 2500 via interior bore 2540 aligning rear wall 2130 with opening 2570.

Diameter 2200 of small diameter hydrocyclone insert 2000 will closely match diameter 2544 of upper tube 2500 to generally create a fluid tight seal between the two parts causing flow to go through helical flow pathway/channel.

Lower conical tube 2700 is connected to upper tube 2500, and upper tube 2500 with hydrocyclone insert 2000 are inserted into bore 650 of body 600 via second end 620. Opening 2570 with aligned rear wall 2130 are aligned with opening bore 630 of body 600. Preferably diameter 2534 of upper tube 2500 will closely match diameter 670 of bore 650 to generally create a fluid tight seal between the two parts and avoiding fluid leaks.

Preferably, longitudinal axis 631 of inlet 630 of body 600 will intersect (or come close to intersecting) with longitudinal axis 660 of bore 650, and with longitudinal axis 2545 of upper tube 2500, with longitudinal axis 2745 of lower conical section 2700, and with longitudinal axis 2045 of hydrocyclone 2000. In another embodiment the projection of side inlet 630 intersects with longitudinal axis 660 of internal bore 650.

This intersection is generally referred to as "axial" flow as compared to flow which would enter inlet 630 of body 600 spaced very close to sidewall 652 and general cause wear in said sidewall.

Figure 47:
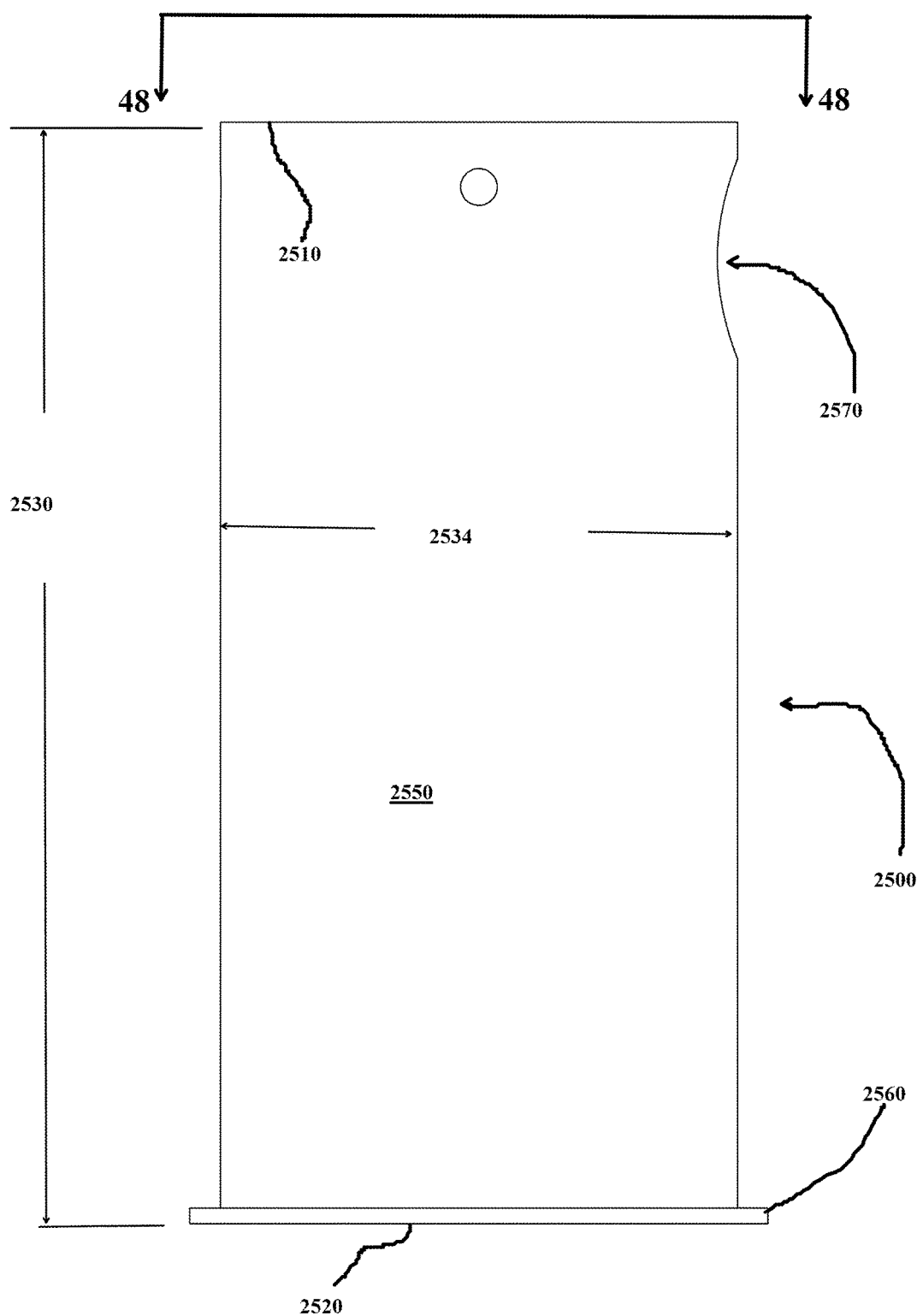
FIG. 47 is a front view of an upper tube which can be used with the modular hydrocyclone body of FIG. 9.
Figure 48:
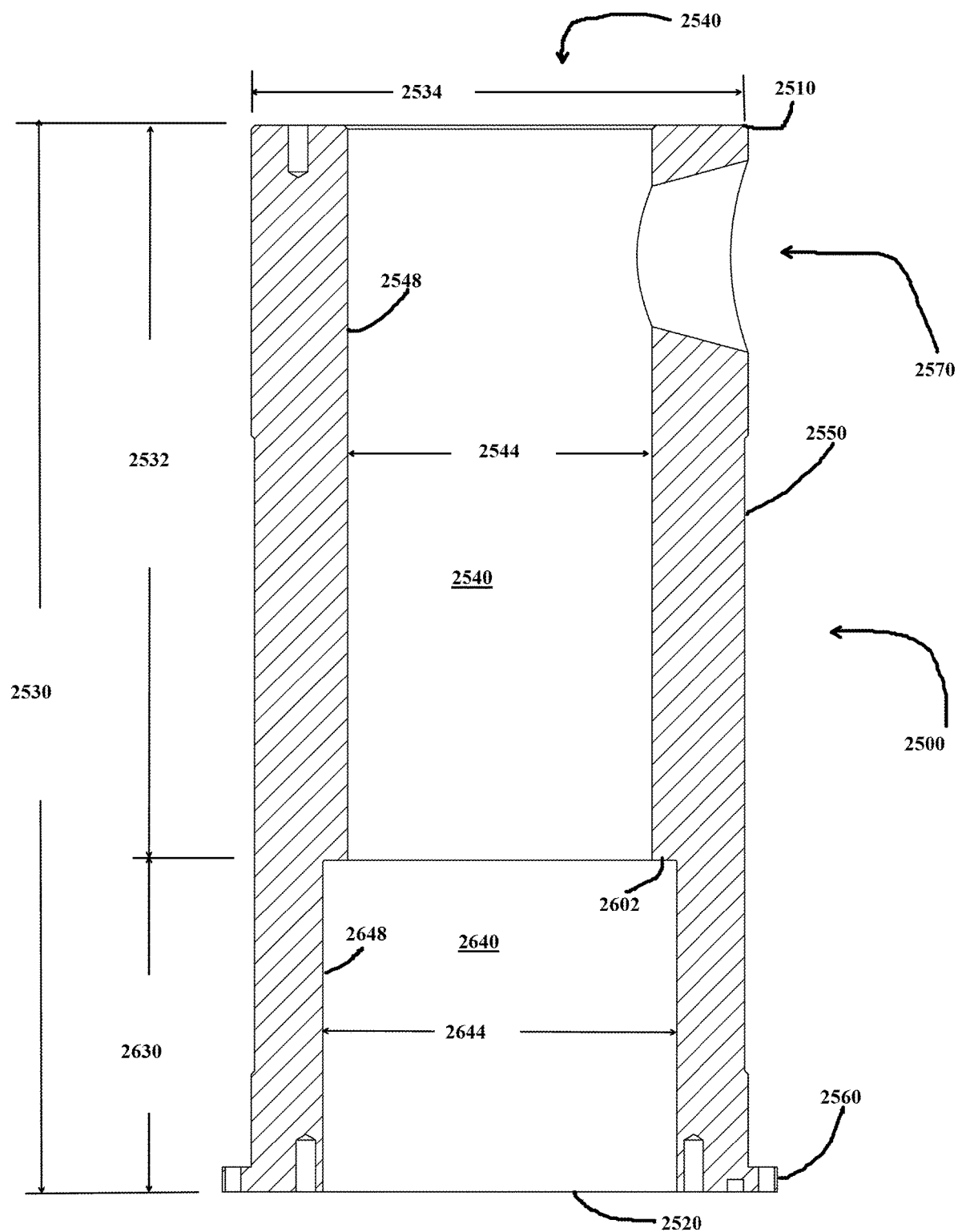
FIG. 48 is a sectional view of the upper tube of FIG. 47 taken along line 48-48.
Figure 49:
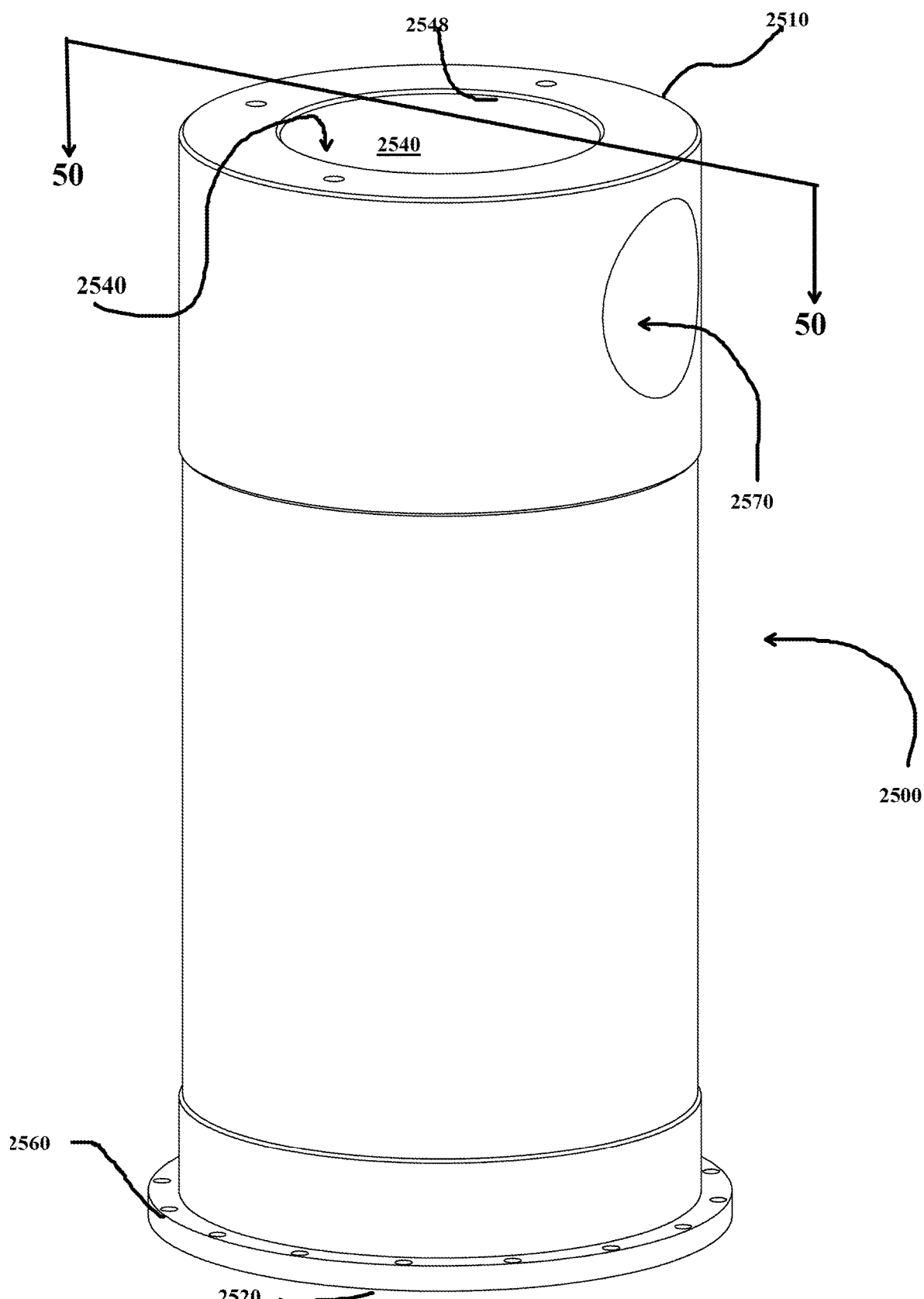
FIG. 49 is a perspective view of the upper tube of FIG. 48.
Figure 50:
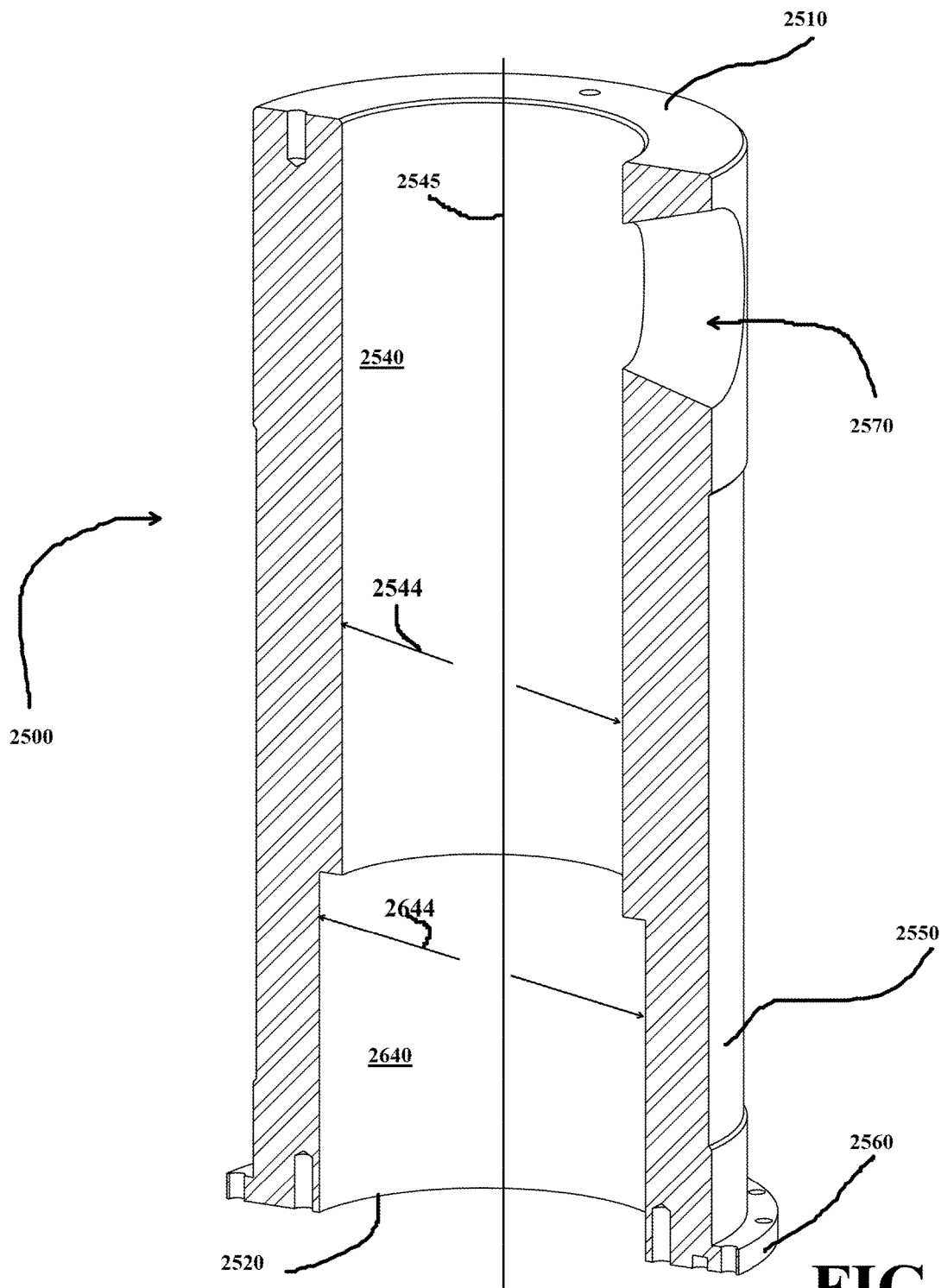
FIG. 50 is a sectional perspective view of the upper tube of FIG. 49 taken along line 50-50.
Figure 51:
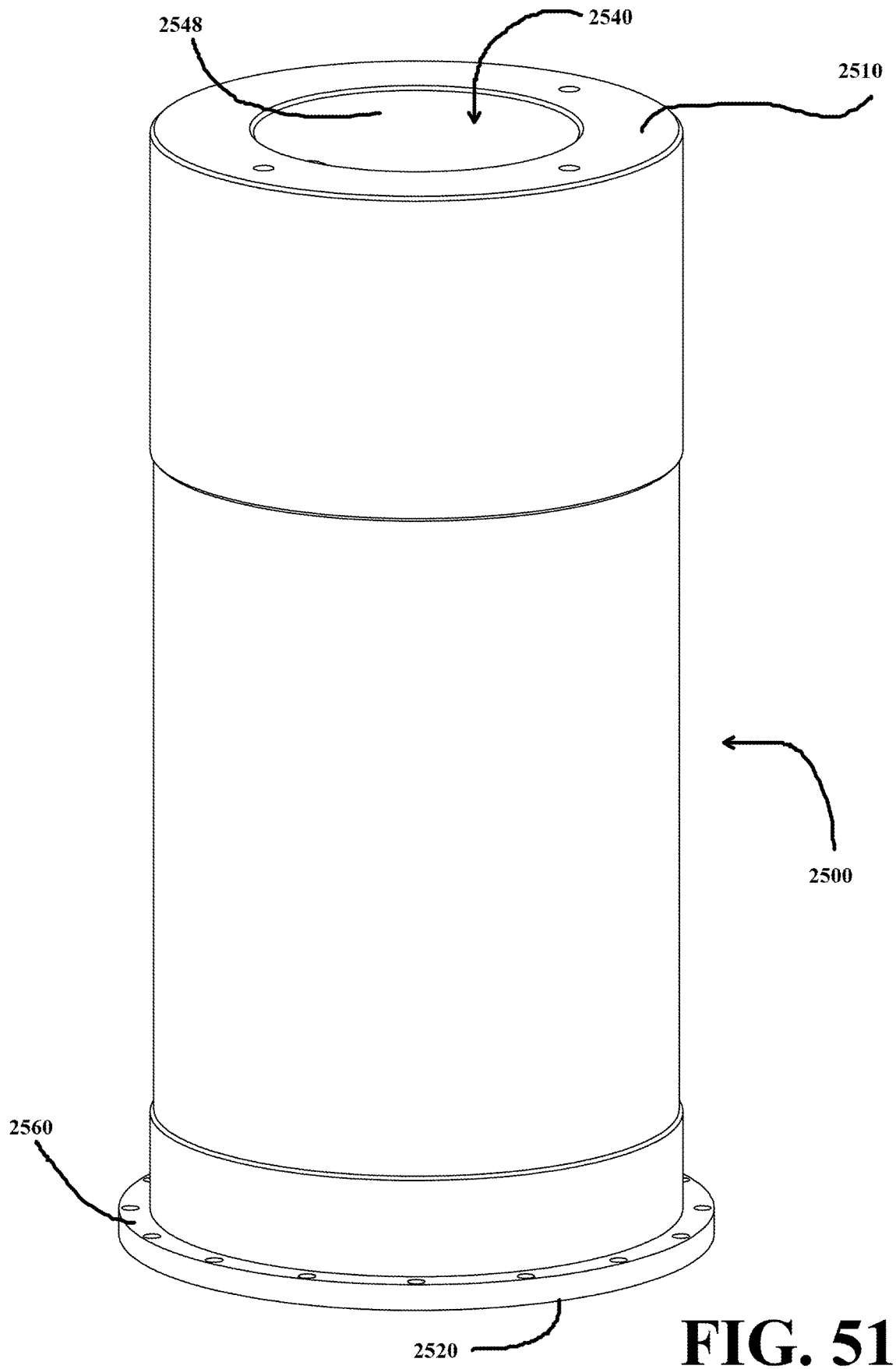
FIG. 51 is a perspective view of the upper tube of FIG. 49 rotated along its longitudinal axis.

FIG. 47 is a front view of an upper tube 2500 which can be used with the modular hydrocyclone body 600 along with small diameter hydrocyclone insert 2000. FIG. 48 is a sectional view of the upper tube 2500 shown in FIG. 47 taken along line 48-48. FIG. 49 is a perspective view of the upper tube 2500. FIG. 50 is a sectional perspective view of the upper tube 2500 of FIG. 49 taken along line 50-50. FIG. 51 is a perspective view of the upper tube 2500 shown in FIG. 49 but rotated along its longitudinal axis compared to FIG. 49.

Upper tube 2500 can comprise first end 2510, second end 2520 and interior bore 2540 between first and second ends with exterior wall 2550 and exterior diameter 2534. Interior bore 2540 can be generally cylindrical with sidewall 2548 and have diameter 2544 and longitudinal axis 2545. Opening 2570 is fluidly connected to interior bore 2540.

At second end 2520 can be recessed bore 2640 which is generally cylindrical with a diameter of 2644. Also at second end 2530 can be flange 2560.

Figure 52:
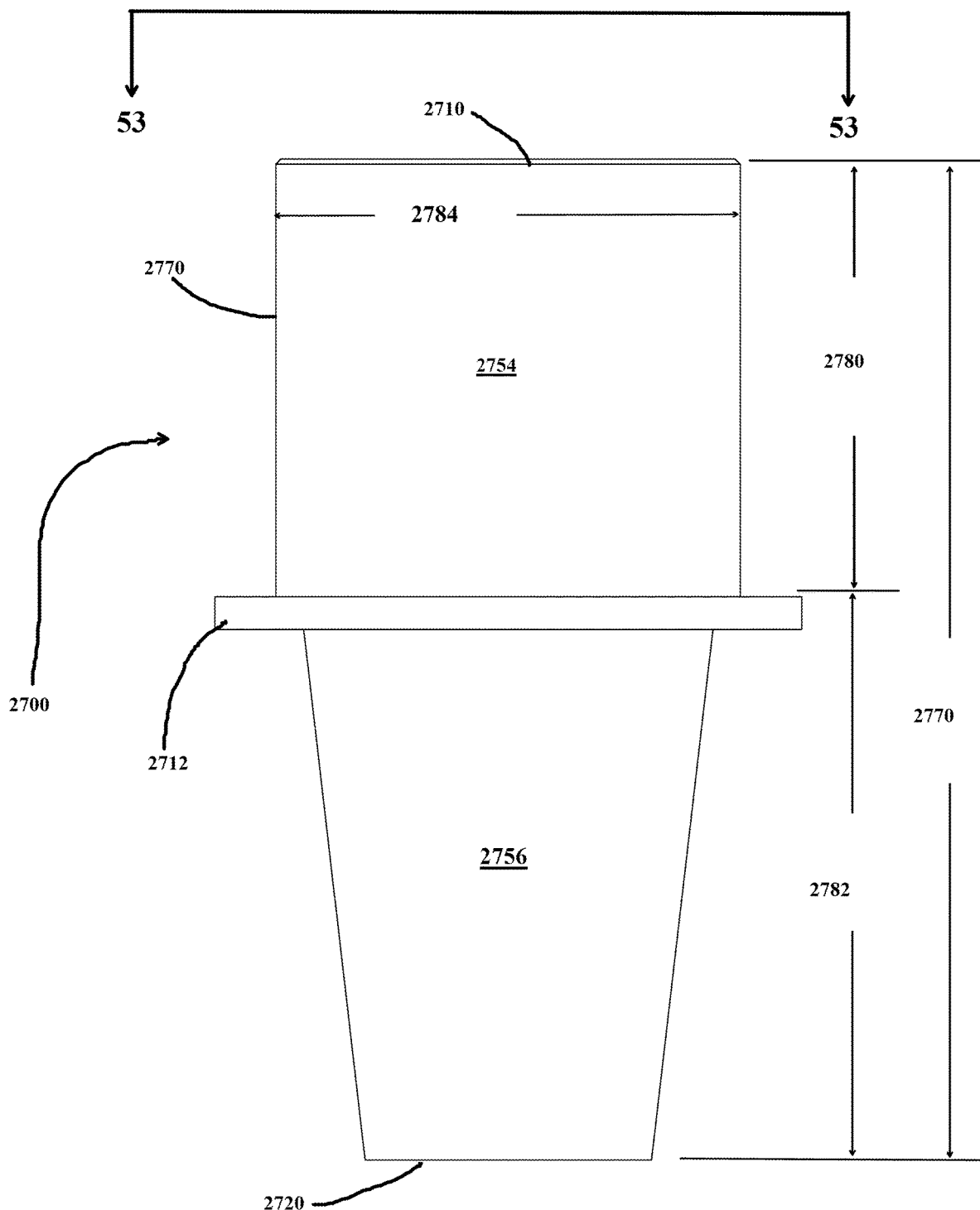
FIG. 52 is a front view of a lower conical tube insert which can be used with the upper tube of FIG. 47.
Figure 53:
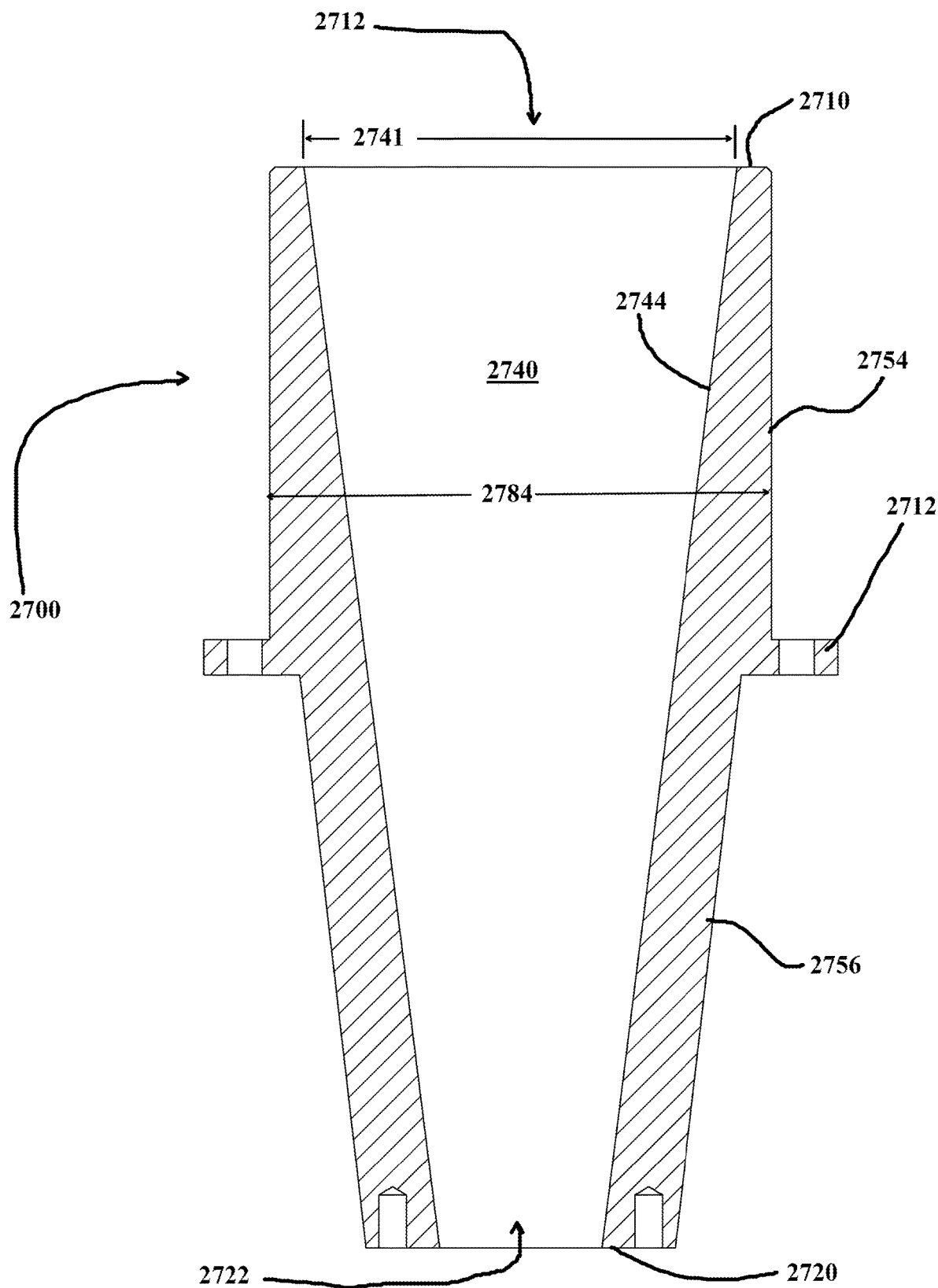
FIG. 53 is a sectional view of the lower conical tube insert of FIG. 47 taken along line 53-53.
Figure 54:
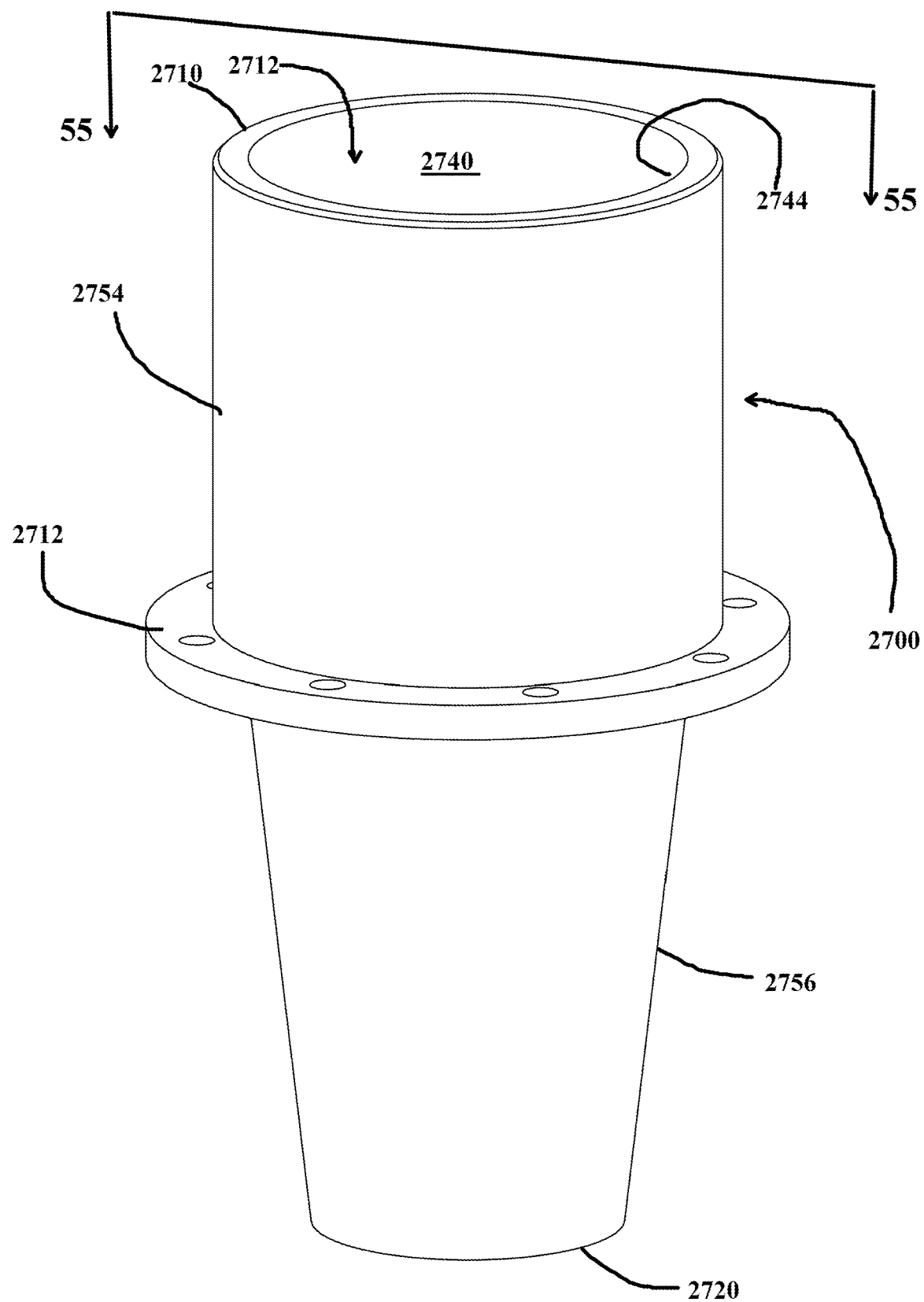
FIG. 54 is a perspective view of the lower conical tube insert of FIG. 52.
Figure 55:
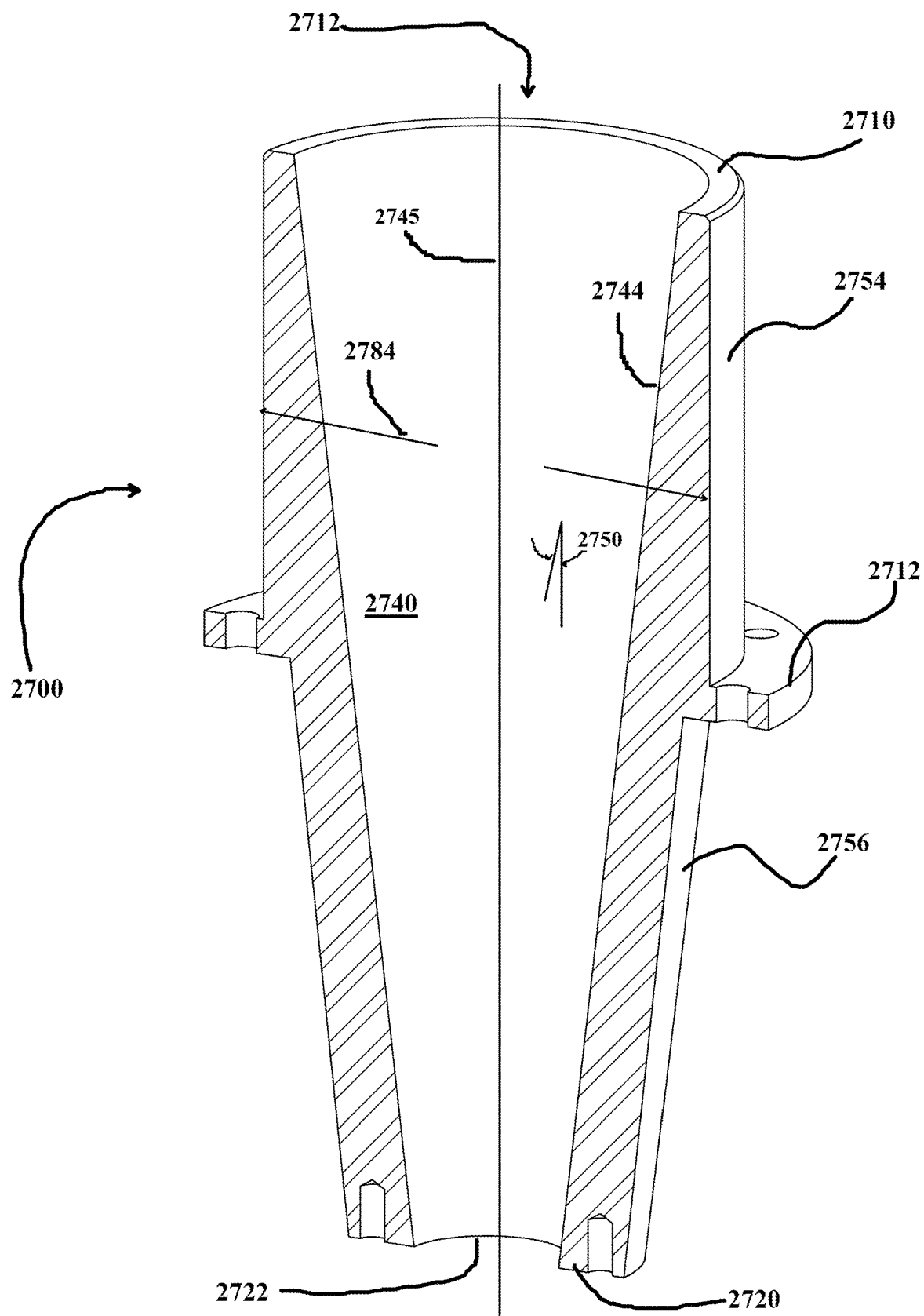
FIG. 55 is a sectional perspective view of the lower conical tube insert of FIG. 54 taken along line 55-55.

FIG. 52 is a front view of a lower conical tube insert 2700 which can be used with the upper tube 2500. FIG. 53 is a sectional view of the lower conical tube 2700 of FIG. 52 taken along line 53-53. FIG. 54 is a perspective view of the lower conical tube 2700. FIG. 55 is a sectional perspective view of the lower conical tube 2700 of FIG. 54 taken along line 55-55.

Lower conical tube 2700 can comprise first end 2710, second end 2720 and tapered interior bore 2740 between first 2710 and second 2720 ends. Tapered interior bore 2740 can be generally frustoconical with sloped sidewall 2744 with a slope 2750 from the vertical and longitudinal axis 2745. Between first end 2710 and second end 2720 can be flange 2712. Upper tube 2500 and lower conical tube 2500 can be detachably connected to each other via inserting cylindrical tube 2754 into recessed area 2640 and connecting with a plurality of fasteners using flanges 2560 and 2712 such that longitudinal axis 2545 and 2745 are coincident.

Preferably height 2630 of recessed bore 2640 equals height 2780 of cylindrical tube 2754 or lower conical tube 2700.

Also preferably, upper diameter 2741 of frustoconical interior 2740 closely matches diameter 2544 of generally cylindrical bore 2540.

Also preferably, outer diameter 2784 of lower conical tube 2700 closely matches diameter 2644 of recessed area 2640 of upper tube 2500.

Conditioning of Flow

In various embodiments of the modular/variable hydrocyclone system 500, the flow into the interior 650 of the hydrocyclone body 600 is "conditioned" by the hydrocyclone insert 1000 and lower conical tube by entering (a) first axially in the direction of arrow 690 generally intersecting the longitudinal axis 660 of the interior bore 650 of body 600 and (b) then spiraled by a helical channel 1100 in hydrocyclone insert 1000

(e.g., arrows 692,693 via helical channel 1100)

(spiral flow pathway of helical channel 1100 created by upper wall 1110, lower wall 1120, rear wall 1140, and interior surface 1140)

that conditions the flow from axially directed to tangentially directed creating centrifugal forces in the flow thereby separating items contained in the flow having different densities (e.g., one flow path exiting body 600 via arrow 696 and a second path exiting body 600 via arrow 694), such as separating the liquid and or gas stream portions of the flow from the solids contained in the flow.

As shown in FIGS. 1-3, 9-14, 29, and 43, the modular design incorporates:

(a) a fixed head or hydrocyclone body 600 installed on top of a pressure vessel 200 that allows the hydrocyclone body 600 to have (b) affixed within the head 600 and removable a hydrocyclone insert 1000 having a helical flow pathway/channel 1100; and a lower conical tube combination (1500,1600).

The hydrocyclone insert 1000 having a helical flow pathway/channel 1100 allows the flow to enter the hydrocyclone "axially" (i.e., in the direction of arrow 690 generally intersecting longitudinal centerline 660 of the interior bore 650 of hydrocyclone body 600) instead of tangentially (i.e., at the sidewall 652 of interior 650 of body 600).

Modular Options and Variable Hydrocyclone

In various embodiments is provided the method of keeping body 600 while switching out a first hydrocyclone insert 1000 and/or its associated upper tube and/or lower conical tube with a second hydrocyclone insert 1000' of and associated upper tube and/or lower conical tube while keeping original body 600. Such embodiment saves funds as body 600 is the pressure rated piece of modular/variable hydrocyclone system 500. In these embodiments, the hydrocyclone inserts and/or their associated upper tube and/or lower conical tubes are treated as wear replaceable parts preventing wear or failure of body 600. In various embodiments is provided the method of keeping body 600 while switching out a first hydrocyclone insert 1000 and/or its associated upper tube and/or lower conical tube with a second hydrocyclone insert 2000 and its associated upper tube and/or lower conical tube (e.g., 3500) where second hydrocyclone insert 2000 and its associated upper tube 2500 and/or lower conical portion 2700 are substantially different from first hydrocyclone insert 2000 and its associated upper tube and/or lower. Such embodiment allows modular/variable hydrocyclone system 500 to address substantially different fluid systems while not having to replace body 600.

The method and apparatus of utilizing a modular and variable hydrocyclone 500 on a pressure vessel 100 for well flow back, well cleanup and fracking operations. The invention utilizes a changeable and replaceable hydrocyclone insert comprising a hydrocyclone insert 1000 having a helical flow pathway/channel 1100, and a lower conical tube combination including first insert 1000 and second insert 2000 that can be replaced for various sizes and flow characteristics without replacing the head 600 and the pressure vessel 200.

For example, FIGS. 33-42 and 47-55 show alternative hydrocyclone insert 2000 combinations having a smaller diameter helical flow pathway/channel 2100 with alternative insert 2000 along with a smaller (e.g., a 2 inch) flow exit opening both at flow arrow 654 and at flow bore 2040). While using the same head 600 upper exit 700 and entrance 800, the flow handling characteristics of modular/variable hydrocyclone system 500 using the same body can be changed by switching from insert 1000/lower conical tube combination (1500,1600) to insert 2000/lower conical tube 3500 or lower conical tube combination 2500,2700. Alternatively, insert 1000/lower conical tube combination (1500, 1600) can be switched out for insert 2000/lower conical tube 3600 or lower conical tube combination 2500,2700.

In FIG. 33, with alternative hydrocyclone insert 2000, the flow schematically indicated by arrow 692' is conditioned by entering axially and then spiraled by a helical flow pathway/channel 2100 from being directed to intersecting the longitudinal centerline 660 to flow that is "tangential" to the side wall 3548 of conical tube 3500 to create centrifugal forces, and thus separating the solid from the liquid and or gas stream.

The flow enters the hydrocyclone body 600 directed towards the longitudinal centerline 660 instead of tangentially along a sidewall as in prior art hydrocyclones. This is schematically represented in FIGS. 7 and 8 by arrow 690 and centerline 631 intersecting with longitudinal centerline 660 (schematically indicated by "X"). The hydrocyclone inserts 1000 or 2000 with their helical pathway condition the flow to be tangential and initiates the centrifugal flow. The hydrocyclone insert 1000 or 2000 with its respective conical tube combination (1500,1600)/conical tube 3500 can be replaced in the event of flow characteristics changing or damage/wear without replacing the hydrocyclone body 600 or head.

(a) The insert 1000,2000 may be removable from the head 600 without changing or damaging head 600.

(b) The head 600 may be on top of the pressure vessel 200 or contained within the pressure vessel 200.

Modular Options

The plurality of hydrocyclone inserts 1000, 2000, etc. can also be used to provide a user with the option of creating a plurality of modular hydrocyclone flow configurations using the same body 600 but difference combinations of components inside of body 600.

In various embodiments can include a kit for modular cyclone 500 including which includes body 600 with a plurality of hydrocyclone inserts 1000,1000', etc.; plurality of lower tubes 1500, 1500', etc.; and a plurality of funnels 1600, 1600', etc.

In various embodiments can include a kit for modular cyclone 500 which includes body 600 with a plurality of hydrocyclone inserts 1000,2000, etc.; plurality of lower tubes 1500/funnels 1600; plurality of lower tubes 3500; and/or plurality of upper tube 2500/lower conical 2700 sections, etc.

In various embodiments can be provided a kit for modular cyclone 500 including which includes body 500 with a plurality of hydrocyclone inserts 1000,1000', etc.; plurality of lower tubes 1500, 1500', etc.; and a plurality of funnels 1600, 1600', etc.

Replacing Components but Keeping Substantially the Same Flow Characteristics

In various embodiments the method includes the step of providing modular hydrocyclone 500 having body 600 with hydrocyclone insert 1000, upper tube 1500, and lower conical section 1600 with the step of switching out in a field location/operation hydrocyclone insert 1000, upper tube 1500, and lower conical section 1600 with hydrocyclone insert 1000', upper tube 1500', and lower conical section 1600' where hydrocyclone insert 1000', upper tube 1500', and lower conical section 1600' and substantially identical to hydrocyclone insert 1000, upper tube 1500, and lower conical section 1600 where modular hydrocyclone 500 maintains substantially similar flow characteristics and/or properties.

In various embodiments the method includes the step of providing modular hydrocyclone 500 having body 600 with hydrocyclone insert 1000, upper tube 1500, and lower conical section 1600 with the step of switching out in a field location/operation hydrocyclone insert 1000 with hydrocyclone insert 1000' where hydrocyclone insert 1000' is substantially identical to hydrocyclone insert 1000, along with the step of reinstalling upper tube 1500 and lower conical section 1600 where modular hydrocyclone 500 maintains substantially similar flow characteristics and/or properties.

In various embodiments the method includes the step of providing modular hydrocyclone 500 having body 600 with hydrocyclone insert 1000, upper tube 1500, and lower conical section 1600 with the step of switching out in a field location/operation hydrocyclone insert 1000 and upper tube 1500 with hydrocyclone insert 1000' and upper tube 1500' where hydrocyclone insert 1000' and upper tube 1500' are respectively substantially identical to hydrocyclone insert 1000 and upper tube 1500, along with the step of reinstalling lower conical section 1600 where modular hydrocyclone 500 maintains substantially similar flow characteristics and/or properties.

In various embodiments the method includes the step of providing modular hydrocyclone 500 having body 600 with hydrocyclone insert 2000, combination upper tube/conical section 3500 with the step of switching out in a field location/operation hydrocyclone insert 2000 and combination upper tube/conical section 3500 with hydrocyclone insert 2000' and combination upper tube/conical section 3500' where hydrocyclone insert 2000' and combination upper tube/conical section 3500' are substantially identical to hydrocyclone insert 2000 and combination upper tube/conical section 3500 where modular hydrocyclone 500 maintains substantially similar flow characteristics and/or properties.

In various embodiments the method includes the step of providing modular hydrocyclone 500 having body 600 with hydrocyclone insert 2000, upper tube 2500, and lower conical section 2700 with the step of switching out in a field location/operation hydrocyclone insert 2000 and upper tube 2500 with hydrocyclone insert 2000' and upper tube 2500' where hydrocyclone insert 2000' and upper tube 2500' are respectively substantially identical to hydrocyclone insert 2000 and upper tube 2500, along with the step of reinstalling lower conical section 2700 where modular hydrocyclone 500 maintains substantially similar flow characteristics and/or properties.

In various embodiments the method includes the step of providing modular hydrocyclone 500 having body 600 with hydrocyclone insert 2000, upper tube 2500, and lower conical section 2700 with the step of switching out in a field location/operation hydrocyclone insert 2000 and upper tube 2500 with hydrocyclone insert 2000' and lower upper tube 2500' where hydrocyclone insert 2000' and upper tube 2500' are respectively substantially identical to hydrocyclone insert 2000 and upper tube 2500, along with the step of lower conical insert 2700 where modular hydrocyclone 500 maintains substantially similar flow characteristics and/or properties.

In various embodiments the method includes the step of providing modular hydrocyclone 500 having body 600 with hydrocyclone insert 2000, upper tube 2500, and lower conical section 2700 with the step of switching out in a field location/operation hydrocyclone insert 2000 and lower conical section 2700 with hydrocyclone insert 2000' and lower conical section 2700' where hydrocyclone insert 2000' and lower conical section 2700' are respectively substantially identical to hydrocyclone insert 2000 and lower conical section 2700, along with the step of reinstalling upper tube 2500 where modular hydrocyclone 500 maintains substantially similar flow characteristics and/or properties.

Replacing Components and Substantially Changing Flow Characteristics

For example, by changing hydrocyclone inserts 1000, 2000, modular/variable hydrocyclone system 500 can be used to accommodate various different flow combinations and variations of pressure, densities of items to be separated, etc.

In various embodiments the method includes the step of providing modular hydrocyclone 500 having body 600 with hydrocyclone insert 1000, upper tube 1500, and lower conical section 1600 with the step of switching out in a field location/operation hydrocyclone insert 1000, upper tube 1500, and lower conical section 1600 with hydrocyclone insert 2000 and combination tube 3500 allowing the flow characteristics and/or properties of modular hydrocyclone 500 to be substantially changed.

In various embodiments the method includes the step of providing modular hydrocyclone 500 having body 600 with hydrocyclone insert 1000, upper tube 1500, and lower conical section 1600 with the step of switching out in a field location/operation hydrocyclone insert 1000, upper tube 1500, and lower conical section 1600 with hydrocyclone insert 2000, upper tube 2500, and lower conical section 2700 allowing the flow characteristics and/or properties of modular hydrocyclone 500 to be substantially changed.

In various embodiments the method includes the step of providing modular hydrocyclone 500 having body 600 with hydrocyclone insert 2000 and combination tube 3500 and the step of switching out in a field location/operation hydrocyclone insert 2000 and combination tube 3500 with hydrocyclone insert 1000, upper tube 1500, and lower conical section 1600 allowing the flow characteristics and/or properties of modular hydrocyclone 500 to be substantially changed.

In various embodiments the method includes the step of providing modular hydrocyclone 500 having body 600 with hydrocyclone insert 2000, upper tube 2500, and lower conical section 2700 and the step of switching out in a field location/operation hydrocyclone insert 2000, upper tube 2500, and lower conical section 2700 with hydrocyclone insert 1000, upper tube 1500, and lower conical section 1600 allowing the flow characteristics and/or properties of modular hydrocyclone 500 to be substantially changed.

In various embodiments the method includes the step of providing modular hydrocyclone 500 having body 600 with hydrocyclone insert 2000 and combination tube 3500 and the step of switching out in a field location/operation hydrocyclone insert 2000 and combination tube 3500 with hydrocyclone insert 2000', upper tube 2500, and lower conical section 2700 allowing the flow characteristics and/or properties of modular hydrocyclone 500 to be substantially changed.

In various embodiments alternative hydrocyclone insert 2000 provides the user with an alternative choice compared to hydrocyclone insert 1000 to be installed in and used with body 600 causing the modular hydrocyclone 500 to have different flow characteristics based on the different dimensions and/or features between hydrocyclone inserts 2000 and 1000.

In various embodiments the method and apparatus 10 includes a kit having a plurality of hydrocyclone inserts 1000, 2000 which can be interchanged with each other into body 600.

In various embodiments, the method and apparatus 10 includes a kits having a plurality of lower tubes 1500, 2500, plurality of lower conical sections 1600, 2700, and/or plurality of combination tubes with conical section 3500 which can be selectively installed and/or replaced into body 600 by a user.

In various embodiments the method includes providing modular hydrocyclone 500 having body 600 with hydrocyclone insert 1000, upper tube 1500, and lower conical section 1600 with the step of switching out in a field location/operation hydrocyclone insert 1000 with new hydrocyclone insert 1000' into body 600 and reinstalling upper tube 1500 and lower conical section 1600.

In various embodiments, the method includes switching out in a field location/operation a first hydrocyclone insert 1000 from body 600 and installing a second hydrocyclone insert 1000' into body 600.

In various embodiments the method includes providing modular hydrocyclone 500 having body 600 with hydrocyclone insert 1000, upper tube 1500, and lower conical section 1600 with the step of switching out in a field location/operation upper tube 1500 with new upper tube 1500' into body 600 and reinstalling hydrocyclone insert 1000 and lower conical section 1600.

In various embodiments the method includes switching out in a field location/operation a first hydrocyclone insert 1000 from body 600 and installing into body 600 a second hydrocyclone insert 2000.

In various embodiments the method includes switching out from body 600 in a field location/operation upper tube 1500, 2500 and installing lower conical section 1600, 2700 portions while maintaining the same hydrocyclone insert 1000.

In various embodiments the method includes switching out in a field location/operation upper lower conical section 1600, 2700, while maintaining upper tube 1500, 2500, hydrocyclone insert 1000 and body 600.

In various embodiments the method includes switching out a field location/operation tube 3500 while maintaining body 600.

In various embodiments the method includes switching out a field location/operation tube 3500 while maintaining body 600 along with hydrocyclone insert 2000.

In various embodiments the method includes switching out a field location/operation upper 2500 and lower 2700 portions while maintaining body 600.

In various embodiments the method includes switching out in field upper 2500 and lower 2700 portions while maintaining body 600 along with hydrocyclone insert 2000.

In various embodiments the method includes switching out a field location/operation lower 2700 portion while maintaining body 600.

In various embodiments the method includes switching out a field location/operation lower 2700 portion while maintaining body 600 along with upper portion 2500 and hydrocyclone insert 2000.

In various embodiments the method includes switching out a field location/operation upper tube 1500, 2500 and lower conical section 1600, 2700 with combination tube and conical section 3500. In various embodiments the method includes switching out in field combination tube and conical section with upper tube 1500, 2500 and lower conical section 1600, 2700.

Switching Out Hydrocyclone Insert 1000 with Hydrocyclone Insert 2000

In various of the above referenced embodiments the flow characteristics of modular cyclone 500 with the same body 600 can be changed by changing or switching out helical inserts 1000 and 2000 having differing dimensions/configurations as specified below.

For example, in various embodiments the ratio between the depths/heights 1230 and 2230 of the helical flow pathways 1100 and 2100 (ratio calculated by ratio of dimensions 1230:2230) for hydrocyclone inserts 1000 and 2000 can exceed 1.1, 1.2, 1.3, 1.4, 1.5, 1.6 1.7, 1.8. 1.9, 2, 2.25, 2.5, 2.75, and/or 3. In various embodiments the ratio 1230:2230 of the depths can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650.

As another example, in various embodiments the ratio between the widths 1235 and 2235 of the helical flow pathways 1100 and 2100 (which ratio can be calculated by the formula [1235/2235] where reference numerals 1235 and 2235 are respectively the dimensions of the items referred to by the reference numerals) for hydrocyclone inserts 1000 and 2000 can exceed 1.1, 1.2, 1.3, 1.4, 1.5, 1.6 1.7, 1.8. 1.9, 2, 2.25, 2.5, 2.75, and/or 3. In various embodiments the ratio of the widths 1235 and 2235 of the helical pathways 1100 and 2100 for hydrocyclone inserts 1000 and 2000 can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650.

As another example, in various embodiments the ratio between the cross sectional areas of the helical flow pathways 1100 and 2100 (which ratio can be calculated by the formula ([1235*1230]/[2235*2230]) where reference numerals 1230, 1235, 2230, and 2235 are respectively the dimensions of the items referred to by the reference numerals) for hydrocyclone inserts 1000 and 2000 can exceed 1.1, 1.2, 1.3, 1.4, 1.5, 1.6 1.7, 1.8. 1.9, 2, 2.25, 2.5, 2.75, and/or 3. In various embodiments the ratio of the cross sectional areas of the helical pathways 1100 and 2200 for hydrocyclone inserts 1000 and 2000 can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650.

As another example, in various embodiments the ratio between the volumes of the helical flow pathways 1100 and 2100 (which ratio can be calculated by the formula [1235*1230*longitudinal length of helical flow pathway 1100]: [2235*2230*longitudinal length of helical flow pathway 2100] where reference numerals 1230, 1235, 2230,2235 are respectively the dimensions of the items referred to by the reference numerals) for hydrocyclone inserts 1000 and 2000 can exceed 1.1, 1.2, 1.3, 1.4, 1.5, 1.6 1.7, 1.8. 1.9, 2, 2.25, 2.5, 2.75, and/or 3. In various embodiments the ratio of the volumes of the helical pathways 1100 and 2100 for hydrocyclone inserts 1000 and 2000 can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650.

As another example, in various embodiments the ratio between the pitches 1220 and 2220 of the helical flow pathways 1100 and 2100 (which ratio can be calculated by the ratio of dimensions 1220:2220) for hydrocyclone inserts 1000 and 2000 can exceed 1.1, 1.2, 1.3, 1.4, 1.5, 1.6 1.7, 1.8. 1.9, 2, 2.25, 2.5, 2.75, and/or 3. In various embodiments the ratio of the pitches 1220:2220 can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650.

As another example, in various embodiments the ratio between the longitudinal depths 1240 and 2240 of the helical flow pathways 1100 and 2100 (which ratio can be calculated by the ratio of dimensions 1240:2240) for hydrocyclone inserts 1000 and 2000 can exceed 1.1, 1.2, 1.3, 1.4, 1.5, 1.6 1.7, 1.8. 1.9, 2, 2.25, 2.5, 2.75, and/or 3. In various embodiments the ratio of the longitudinal depths 1240:2240 can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650. In various embodiments the above can be true where the pitches 1220 and 2220 of the helical flow pathways 1100 and 1200 are the same.

As another example, in various embodiments the ratio between the outer diameters 1200 and 2200 of the helical flow pathways 1100 and 2100 (which ratio can be calculated by the ratio of dimensions 1200:2200) for hydrocyclone inserts 1000 and 2000) can exceed 1.1, 1.2, 1.3, 1.4, 1.5, 1.6 1.7, 1.8. 1.9, 2, 2.25, 2.5, 2.75, and/or 3. In various embodiments the ratio of the outer diameters 1200:2200 can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650.

As another example, in various embodiments the ratio between the internal diameters 1150 and 2150 of the helical flow pathways 1100 and 2100 (which ratio can be calculated by the ratio of dimensions 1150:2150) for hydrocyclone inserts 1000 and 2000) can exceed 1.1, 1.2, 1.3, 1.4, 1.5, 1.6 1.7, 1.8. 1.9, 2. 2.25, 2.5, 2.75, and/or 3. In various embodiments the ratio of the inner diameters 1150:2150 can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650.

As another example, in various embodiments the ratio between the number of revolutions (e.g., in degrees or radians) that the helical flow pathways 1100 and 2100 of helical inserts 1000 and 2000 make around their respective longitudinal axes 1045 and 2045 for hydrocyclone inserts 1000 and 2000 can exceed 1.1, 1.2, 1.3, 1.4, 1.5, 1.6 1.7, 1.8. 1.9, 2. 2.25, 2.5, 2.75, and/or 3. In various embodiments the ratio of the number of revolutions the helical flow pathways pathways 1100 and 2100 for hydrocyclone inserts 1000 and 2000 can fall within a range of between any two of the ratios specified in this paragraph. In various embodiments the above can be true where additionally the widths 1014 and 2014 of first ends 1010 and 2010 of hydrocyclone inserts 1000 and 2000 are both equal to the internal diameter 670 of bore 650.

As another example, in various embodiments the ratio between the lengths of the helical flow pathways 1100 and 2100 for hydrocyclone inserts 1000 and 2000 can exceed 1.1, 1.2, 1.3, 1.4, 1.5, 1.6 1.7, 1.8. 1.9, 2, 2.25, 2.5, 2.75, and/or 3. In various embodiments the ratio of the respective lengths the helical flow pathways pathways 1100 and 2100 for hydrocyclone inserts 1000 and 2000 can fall within a range of between any two of the ratios specified in this paragraph. In these embodiments the lengths of the helical flow pathways can be determined by straightening or unwinding the helical flow pathways 1100 and 2100 about their respective longitudinal axes 1045 and 2045. In various embodiments the above can be true where additionally the widths 1014 and 2014 of first ends 1010 and 2010 of hydrocyclone inserts 1000 and 2000 are both equal to the internal diameter 670 of bore 650.

As another example, lower conical tube 1600 can be switched out with a replacement lower conical tube 1600'. In various embodiments the ratio between the depths or heights 1660 and 1660' extending from second end 620 of body (which ratio can be calculated by the ratio of dimensions 1660:1660') for lower conical tubes 1660 and 1660' can exceed 1.1, 1.2, 1.3, 1.4, 1.5, 1.6 1.7, 1.8. 1.9, 2, 2.25, 2.5, 2.75, and/or 3. In various embodiments the ratio of the depths or heights 1600:1600' can fall within a range of between any two of the ratios specified in this paragraph.

Switching Out Lower Conical Tube 1600 with Lower Conical Tube 1600'

In various of the above referenced embodiments the flow characteristics of modular hydrocyclone 500 with the same body 600 can be changed by changing or switching out lower conical sections 1600 and 1600' having differing dimensions/configurations as specified below.

In various embodiments a user can be provided with multiple options and lower conical tubes 1600 and 1600', wherein the user switches out lower conical tube 1600 with lower conical tube 1600' in the same body 600.

As another example, lower conical tube 1600 can be switched out with a replacement lower conical tube 1600'. In various embodiments the ratio between the slopes 1650 and 1650' (which ratio can be calculated by the ratio of dimensions 1650:1650') for lower conical tubes 1660 and 1660' can exceed 1.1, 1.2, 1.3, 1.4, 1.5, 1.6 1.7, 1.8. 1.9, 2, 2.25, 2.5, 2.75, and/or 3. In various embodiments the ratio of the depths or heights 1650:1650' can fall within a range of between any two of the ratios specified in this paragraph.

As another example, lower conical tube 1600 can be switched out with a replacement lower conical tube 1600'. In various embodiments the ratio between the outlet size 1684 and 1684' (which ratio can be calculated by the ratio of dimensions 1684:1684') for lower conical tubes 1660 and 1660' can exceed 1.1, 1.2, 1.3, 1.4, 1.5, 1.6 1.7, 1.8. 1.9, 2, 2.25, 2.5, 2.75, and/or 3. In various embodiments the ratio of the outlet size 1684:1684' can fall within a range of between any two of the ratios specified in this paragraph.

Switching Out Lower Conical Tube 2700 with Lower Conical Tube 2700'

In various of the above referenced embodiments the flow characteristics of modular hydrocyclone 500 with the same body 600 can be changed by changing or switching out lower conical sections 2700 and 2700' having differing dimensions/configurations as specified below.

In various embodiments a user can be provided with multiple options and lower conical tubes 2700 and 2700', wherein the user switches out lower conical tube 2700 with lower conical tube 2700' in the same body 600.

As another example, lower conical tube 2700 can be switched out with a replacement lower conical tube 2700'. In various embodiments the ratio between the slopes 2750 and 2750' (which ratio can be calculated by the ratio of dimensions 2750:2750') for lower conical tubes 2700 and 2700' can exceed 1.1, 1.2, 1.3, 1.4, 1.5, 1.6 1.7, 1.8. 1.9, 2, 2.25, 2.5, 2.75, and/or 3. In various embodiments the ratio of the slopes 2750:2750' can fall within a range of between any two of the ratios specified in this paragraph.

As another example, lower conical tube 2700 can be switched out with a replacement lower conical tube 2700'. In various embodiments the ratio between the outlet size 2784 and 2784' (which ratio can be calculated by the ratio of dimensions 2784:2784') for lower conical tubes 2700 and 2700' can exceed 1.1, 1.2, 1.3, 1.4, 1.5, 1.6 1.7, 1.8. 1.9, 2, 2.25, 2.5, 2.75, and/or 3. In various embodiments the ratio of the outlet size 2784:2784' can fall within a range of between any two of the ratios specified in this paragraph.

It is to be understood that the invention is not to be limited or restricted to the specific examples or embodiments described herein, which are intended to assist a person skilled in the art in practicing the invention. For example, the number of fluids to be mixed, the number of inlets, the number of outlets, the number of spill over plates, and the number of chambers may vary according to the desired results of a particular application. Also, the dimensions of the various components of the multi-chamber manifold may be scaled to achieve the desired results of a particular application. Accordingly, numerous changes may be made to the details of procedures for accomplishing the desired results. These and other similar modifications will readily suggest themselves to those skilled in the art, and are intended to be encompassed within the spirit of the present invention disclosed herein and the scope of the appended claims.

The following is a list of reference numerals:

| LIST FOR REFERENCE NUMERALS | |
|---|---|
| (Part No.) | (Description) |
| 10 | systems and method |
| 100 | pressure vessel |
| 110 | first end |
| 120 | second end |
| 130 | upper inlet |
| 134 | middle opening |
| 140 | lower exit |
| 150 | interior |
| 160 | funnel/tapered area |
| 200 | frame |
| 500 | modular/variable hydrocyclone unit |
| 600 | hydrocyclone body |
| 610 | first end |
| 612 | surface |
| 614 | wall |
| 616 | recessed area |
| 620 | second end |
| 624 | flange |
| 630 | inlet |
| 631 | longitudinal axis/centerline |
| 632 | diameter |
| 634 | face |
| 640 | upper outlet |
| 644 | lower outlet |
| 645 | longitudinal axis/centerline |
| 650 | interior |
| 652 | sidewall of interior |
| 655 | longitudinal centerline of interior bore |
| 660 | longitudinal axis/centerline of hydrocyclone body |
| 670 | diameter |
| 675 | sidewall |
| 690 | arrow |
| 692 | arrow |
| 693 | arrow |
| 694 | arrow |
| 695 | arrow |
| 696 | arrow |
| 700 | upper connector |
| 710 | first end |
| 720 | second end |
| 730 | bore |
| 734 | arrow |
| 800 | side connector |
| 810 | first end |
| 814 | inlet |
| 820 | second end |
| 830 | bore |
| 834 | arrow |
| 1000 | hydrocyclone insert |
| 1010 | first end |
| 1014 | diameter of first end |
| 1016 | recessed area on first end |
| 1020 | second end |
| 1030 | outer diameter of tube |
| 1040 | interior bore |
| 1042 | diameter of interior bore |
| 1045 | longitudinal axes |
| 1050 | lower tube |
| 1060 | depth of lower tube |

| LIST FOR REFERENCE NUMERALS | |
|---|---|
| (Part No.) | (Description) |
| 1100 | helical flow pathway/channel |
| 1110 | upper wall |
| 1120 | lower wall |
| 1130 | rear wall |
| 1135 | end of helical pathway |
| 1140 | interior surface |
| 1150 | diameter of interior surface of helical pathway |
| 1152 | inner diameter of tube |
| 1190 | exterior surface |
| 1200 | diameter of outer perimeter of helical pathway |
| 1220 | pitch of helical pathway |
| 1230 | depth of helical pathway |
| 1235 | width of helical pathway |
| 1240 | longitudinal length of helical pathway |
| 1500 | upper tube |
| 1510 | first end |
| 1520 | second end |
| 1530 | height |
| 1534 | width |
| 1540 | interior |
| 1544 | diameter of interior |
| 1545 | longitudinal centerline of upper tube |
| 1548 | inner wall |
| 1550 | outer wall |
| 1560 | flange |
| 1570 | inlet |
| 1600 | lower conical tube |
| 1610 | first end |
| 1612 | flange |
| 1620 | second end |
| 1622 | joint |
| 1630 | height |
| 1640 | interior |
| 1644 | inner wall |
| 1645 | longitudinal centerline of lower conical tube |
| 1650 | slope or pitch of inner wall |
| 1654 | exterior wall |
| 1660 | height |
| 1670 | tube |
| 1680 | height of tube from joint to second end |
| 1684 | diameter of tube |
| 2000 | hydrocyclone insert |
| 2010 | first end |
| 2014 | diameter of first end |
| 2016 | recessed area on first end |
| 2020 | second end |
| 2030 | outer diameter of tube |
| 2040 | interior bore |
| 2042 | diameter of interior bore |
| 2045 | longitudinal axis |
| 2050 | lower tube |
| 2060 | depth of lower tube |
| 2100 | helical flow pathway/channel |
| 2110 | upper wall |
| 2120 | lower wall |
| 2130 | rear wall |
| 2135 | end of helical pathway |
| 2140 | interior surface |
| 2150 | diameter of interior surface of helical pathway |
| 2152 | inner diameter of tube |
| 2190 | exterior surface |
| 2200 | diameter of outer perimeter of helical pathway |
| 2220 | pitch of helical pathway |
| 2230 | depth of helical pathway |
| 2235 | width of helical pathway |
| 2240 | longitudinal length of helical pathway |
| 2500 | upper tube |
| 2510 | first end |
| 2520 | second end |
| 2530 | height |
| 2532 | height of bore above recess |
| 2534 | width |
| 2540 | interior |
| 2545 | longitudinal axis |
| 2544 | diameter of interior |

-continued

LIST FOR REFERENCE NUMERALS

| (Part No.) | (Description) |
|---|---|
| 2548 | inner wall |
| 2550 | outer wall |
| 2560 | flange |
| 2570 | inlet |
| 2600 | recess |
| 2602 | shoulder |
| 2630 | height of recess |
| 2640 | recess interior |
| 2644 | diameter of recess interior |
| 2648 | recess interior wall |
| 2700 | lower conical tube |
| 2710 | first end |
| 2712 | inlet |
| 2712 | flange |
| 2720 | second end |
| 2722 | outlet |
| 2730 | height |
| 2740 | interior |
| 2741 | diameter |
| 2744 | inner wall |
| 2750 | slope or pitch of inner wall |
| 2754 | exterior wall |
| 2756 | exterior wall below flange |
| 2760 | height |
| 2770 | tube |
| 2780 | height of tube from joint to first end |
| 2782 | height of tube from joint to second end |
| 2784 | diameter of tube |
| 3500 | combination tube with lower conical section |
| 3510 | first end |
| 3520 | second end |
| 3530 | overall height |
| 3531 | height of upper section |
| 3532 | height of middle section |
| 3533 | height of lower section |
| 3534 | width |
| 3533 | height of exteriorly tapered section |
| 3540 | interior |
| 3544 | diameter of interior |
| 3545 | longitudinal axis |
| 3548 | inner wall |
| 3550 | outer wall |
| 3560 | flange |
| 3570 | inlet |
| 3600 | recess |
| 3602 | shoulder |
| 3630 | height of recess |
| 3640 | recess interior |
| 3644 | diameter of recess interior |
| 3648 | recess interior wall |
| 3700 | lower conical tube |
| 3710 | first end |
| 3712 | inlet |
| 3720 | second end |
| 3722 | outlet |
| 3730 | height |
| 3740 | interior |
| 3744 | inner wall |
| 3750 | slope or pitch of inner wall |
| 3754 | exterior wall |
| 3756 | exterior wall below flange |
| 3760 | height |
| 3770 | tube |
| 3780 | height of tube from joint to first end |
| 3782 | height of tube from joint to second end |
| 3784 | diameter of tube |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A cyclone centrifuge apparatus for separating or classifying at least two components of different densities, comprising:
   (a) a housing having a cylindrical separating chamber with an interior wall including upper and lower portions and an interior top, and a cylindrical separating chamber longitudinal axis, a housing inlet to the cylindrical separating chamber, a first outlet and a second outlet from the cylindrical separating chamber, wherein the housing inlet has an inlet longitudinal axis;
   (b) a first flow conditioning assembly disposed in the cylindrical separating chamber downstream of the housing inlet for creating vortical flow in the cylindrical separating chamber;
   (c) the flow conditioning assembly including:
      (i) a removable cylindrical tube removably disposed in the cylindrical separating chamber, the removable cylindrical tube having
         a top and bottom,
         a cylindrical tube interior,
         an interior tube wall surrounding the cylindrical tube interior,
         an inlet to the cylindrical tube interior,
         a first outlet and a second outlet from the cylindrical tube interior,
      the inlet to the cylindrical tube interior being fluidly connected to the housing inlet to the cylindrical separating chamber,
      the first outlet and the second outlet from the cylindrical tube interior being fluidly connected respectively to the first outlet and the second outlet from the cylindrical separating chamber,
      wherein the housing inlet is located between the top and bottom of the removable cylindrical tube;
      (ii) a helical vane removably disposed in the cylindrical tube interior and having
         an inner edge contacting a central helical tube, and
         an outer area contacting the interior tube wall,
      with upper and lower spaced apart vane elements creating a helical volume pathway to direct fluid from the housing inlet of the cylindrical separating chamber across the helical pathway volume before exiting the helical pathway and into the remainder of the cylindrical separating chamber;
   (d) a second flow conditioning assembly which, while keeping the housing, is selectively replaceable with the first flow conditioning assembly during a field operation and after replacement being disposed in the cylindrical separating chamber downstream of the inlet for creating vortical flow in the separating chamber.

2. The cyclone centrifuge apparatus of claim 1, wherein the removable cylindrical tube includes a frustoconical interior portion which receives fluid from the helical volume pathway, and the frustoconical interior portion is separable from the cylindrical tube interior.

3. The cyclone centrifuge apparatus of claim 1, wherein the central helical tube extends below the helical volume pathway.

4. The cyclone centrifuge apparatus of claim 1, wherein the cylindrical tube inlet is a cylindrical opening with a cylindrical tube inlet longitudinal axis, which intersects with the longitudinal axis of the separating chamber.

5. The cyclone centrifuge apparatus of claim 1, wherein the second flow conditioning assembly having:
   (i) a second removable cylindrical tube removably disposed in the separating chamber having a second cylindrical tube interior, a second interior tube wall surrounding the second cylindrical tube interior, a second inlet to the second cylindrical tube interior, a second first outlet and a second second outlet from the second cylindrical tube interior, the second second inlet to the second cylindrical tube interior being fluidly connected to the inlet to the separating chamber, the second first outlet and the second second outlet from the second cylindrical tube interior being fluidly connected respectively to the first outlet and the second outlet from the separating chamber;
   (ii) a second helical vane removably disposed in the second cylindrical tube interior and having a second inner edge contacting a second central helical tube, and a second outer area contacting the second interior tube wall, with second upper and lower helical spaced apart parallel vane elements creating a second helical volume pathway to direct all fluid from the housing inlet of the separating chamber across the second helical pathway volume before exiting the second helical pathway and into the remainder of the separating chamber.

6. The cyclone centrifuge apparatus of claim 5, wherein the helical vane of the flow conditioning assembly includes a first helical volume pathway having a first height and the second helical vane includes a second helical volume pathway having a second height, wherein the first and second heights have a ratio which exceeds 1.5.

7. The cyclone centrifuge apparatus of claim 6, wherein the ratio between the first and second heights falls within a range of between 1.5 and 3.

8. The cyclone centrifuge apparatus of claim 5, wherein the helical vane of the flow conditioning assembly includes a first helical volume pathway having a first helical radius and the second helical vane includes a second helical volume pathway having a second helical radius, wherein the first and second helical radii have a ratio which exceeds 1.5.

9. The cyclone centrifuge apparatus of claim 8, wherein the ratio between the first and second helical radii falls within a range of between 1.5 and 3.

10. The cyclone centrifuge apparatus of claim 5, wherein the helical vane of the flow conditioning assembly includes a first helical volume pathway having a first helical slope and the second helical vane includes a second helical volume pathway having a second helical slope, wherein the first and second helical slopes have a ratio which exceeds 1.5.

11. The cyclone centrifuge apparatus of claim 10, wherein the ratio between the first and second helical slopes falls within a range of between 1.5 and 3.

12. The cyclone centrifuge apparatus of claim 5, wherein the helical vane of the flow conditioning assembly includes a first helical volume pathway having a first helical length and the second helical vane includes a second helical volume pathway having a second helical length, wherein the first and second helical lengths have a ratio which exceeds 1.5.

13. The cyclone centrifuge apparatus of claim 12, wherein the ratio between the first and second helical length falls within a range of between 1.5 and 3.

* * * * *